(12) United States Patent
Hamilton et al.

(10) Patent No.: US 10,919,799 B2
(45) Date of Patent: Feb. 16, 2021

(54) METHODS AND APPARATUS FOR PROCESSING GLASS

(71) Applicant: CORNING INCORPORATED, Corning, NY (US)

(72) Inventors: James Patrick Hamilton, Horseheads, NY (US); Jonathan Michael Mis, Horseheads, NY (US); William Paul Ryszytiwskyj, Conesus, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/754,046

(22) PCT Filed: Aug. 19, 2016

(86) PCT No.: PCT/US2016/047766
§ 371 (c)(1),
(2) Date: Feb. 21, 2018

(87) PCT Pub. No.: WO2017/034979
PCT Pub. Date: Mar. 2, 2017

(65) Prior Publication Data
US 2018/0244566 A1     Aug. 30, 2018

Related U.S. Application Data

(60) Provisional application No. 62/346,200, filed on Jun. 6, 2016, provisional application No. 62/346,175, filed
(Continued)

(51) Int. Cl.
*B05C 9/04*     (2006.01)
*B05C 5/02*     (2006.01)
(Continued)

(52) U.S. Cl.
CPC ............ *C03C 17/28* (2013.01); *B05C 5/0254* (2013.01); *B05C 9/04* (2013.01); *B24B 9/102* (2013.01);
(Continued)

(58) Field of Classification Search
USPC .......................................... 118/313–316, 326
See application file for complete search history.

(56) References Cited

U.S. PATENT DOCUMENTS 2,675,646 A * 4/1954 Kramer et al. ........... C03C 3/12
                                                                                                                     118/316
2,703,949 A * 3/1955 Gaiser ..................... C03B 27/02
                                                                                                                    65/60.7
(Continued)

FOREIGN PATENT DOCUMENTS

FR         2887872 A1    1/2007
GB           449602 A * 7/1936 .............. C03B 27/02
(Continued)

OTHER PUBLICATIONS

International Search Report and Written Opinion of the International Searching Authority; PCT/US2016/047766; dated Dec. 19, 2016; 17 Pages; European Patent Office.
(Continued)

*Primary Examiner* — Yewebdar T Tadesse
(74) *Attorney, Agent, or Firm* — Ryan T. Hardee

(57) ABSTRACT

Apparatus and methods for processing a glass sheet can include a coating chamber including a dispensing port to dispense a coating on a major surface of the glass sheet. In some embodiments, an apparatus can include a fog chamber including an enclosure, a fog generator to provide fog to the enclosure, and a passage in the enclosure from which fog can exit the enclosure to contact a major surface of the glass sheet. In some embodiments a method can include providing
(Continued)

a glass sheet to a coating chamber, and dispensing a coating on a major surface of the glass sheet. In some embodiments, a method can include providing a glass sheet to a fog chamber, providing fog to an enclosure of the fog chamber, and contacting a major surface of the glass sheet with the fog by passing the fog from the enclosure through a passage in the enclosure.

16 Claims, 20 Drawing Sheets

Related U.S. Application Data on Jun. 6, 2016, provisional application No. 62/279,194, filed on Jan. 15, 2016, provisional application No. 62/208,348, filed on Aug. 21, 2015.

(51) Int. Cl.
| | |
|---|---|
| C03C 17/28 | (2006.01) |
| C03C 17/00 | (2006.01) |
| C03B 17/06 | (2006.01) |
| C03B 33/02 | (2006.01) |
| C03B 33/033 | (2006.01) |
| C03B 33/09 | (2006.01) |
| C09D 5/00 | (2006.01) |
| B24B 27/00 | (2006.01) |
| B24B 55/04 | (2006.01) |
| B24B 9/10 | (2006.01) |
| B24D 7/18 | (2006.01) |
| B24D 7/10 | (2006.01) |
| B24D 7/02 | (2006.01) |

(52) U.S. Cl.
CPC .......... *B24B 27/0076* (2013.01); *B24B 55/04* (2013.01); *B24D 7/02* (2013.01); *B24D 7/10* (2013.01); *B24D 7/18* (2013.01); *C03B 17/064* (2013.01); *C03B 33/0215* (2013.01); *C03B 33/033* (2013.01); *C03B 33/093* (2013.01); *C03C 17/002* (2013.01); *C09D 5/008* (2013.01); *B24B 9/10* (2013.01); *B65G 2249/04* (2013.01); *C03B 17/067* (2013.01); *C03C 2217/78* (2013.01); *C03C 2218/112* (2013.01); *C03C 2218/15* (2013.01); *C03C 2218/153* (2013.01); *C03C 2218/355* (2013.01); *C03C 2218/365* (2013.01)

(56) References Cited

U.S. PATENT DOCUMENTS

| | | | |
|---|---|---|---|
| 3,677,729 A | * | 7/1972 | Plumat .................... C03B 27/03 65/30.14 |
| 3,689,304 A | | 9/1972 | Bamford |
| 3,725,024 A | * | 4/1973 | Sperry .................... C03B 35/20 65/114 |
| 4,655,810 A | | 4/1987 | Van Cauter et al. |
| 4,871,105 A | | 10/1989 | Fisher et al. |
| 4,991,542 A | | 2/1991 | Kohmura et al. |
| 5,547,129 A | * | 8/1996 | Fortunato ............. B05B 7/0884 239/132.3 |
| 5,882,368 A | | 3/1999 | Falcony-Guajardo et al. |
| 6,168,663 B1 | * | 1/2001 | McDonald .......... H05K 3/0085 118/314 |
| 6,397,776 B1 | | 6/2002 | Yang et al. |
| 7,410,528 B2 | | 8/2008 | Rae et al. |
| 8,642,120 B2 | | 2/2014 | Rajala et al. |
| 9,327,299 B2 | | 8/2016 | Asikkala |
| 2003/0072881 A1 | | 4/2003 | Yang et al. |
| 2007/0148463 A1 | | 6/2007 | Winther-Jensen |
| 2011/0200763 A1 | | 8/2011 | Tixhon et al. |
| 2013/0071551 A1 | | 3/2013 | Rajala et al. |
| 2014/0099451 A1 | | 4/2014 | Mahieu et al. |
| 2014/0370715 A1 | | 12/2014 | Chung et al. |
| 2015/0246839 A1 | * | 9/2015 | Leveque ................. C03B 25/08 65/106 |
| 2016/0136846 A1 | | 5/2016 | Abramov et al. |
| 2016/0177599 A1 | | 6/2016 | Nozawa et al. |

FOREIGN PATENT DOCUMENTS

| | | |
|---|---|---|
| JP | 59055368 A | 3/1984 |
| JP | 2014117693 A | 6/2014 |
| WO | 2009080893 A1 | 7/2009 |
| WO | 2009122004 A1 | 10/2009 |
| WO | 2011080397 A1 | 7/2011 |
| WO | 2012120194 A1 | 9/2012 |
| WO | 2015033027 A1 | 3/2015 |
| WO | 201664950 A1 | 4/2016 |

OTHER PUBLICATIONS

Invitation to Pay Additional Fees of the International Searching Authority; PCT/US2016/047766; dated Oct. 26, 2016; 8 Pages; European Patent Office.

* cited by examiner

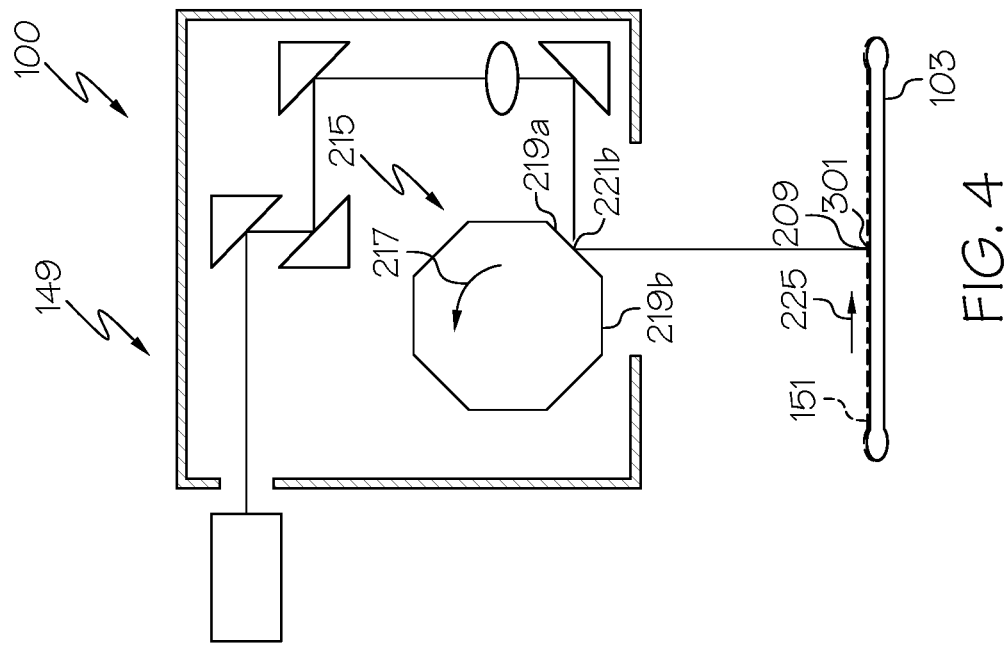
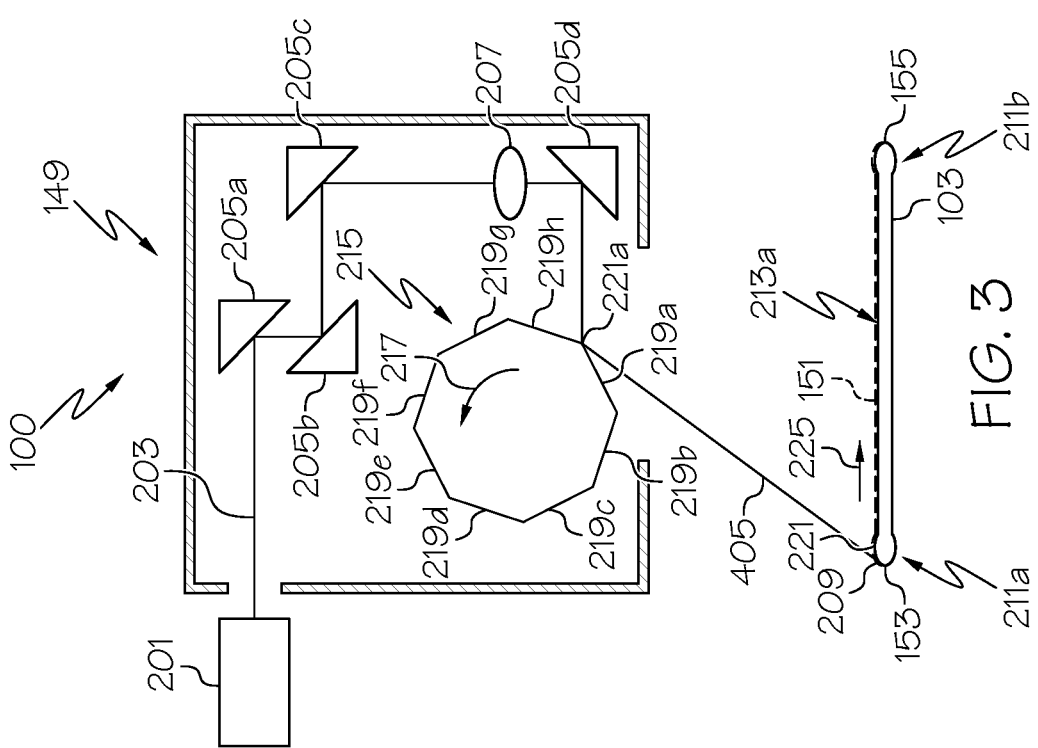

METHODS AND APPARATUS FOR PROCESSING GLASS

CROSS-REFERENCE TO RELATED APPLICATIONS

This application claims the benefit of priority under 35 U.S.C. § 371 of International Patent Application Serial No. PCT/US16/47766, filed on Aug. 19, 2016, which in turn, claims the benefit of priority of U.S. Provisional Patent Application Ser. No. 62/346,200 filed on Jun. 6, 2016 and U.S. Provisional Patent Application Ser. No. 62/208,348 filed on Aug. 21, 2015, the contents of each of which are relied upon and incorporated herein by reference in their entireties.

BACKGROUND

It is known to process glass to achieve one or more glass sheets with desired characteristics. It is further known to package the one or more glass sheets for shipment to a customer for further processing.

SUMMARY

The following presents a simplified summary of the disclosure in order to provide a basic understanding of some exemplary embodiments described in the detailed description.

The present disclosure relates generally to methods and apparatus for processing glass and, more particularly, to methods and apparatus for processing a glass ribbon to achieve a glass sheet with desired characteristics.

In some embodiments, an apparatus for processing a glass sheet can include a coating chamber including a dispensing port oriented to dispense a coating on at least one major surface of the glass sheet.

In some embodiments, the dispensing port can include a plasma deposition port oriented to dispense plasma to coat the at least one major surface of the glass sheet.

In some embodiments, an apparatus for processing a glass sheet can include a coating chamber including a first plurality of dispensing ports and a second plurality of dispensing ports. Each of the first plurality of dispensing ports can be oriented to dispense a coating on a first major surface of the glass sheet, and each of the second plurality of dispensing ports can be oriented to dispense a coating on a second major surface of the glass sheet.

In some embodiments, each of the first plurality of dispensing ports can include a plasma deposition port oriented to dispense plasma to coat the first major surface of the glass sheet, and each of the second plurality of dispensing ports can include a plasma deposition port oriented to dispense plasma to coat the second major surface of the glass sheet.

In some embodiments, a method of processing a glass sheet can include providing a glass sheet to a coating chamber and dispensing a coating on at least one major surface of the glass sheet.

In some embodiments, the coating chamber can include a dispensing port from which the coating can be dispensed.

In some embodiments, the coating can provide a protective layer on the at least one major surface of the glass sheet.

In some embodiments, the coating can be coated on the at least one major surface by plasma deposition.

In some embodiments, the coating can include a polymer.

In some embodiments, a method of processing a glass sheet can include providing a glass sheet to a coating chamber, dispensing a coating on a first major surface of the glass sheet, and dispensing a coating on a second major surface of the glass sheet.

In some embodiments, the coating chamber can include a first plurality of dispensing ports from which the coating can be dispensed on the first major surface of the glass sheet and a second plurality of dispensing ports from which the coating can be dispensed on the second major surface of the glass sheet.

In some embodiments, the coating can provide a protective layer on the first major surface and the second major surface of the glass sheet.

In some embodiments, the coating can be coated on the first major surface and the second major surface by plasma deposition.

In some embodiments, the coating can include a polymer.

In some embodiments, an apparatus for processing a glass sheet can include a fog chamber comprising an enclosure. A fog generator can provide fog to the enclosure. The apparatus can include a passage in the enclosure from which fog can exit the enclosure to contact at least one major surface of the glass sheet.

In some embodiments, a conveyor can define a travel path extending along the passage, and the conveyor can be oriented to traverse the glass sheet along the travel path.

In some embodiments, the passage can include a slot nozzle, where fog can exit the enclosure through the slot nozzle to contact the at least one major surface of the glass sheet.

In some embodiments, the slot nozzle can include a plurality of elongated apertures spaced apart along a travel path extending along the passage.

In some embodiments, the passage can include a diffuser nozzle, where fog can exit the enclosure through the diffuser nozzle to contact the at least one major surface of the glass sheet.

In some embodiments, the diffuser nozzle can include a plurality of apertures through which fog can pass.

In some embodiments, the fog chamber can include an inlet defining an inlet pathway extending from an exterior of the fog chamber to an interior of the fog chamber. In some embodiments, the inlet can be oriented to receive the glass sheet to pass along the inlet pathway from the exterior of the fog chamber to the interior of the fog chamber.

In some embodiments, the apparatus can further include a door to selectively block the inlet.

In some embodiments, an apparatus for processing a glass sheet can include a fog chamber comprising a first enclosure and a second enclosure. In some embodiments, the apparatus can include a fog generator to provide fog to the first enclosure and the second enclosure. The apparatus can include a first passage in the first enclosure from which fog can exit the first enclosure to contact a first major surface of the glass sheet. The apparatus can include a second passage in the second enclosure from which fog can exit the second enclosure to contact a second major surface of the glass sheet.

In some embodiments, the first passage can face the second passage.

In some embodiments, the first passage can be spaced a predetermined distance from the second passage, and the predetermined distance can define a travel path for the glass sheet.

In some embodiments, the apparatus can include a conveyor oriented to traverse the glass sheet along the travel path between the first passage and the second passage.

In some embodiments, the first passage can include a first slot nozzle, where fog can exit the first enclosure through the first slot nozzle to contact the first major surface of the glass sheet. In some embodiments, the second passage can include a second slot nozzle, where fog can exit the second enclosure through the second slot nozzle to contact the second major surface of the glass sheet.

In some embodiments, each of the first slot nozzle and the second slot nozzle can include a plurality of elongated apertures spaced apart along a travel path extending along the first passage and the second passage laterally between the first passage and the second passage.

In some embodiments, the first passage can include a first diffuser nozzle, where fog can exit the first enclosure through the first diffuser nozzle to contact the first major surface of the glass sheet. In some embodiments, the second passage can include a second diffuser nozzle, where fog can exit the second enclosure through the second diffuser nozzle to contact the second major surface of the glass sheet.

In some embodiments, each of the first diffuser nozzle and the second diffuser nozzle can include a plurality of apertures through which fog can pass.

In some embodiments, the fog chamber can include an inlet defining an inlet pathway extending from an exterior of the fog chamber to an interior of the fog chamber. In some embodiments, the inlet can be oriented to receive the glass sheet to pass along the inlet pathway from the exterior of the fog chamber to the interior of the fog chamber.

In some embodiments, the apparatus can include an inlet door to selectively block the inlet.

In some embodiments, the first passage can face the second passage, the first passage can be spaced a predetermined distance from the second passage, and the predetermined distance can define a travel path for the glass sheet.

In some embodiments, the fog chamber can include an outlet defining an outlet pathway extending from the interior of the fog chamber to the exterior of the fog chamber. In some embodiments, the outlet can be oriented to receive the glass sheet to travel along the outlet pathway from the interior of the fog chamber to the exterior of the fog chamber.

In some embodiments, the apparatus can include an outlet door to selectively block the outlet.

In some embodiments, the first passage can face the second passage, the first passage can be spaced a predetermined distance from the second passage, and the predetermined distance can define a travel path for the glass sheet.

In some embodiments, the apparatus can include an inlet door to selectively block the inlet and an outlet door to selectively block the outlet.

In some embodiments, a method of processing a glass sheet can include providing a glass sheet to a fog chamber and providing fog to an enclosure of the fog chamber. In some embodiments, the method can include contacting at least one major surface of the glass sheet with the fog by passing the fog from the enclosure through a passage in the enclosure.

In some embodiments, the method can include conveying the glass sheet along a travel path extending along the passage.

In some embodiments, the passage can include a slot nozzle including an elongated aperture. In some embodiments, the method can include contacting the at least one major surface of the glass sheet by passing the fog from the enclosure through the elongated aperture of the slot nozzle.

In some embodiments, the passage can include a diffuser nozzle including a plurality of apertures. In some embodiments, the method can include contacting the at least one major surface of the glass sheet by passing the fog from the enclosure through the plurality of apertures of the diffuser nozzle.

In some embodiments, the method can include traversing the glass sheet along an inlet pathway from an exterior of the fog chamber to an interior of the fog chamber.

In some embodiments, the method can include opening a door that selectively blocks the inlet, traversing the glass sheet along an inlet pathway from an exterior of the fog chamber to an interior of the fog chamber, and then closing the door to block the inlet.

In some embodiments, a method of processing a glass sheet can include providing a glass sheet to a fog chamber and providing fog to a first enclosure of the fog chamber and to a second enclosure of the fog chamber. In some embodiments, the method can include contacting a first major surface of the glass sheet with the fog by passing the fog from the first enclosure through a first passage in the first enclosure. In some embodiments, the method can include contacting a second major surface of the glass sheet with the fog by passing the fog from the second enclosure through a second passage in the second enclosure.

In some embodiments, the method can include conveying the glass sheet along a travel path extending along the first passage and the second passage laterally between the first passage and the second passage.

In some embodiments, the first passage can face the second passage and the first passage can be spaced a predetermined distance from the second passage.

In some embodiments, the first passage can include a first slot nozzle including a first elongated aperture and the second passage can include a second slot nozzle including a second elongated aperture. In some embodiments, the method can include contacting the first major surface of the glass sheet by passing the fog from the first enclosure through the first elongated aperture of the first slot nozzle. In some embodiments, the method can include contacting the second major surface of the glass sheet by passing the fog from the second enclosure through the second elongated aperture of the second slot nozzle.

In some embodiments, the first passage can include a first diffuser nozzle including a first plurality of apertures and the second passage can include a second diffuser nozzle including a second plurality of apertures. In some embodiments, the method can include contacting the first major surface of the glass sheet by passing the fog from the first enclosure through the first plurality of apertures of the first diffuser nozzle. In some embodiments, the method can include contacting the second major surface of the glass sheet by passing the fog from the second enclosure through the second plurality of apertures of the second diffuser nozzle.

In some embodiments, the method can include traversing the glass sheet along an inlet pathway from an exterior of the fog chamber to an interior of the fog chamber.

In some embodiments, the method can include traversing the glass sheet along an outlet pathway from the interior of the fog chamber to the exterior of the fog chamber.

In some embodiments, the method can include opening an inlet door that selectively blocks the inlet of the fog chamber, traversing the glass sheet along the inlet pathway from the exterior of the fog chamber to the interior of the fog chamber, and then closing the inlet door to block the inlet.

In some embodiments, the method can also include opening an outlet door that selectively blocks the outlet of the fog chamber, traversing the glass sheet along the outlet pathway from the interior of the fog chamber to the exterior of the fog chamber, and then closing the outlet door to block the outlet.

In some embodiments, the methods can be carried out with the glass sheet in a vertical orientation.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

BRIEF DESCRIPTION OF THE DRAWINGS

These and other features, aspects, and advantages of the present disclosure can be further understood when read with reference to the accompanying drawings:

FIG. 3 is a cross sectional schematic view of an exemplary glass separator along line 3-3 of FIG. 1, wherein a laser beam is exposing a first end location of a path on the glass ribbon;

FIG. 4 illustrates the laser beam exposing an intermediate location of the path on the glass ribbon;

DETAILED DESCRIPTION

Figure 1:
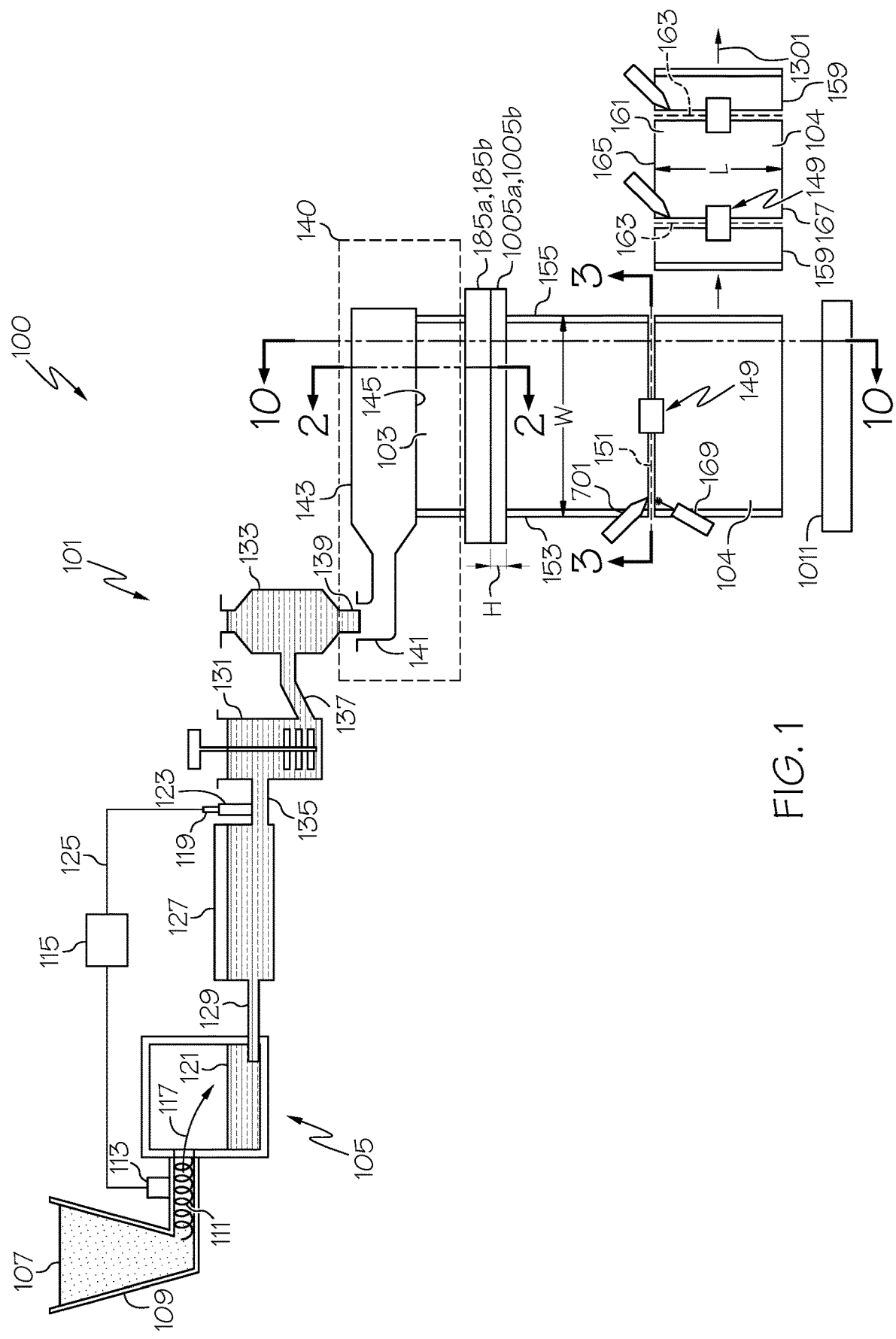
FIG. 1 is a schematic view of a glass processing apparatus including a fusion down-draw apparatus to draw a glass ribbon.

Apparatus and methods will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

Glass sheets are commonly fabricated by flowing molten glass to a forming body whereby a glass ribbon may be formed by a variety of ribbon forming processes including, float, slot draw, down-draw, fusion down-draw, up-draw, or any other forming processes. The glass ribbon from any of these processes may then be subsequently divided to provide one or more glass sheets suitable for further processing into a desired application, including but not limited to, a display application. For example, the one or more glass sheets can be used in a variety of display applications, including liquid crystal displays (LCDs), electrophoretic displays (EPD), organic light emitting diode displays (OLEDs), plasma display panels (PDPs), or the like. Glass sheets may be transported from one location to another. The glass sheets may be transported with a conventional support frame designed to secure a stack of glass sheets in place. Moreover, interleaf material can be placed between each adjacent glass sheet to help prevent contact between, and therefore preserve, the pristine surfaces of the glass sheets.

It is to be understood that specific embodiments disclosed herein are intended to be exemplary and therefore non-limiting. As such, the present disclosure relates to methods and apparatus for processing at least one of a glass ribbon and a glass sheet. In some embodiments, the glass ribbon to be processed can be formed from a glass manufacturing apparatus, can be provided as it is being formed from a glass manufacturing apparatus, can be provided from a spool of previously-formed glass ribbon that can be uncoiled from the spool, or can be provided as a freestanding glass ribbon. In some embodiments, the glass sheet to be processed can be formed by a glass manufacturing apparatus, can be provided as a glass sheet separated from a glass ribbon, can be provided as a glass sheet separated from another glass sheet, can be provided as a glass sheet uncoiled from a spool of glass sheets, can be provided as a glass sheet obtained from a stack of glass sheets, or can be provided as a freestanding glass sheet.

Methods and apparatus for processing at least one of a glass ribbon and a glass sheet will now be described by way of exemplary embodiments including an embodiment for processing a glass ribbon formed from a glass manufacturing apparatus and an embodiment for processing a glass sheet separated from the glass ribbon. Other embodiments of processing at least one of a glass ribbon and a glass sheet are also described with the understanding that, with respect to at least some embodiments, similar or identical techniques may also be applied to process any one or more of the exemplary glass ribbons and glass sheets discussed above.

The present disclosure provides for processing at least one of a glass ribbon 103 and a glass sheet 104 to achieve desirable attributes. In some embodiments, the glass sheet 104 can be separated from the glass ribbon 103. In addition, the present disclosure provides exemplary glass processing apparatus, including the glass processing apparatus 100 and glass processing method 2100 (see FIG. 25) schematically illustrated in FIGS. 1-25 that may be used to process the glass ribbon 103 and the glass sheet 104 in accordance with embodiments of the present disclosure. As shown, the glass processing apparatus 100 can include multiple exemplary processing stations that may be used individually or in combination with one another. As shown, the processing stations may be arranged in series with one another to process at least one of the glass ribbon 103 and the glass sheet 104 to provide desirable attributes. Moreover, it may be desirable to further process the glass ribbon 103 or the glass sheet 104 (e.g., by a customer further processing the glass sheet 104 for a display application). In some embodiments, methods and apparatus provided herein can help to prevent debris from coming into contact with and contaminating the glass ribbon 103 and the glass sheet 104, thus preserving the pristine characteristics of the glass ribbon 103 and the glass sheet 104 that may be desirable for various display applications.

Figure 10:
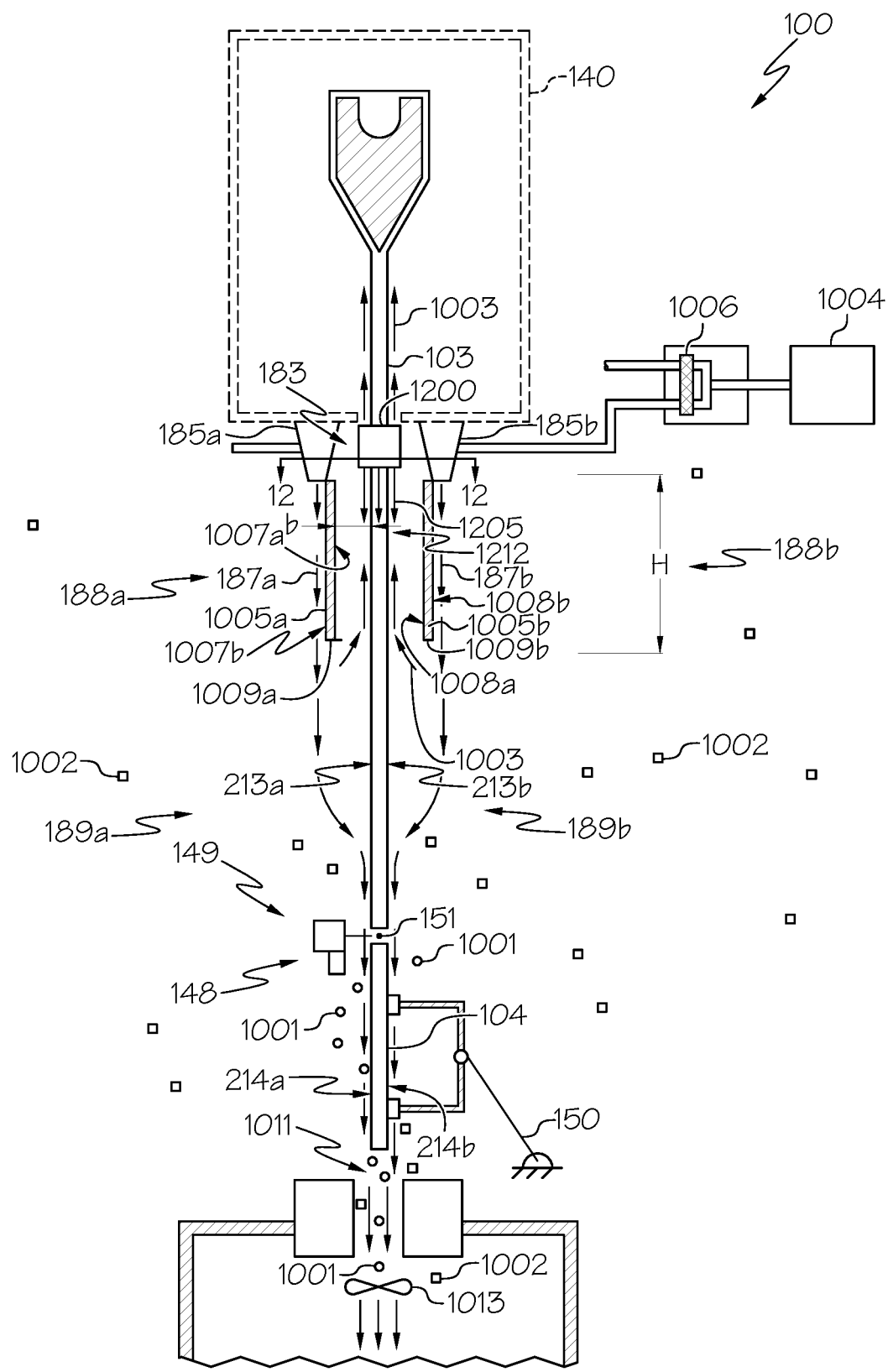
FIG. 10 is a cross-sectional view of the fusion down-draw apparatus along line 10-10 of FIG. 1 illustrating a glass separator positioned at a downstream location.

For explanatory purposes, two types of debris related to the glass processing apparatus 100 will be now be described with the understanding that other types of debris may exist and are to be considered within the scope of the present disclosure. Referring to FIG. 10, separation debris 1001 can include debris associated with the glass separator 149 and produced before, during, or after a separation process with the glass separator 149 under any type of operating conditions of the glass processing apparatus 100. In some embodiments, separation debris 1001 can include glass shards and glass chips that are created when the glass ribbon 103 is scored as well as glass shards and glass chips that can break off from the glass ribbon 103 when the glass ribbon 103 is separated with the glass separator 149. Separation debris 1001 can also include particles and other contaminants emanating from the glass separator 149 and its related components, such as mechanical dust, lubricants, particulates, fibers, and any other type of debris. In some embodiments, separation debris 1001 can also include glass shards and glass chips that break off from the glass ribbon 103 when the glass ribbon 103 unexpectedly breaks, cracks, or shatters as a result of, for example, a processing malfunction. Environmental debris 1002 can include debris from the environment surrounding the glass ribbon 103 such as glass, glass particles, glass shards, glass chips, particulates, fibers, dust, human contaminants, and any other type of debris. In some embodiments, environmental debris 1002 can include dust and other particles that are liberated from the floor or other nearby structures within the environment where the glass processing apparatus 100 is situated. Such environmental debris 1002 can become airborne when subjected to an airflow, such as a draft, a breeze, an air stream from the glass processing apparatus 100, or when stirred up by a person (e.g., technician, operator), machine or other cause. Similarly, environmental debris 1002 can originate from a storage container within the environment that can be used to hold glass particulates, including a vacuum port 1011 oriented to receive separation debris 1001. Environmental debris 1002 can also include particulates, such as fibers from clothing, dust, and other contaminates introduced into the environment from a person (e.g., technician, operator, or other source). Apparatus and methods provided herein can isolate the glass ribbon 103 and the glass sheet 104 from exposure to and contact with at least one of separation debris 1001 and environmental debris 1002.

In addition, processing at least one of the glass ribbon 103 and the glass sheet 104 quickly with the glass processing apparatus 100 can result in a high production rate of at least one of the glass ribbon 103 and the glass sheet 104. Also, processing at least one of the glass ribbon 103 and the glass sheet 104 quickly can help prevent debris (e.g., separation debris 1001, environmental debris 1002) from adhering to the pristine surfaces of the at least one of the glass ribbon 103 and the glass sheet 104. Indeed, debris landing on a major surface (e.g., first major surface 213a, second major surface 213b) of the glass ribbon 103 and a major surface (e.g., first major surface 214a, second major surface 214b) of the glass sheet 104 can more securely bond to the major surface(s) 214a, 214b the longer the debris is in contact with the major surface(s) 214a, 214b. Consequently, increasing the speed that the at least one of the glass ribbon 103 and the glass sheet 104 moves from station to station can allow for debris residing on the major surfaces 213a, 213b of the glass ribbon 103 and the major surfaces 214a, 214b of the glass sheet 104 to be quickly removed, thereby avoiding strong bonding that may otherwise complicate removal of the debris at a later time. For example, if one station produces debris (e.g., a glass separating station that separates the glass sheet 104 from the glass ribbon 103, producing separation debris 1001), the glass sheet 104 can be quickly moved from that station to, for example, a washing station within about 1 second to about 20 seconds, such as from about 1 second to about 15 seconds, where the debris can be removed from the glass sheet 104.

While exemplary orders of the processing stations are illustrated, in some embodiments, the processing stations may be arranged in a different order. In some embodiments, the glass processing apparatus 100 may include more processing stations than the exemplary illustrated processing stations. In some embodiments, the glass processing apparatus 100 may include less processing stations than the exemplary illustrated processing stations. Moreover, in some embodiments, a single processing station may be provided that can be used to process at least one of the glass ribbon 103 and the glass sheet 104, either alone, or in combination with any one or more other processing stations.

In some embodiments, the glass processing apparatus 100 provides the glass ribbon 103 with a glass manufacturing apparatus 101 such as a slot draw apparatus, float bath apparatus, down-draw apparatus, up-draw apparatus, press-rolling apparatus, or other glass ribbon manufacturing apparatus. FIG. 1 schematically illustrates the glass manufacturing apparatus 101 including a fusion down-draw apparatus 101 for fusion drawing the glass ribbon 103 for subsequent processing into glass sheets 104.

The fusion down-draw apparatus 101 can include a melting vessel 105 oriented to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The fusion down-draw apparatus 101 can also include a fining vessel 127 located downstream from the melting vessel 105 and coupled to the melting vessel 105 by way of a first connecting conduit 129. In some embodiments, molten material 121 may be gravity fed from the melting vessel 105 to the fining vessel 127 by way of the first connecting conduit 129. For example, gravity may act to drive the molten material 121 to pass through an interior pathway of the first connecting conduit 129 from the melting vessel 105 to the fining vessel 127. Within the fining vessel 127, bubbles may be removed from the molten material 121 by various techniques.

The fusion down-draw apparatus 101 can further include a mixing chamber 131 that may be located downstream from the fining vessel 127. The mixing chamber 131 can be used to provide a homogenous composition of molten material 121, thereby reducing or eliminating cords of inhomogeneity that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For example, gravity may act to drive the molten material 121 to pass through an interior pathway of the second connecting conduit 135 from the fining vessel 127 to the mixing chamber 131.

The fusion down-draw apparatus 101 can further include a delivery vessel 133 that may be located downstream from the mixing chamber 131. The delivery vessel 133 may condition the molten material 121 to be fed into a glass former 140. For example, the delivery vessel 133 can act as an accumulator and/or flow controller to adjust and provide a consistent flow of molten material 121 to the glass former 140. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For example, gravity may act to drive the molten material 121 to pass through an interior pathway of the third connecting conduit 137 from the mixing chamber 131 to the delivery vessel 133.

As further illustrated, a delivery pipe 139 can be positioned to deliver molten material 121 to the glass former 140 of the fusion down-draw apparatus 101. As discussed more fully below, the glass former 140 may draw the molten material 121 into the glass ribbon 103 off of a root 145 of a forming vessel 143. In the illustrated embodiment, the forming vessel 143 can include an inlet 141 oriented to receive molten material 121 from the delivery pipe 139 of the delivery vessel 133.

Figure 2:
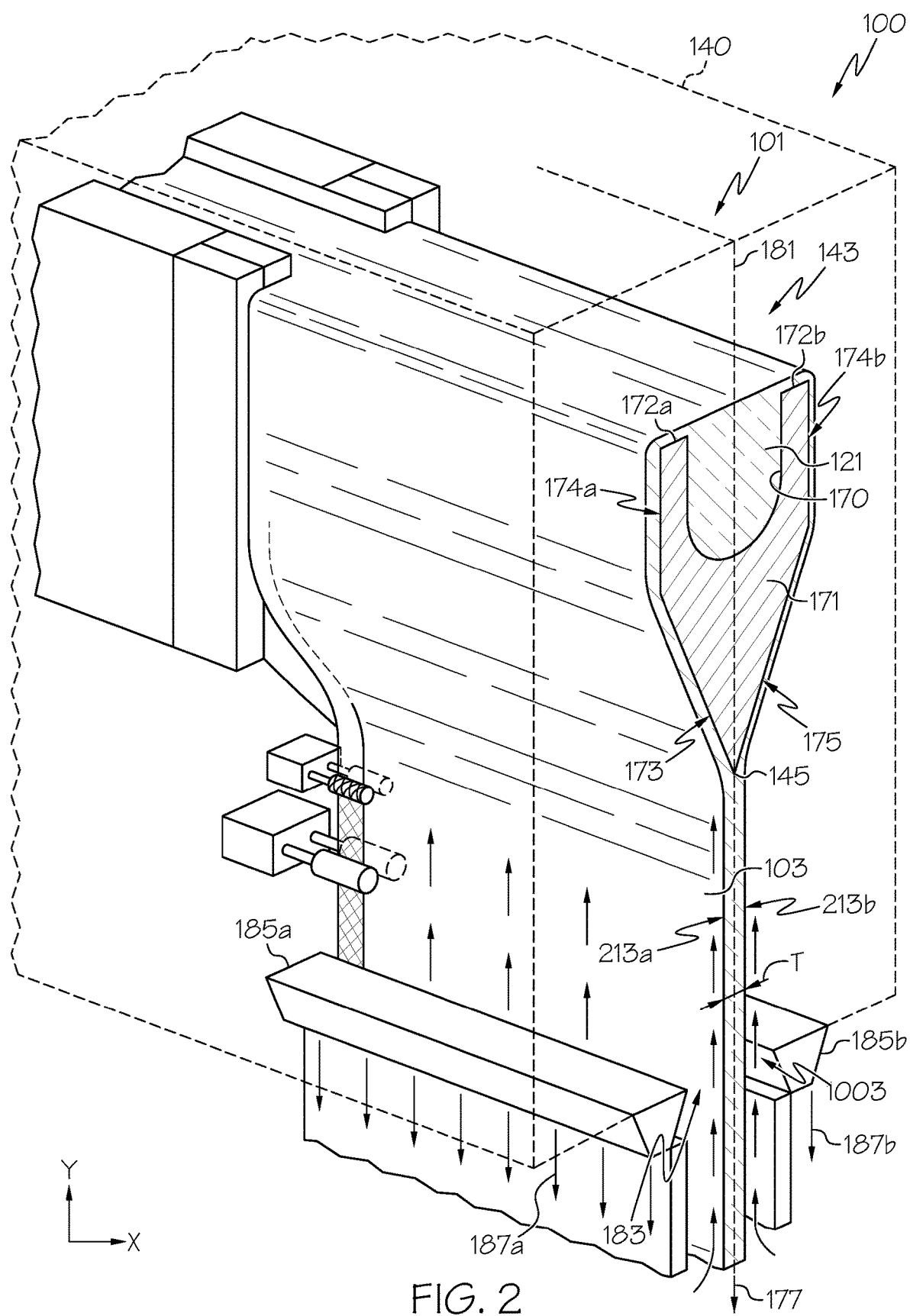
FIG. 2 is a cross-sectional perspective view of the fusion down-draw apparatus along line 2-2 of FIG. 1.

FIG. 2 is a cross-sectional perspective view of the fusion down-draw apparatus 101 along line 2-2 of FIG. 1. As shown, the forming vessel 143 can include a trough 170 oriented to receive the molten material 121 from the inlet 141. The forming vessel 143 can further include a forming wedge 171 including a pair of downwardly inclined converging surface portions 173, 175 extending between opposed ends of the forming wedge 171. The pair of downwardly inclined converging surface portions 173, 175 converge along a draw direction 177 to form the root 145. A draw plane 181 extends through the root 145 wherein the glass ribbon 103 may be drawn in the draw direction 177 along the draw plane 181. As shown, the draw plane 181 can bisect the root 145 although the draw plane 181 may extend at other orientations relative to the root 145.

Referring to FIG. 2, in some embodiments, the molten material 121 can flow from the inlet 141 into the trough 170 of the forming vessel 143. The molten material 121 can then overflow from the trough 170 by simultaneously flowing over corresponding weirs 172a, 172b and downward over the outer surfaces 174a, 174b of the corresponding weirs 172a, 172b. Respective streams of molten material 121 then flow along the downwardly inclined converging surface portions 173, 175 of the forming wedge 171 to be drawn off the root 145 of the forming vessel 143, where the flows converge and fuse into the glass ribbon 103. The glass ribbon 103 may then be fusion drawn off the root 145 in the draw plane 181 along draw direction 177 where the glass sheet 104 may then be subsequently separated from the glass ribbon 103.

As shown in FIG. 2, the glass processing apparatus 100 can include the glass former 140 to draw the glass ribbon 103 from the quantity of molten material 121 in the draw direction 177 along the draw plane 181 of the glass former 140. The glass ribbon 103 may be drawn from the root 145 with a first major surface 213a of the glass ribbon 103 and a second major surface 213b of the glass ribbon 103. As shown, the first major surface 213a of the glass ribbon 103 and the second major surface 213b of the glass ribbon 103 can face opposite directions and define a thickness "T" of the glass ribbon 103 that can be less than or equal to about 1 millimeter (mm), less than or equal to about 0.5 millimeters, less than or equal to about 500 micrometers (m), such as less than or equal to about 300 micrometers, such as less than or equal to about 200 micrometers, or such as less than or equal to about 100 micrometers, although other thicknesses may be used in some embodiments. In some embodiments, the thickness "T" of the glass ribbon 103 can be from about 100 micrometers to about 0.5 millimeters, from about 300 micrometers to about 0.4 millimeters, or from about 0.3 millimeters to about 500 micrometers, and all sub-ranges therebetween. In some embodiments, the thickness "T" of the glass ribbon 103 can be from about 50 micrometers to about 500 micrometers, such as from about 50 micrometers to about 300 micrometers, such as from about 50 micrometers to about 200 micrometers, such as from about 50 micrometers to about 100 micrometers, and all ranges and subranges therebetween. In some embodiments, the thickness "T" of the glass ribbon 103 can be greater than 1 millimeter, for example from about 1 millimeter to about 3 millimeters and all subranges therebetween. Regardless of the source or method of production, the glass ribbon 103 and the glass sheet 104 separated from the glass ribbon 103 can, in some embodiments, include a thickness within a range of from about 50 micrometers to 1000 micrometers, including all ranges and sub-ranges discussed above, although other thicknesses may be provided in some embodiments.

In some embodiments, a width "W" of the glass ribbon 103 can be greater than or equal to about 20 mm, such as greater than or equal to about 50 mm, such as greater than or equal to about 100 mm, such as greater than or equal to about 500 mm, such as greater than or equal to about 1000 mm, such as greater than or equal to about 2000 mm, such as greater than or equal to about 3000 mm, such as greater than or equal to about 4000 mm, although other widths less than or greater than the widths mentioned above can be provided in some embodiments.

In some embodiments, the width "W" of the glass ribbon 103 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

The glass ribbon 103 can include a variety of compositions including but not limited to soda-lime glass, borosilicate glass, alumino-borosilicate glass, an alkali-containing glass, or an alkali-free glass. In some embodiments, the glass ribbon 103 can include a coefficient of thermal expansion of ≤15 ppm/° C., ≤10 ppm/° C., or ≤5 ppm/° C., for example, from about 5 ppm/° C. to about 15 ppm/° C., such as from about 5 ppm/° C. to about 10 ppm/° C., and all ranges and subranges therebetween. In some embodiments, the glass ribbon 103 can include a speed as it traverses of ≥50 millimeters/second (mm/s), ≥100 mm/s, or ≥500 mm/s, for example, from about 50 mm/s to about 500 mm/s, such as from about 100 mm/s to about 500 mm/s, and all ranges and subranges therebetween.

Figure 13:
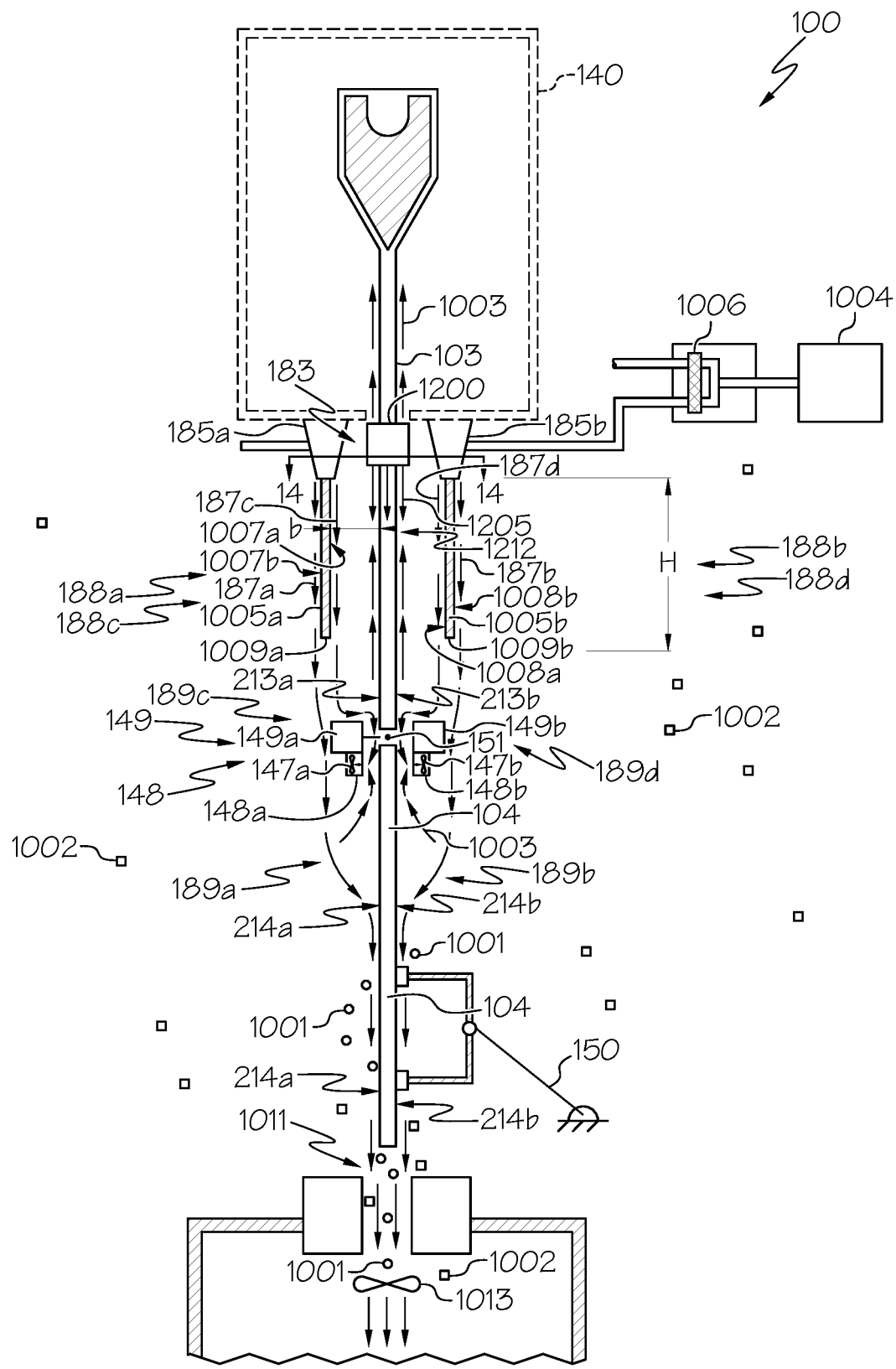
FIG. 13 is an exemplary embodiment of the fusion down-draw apparatus illustrated in FIG. 11.

The glass ribbon 103 can continue to be drawn off the root 145 in the draw direction 177 along the draw plane 181 until the glass ribbon 103 exits a lower opening 183 of the glass former 140. In some embodiments, the glass ribbon 103 can undergo an annealing process prior to exiting the lower opening 183 of the glass former 140. Once exiting the lower opening 183, the glass ribbon 103 can then eventually be separated into one or more glass sheets 104 by a glass separator 149. As shown, the glass separator 149 can be positioned downstream (e.g., along the draw direction 177, shown in FIG. 2) from the glass former 140 and oriented to separate the glass sheet 104 from the glass ribbon 103. A variety of glass separators 149 may be provided in embodiments of the present disclosure. For example, a traveling anvil machine may be provided that can score and then break the glass ribbon 103 along the score line. In some embodiments, for example as illustrated in FIG. 13, the glass separator 149 can include a first glass separator 149a facing the first major surface 213a of the glass ribbon 103 and a second glass separator 149b facing the second major surface 213b of the glass ribbon 103. In some embodiments, the first glass separator 149a and the second glass separator 149b can operate together to separate the glass sheet 104 from the glass ribbon 103 (e.g., along a transverse separation path 151 transverse to the draw direction 177 along a width "W" of the glass ribbon 103).

In some embodiments, the glass separator 149 can include a robot 150 (e.g., a robotic arm) oriented to bend the glass sheet 104 relative to the glass ribbon 103 to separate the glass sheet 104 from the glass ribbon 103 along the transverse separation path 151 corresponding to the score line. In some embodiments, a laser-assisted separation device may be provided as described below and also in co-pending U.S. application Ser. No. 14/547,688, filed Nov. 19, 2014, the entirety of which is incorporated herein by reference. Such laser-assisted separation devices can include, but are not limited to, laser scoring techniques that heat the glass ribbon 103 and then cool the glass ribbon 103 to create a vent in the glass ribbon 103 to separate the glass ribbon 103. Such laser-assisted separation devices may also include laser cutting techniques that heat the glass ribbon 103 to produce a stressed region in the glass ribbon 103 and then apply a defect to the stressed region of the glass ribbon 103 to initiate a crack to separate the glass ribbon 103. FIG. 1 illustrates a general schematic of an exemplary glass separator 149 wherein FIGS. 3-6, 8 and 9 schematically illustrate exemplary features of the glass separator 149. As illustrated, an exemplary glass separator 149 may separate the glass sheet 104 from the glass ribbon 103 along the transverse separation path 151 that extends along the width "W" of the glass ribbon 103, transverse to the draw direction 177 of the glass former 140, between a first vertical edge 153 of the glass ribbon 103 and a second vertical edge 155 of the glass ribbon 103.

In some embodiments, the glass separator 149 can separate an outer portion 159 of the glass sheet 104 from a central portion 161 of the glass sheet 104 along a vertical separation path 163 that extends along a length "L" between a first transverse edge 165 of the glass sheet 104 and a second transverse edge 167 of the glass sheet 104. As illustrated, such a technique can be carried out in a vertical orientation, although horizontal orientations may be provided in some embodiments. In some embodiments, a vertical orientation may facilitate the carrying away of glass particles by gravity, thereby reducing or preventing contamination of the otherwise pristine first major surface 213a of the glass ribbon 103 and the otherwise pristine second major surface 213b of the glass ribbon 103. In some embodiments, the glass separator 149 can include a vacuum 148, such as a chip vacuum system (schematically illustrated in FIGS. 10, 11 as vacuum 148 and FIG. 13 as vacuum 148 which can include, in some embodiments, a first vacuum 148a and a second vacuum 148b), that can operate within a localized area surrounding the glass separator 149 to remove separation debris 1001 from the localized area. In some embodiments, the vacuum 148 can be attached to the glass separator 149 and can traverse with the glass separator 149 as the glass separator 149 may move relative to the glass ribbon 103 to separate the glass ribbon 103. As shown in FIG. 13, in some embodiments the first vacuum 148a can be positioned facing the first major surface 213a of the glass ribbon 103 and the first major surface 214a of the glass sheet 104 and the second vacuum 148b can be positioned facing the second major surface 213b of the glass ribbon 103 and the second major surface 214b of the glass sheet 104. The at least one of the first vacuum 148a and the second vacuum 148b can operate within a localized area surrounding the glass separator 149 to remove separation debris 1001 from the localized area. In some embodiments, the at least one of the first vacuum 148a and the second vacuum 148b can be attached to the glass separator 149 and can traverse with the glass separator 149 as the glass separator 149 may move relative to the glass ribbon 103 to separate the glass ribbon 103.

FIG. 3 illustrates one embodiment of the glass separator 149 schematically illustrated in FIG. 1 with respect to separating the glass ribbon 103 along the transverse separation path 151. It is to be understood that, in some embodiments, the same or similar techniques can be employed to separate the glass ribbon 103 as well as any other glass ribbons along any path and to separate the glass sheet 104 as well as any other glass sheets along any path. The glass separator 149 can include a laser beam generator 201 configured to produce a laser beam 203. In some embodiments, the laser beam generator 201 and the laser beam 203 can include a $CO_2$ laser that can heat the transverse separation path 151 with relatively long pulses of laser light that may approximate a continuous flow of energy. As such, the laser beam 203 may be designed to heat the transverse separation path 151 on the glass ribbon 103 without damaging the glass ribbon 103. For purposes of this application, heating the transverse separation path 151 on the glass ribbon 103 without damaging the glass ribbon 103 is intended to mean heating the transverse separation path 151 without damaging the glass ribbon 103 in a manner that would otherwise result in separation of the glass ribbon 103 without application of a defect 703. Some embodiments of heating the transverse separation path 151 without damaging the glass ribbon 103 can include heating without melting the glass ribbon 103, heating without ablating the glass ribbon 103, heating without creating a full-body crack in the glass ribbon 103, and heating without scoring the glass ribbon 103. The laser beam 203 may avoid damaging the glass ribbon 103 to allow generation of a desired level of thermal stress along the transverse separation path 151 of the glass ribbon 103 without separating the glass ribbon 103 prior to application of the defect 703, as discussed below.

As further shown in FIG. 3, the glass separator 149 may further include a series of mirrors 205a, 205b, 205c, 205d and one or more optical lenses 207 configured to provide a desired beam profile and produce a laser beam spot 209 on a first outer edge portion 211a of the glass ribbon 103, a second outer edge portion 211b of the glass ribbon 103, or a major surface (e.g., the first major surface 213a, the second major surface 213b) of the glass ribbon 103. In some embodiments, the glass separator 149 can include a polygonal reflection device 215. The polygonal reflection device 215 can include the illustrated octagonal reflection device including eight mirrors 219a-h although other polygonal configurations may be provided in some embodiments with different numbers of mirrors.

Figure 6:
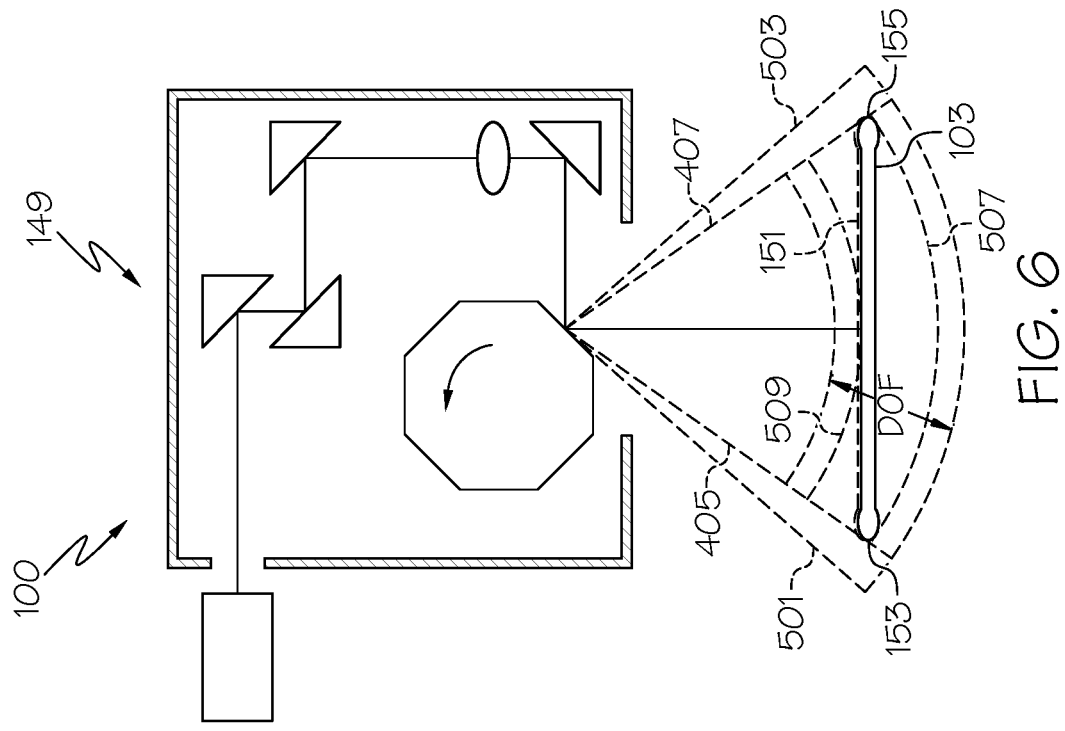
FIG. 6 illustrates the path on the glass ribbon being positioned within the depth of focus of the laser beam.
Figure 8:
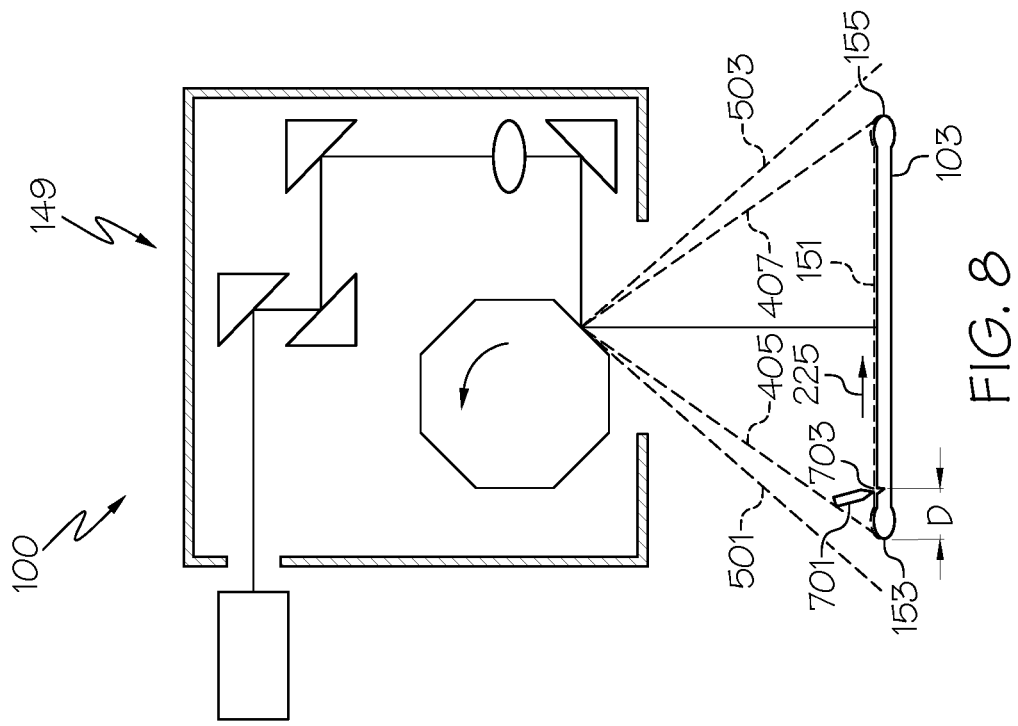
FIG. 8 illustrates creating a defect in the glass ribbon on the path.
Figure 7:
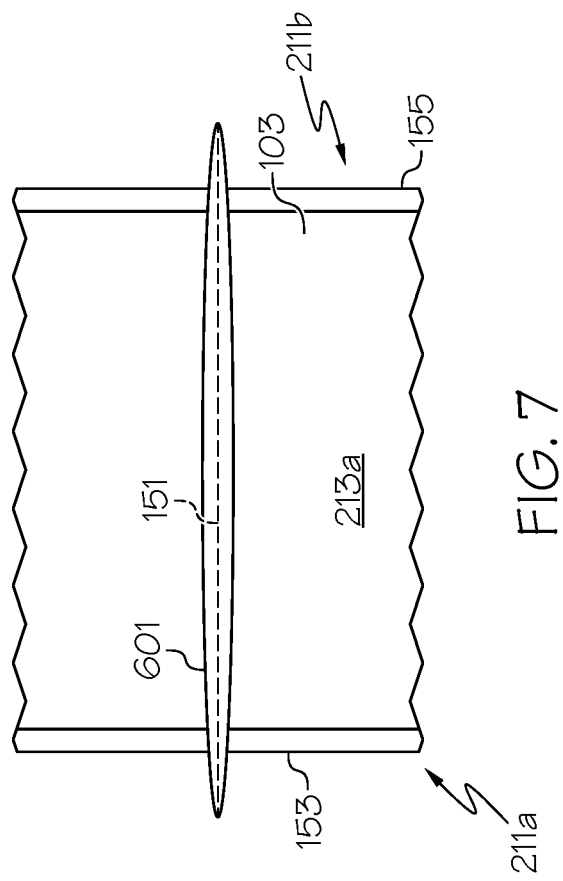
FIG. 7 is a side view of the glass ribbon of FIG. 6 illustrating a varying power density along the path of the glass ribbon.

In some embodiments, the method can include exposing the transverse separation path 151 along the glass ribbon 103 to the laser beam 203 by rotating the polygonal reflection device 215 in a clockwise or counterclockwise rotation. For example, as shown in FIGS. 3-6 and 8, the polygonal reflection device 215 may rotate in the counterclockwise direction 217 to sequentially position each of the eight mirrors 219a-h within the projected path of the laser beam 203. The illustrated rotation shown in the figures illustrates the principles of sweeping the laser beam 203. Actual configuration and/or rotation of the polygonal reflection device 215 can depend on a wide range of factors such as whether it is desired that the laser beam 203 sweeps between extreme positions from the first vertical edge 153 of the glass ribbon 103 to the second vertical edge 155 of the glass ribbon 103 or whether the laser beam sweeps off the glass ribbon 103 as shown in FIGS. 6-8.

As discussed below, the laser beam 203 can heat the transverse separation path 151 on the glass ribbon 103. Throughout the drawings, the transverse separation path 151 is schematically shown as a broken line, with the understanding that the actual path can be coincident with the glass ribbon 103 including coincident with the first outer edge portion 211a of the glass ribbon 103, the second outer edge portion 211b of the glass ribbon 103, and one or both of the major surfaces 213a, 213b of the glass ribbon 103. As shown in FIG. 3, in just one embodiment, the transverse separation path 151 can extend along the first outer edge portion 211a of the glass ribbon 103, the second outer edge portion 211b of the glass ribbon 103, and the first major surface 213a of the glass ribbon 103 facing the glass separator 149 from the first vertical edge 153 of the glass ribbon 103 to the second vertical edge 155 of the glass ribbon 103. In some embodiments, the transverse separation path 151 can extend along either of the first major surface 213a of the glass ribbon 103 or the second major surface 213b of the glass ribbon 103 as well as at an intermediate thickness between the first major surface 213a of the glass ribbon 103 and the second major surface 213b of the glass ribbon 103. Indeed, as shown, the transverse separation path 151 can extend coincident with outer surfaces of the first outer edge portion 211a of the glass ribbon 103 and the second outer edge portion 211b of the glass ribbon 103 and also extend coincident with the major surfaces 213a, 213b of the glass ribbon 103. Furthermore, as shown, the first outer edge portion 211a of the glass ribbon 103 can include the first vertical edge 153 of the glass ribbon 103 and the second outer edge portion 211b of the glass ribbon 103 can include the second vertical edge 155 of the glass ribbon 103 wherein the transverse separation path 151 can extend along a substantial portion of the width "W" of the glass ribbon 103 or along the entire width "W" of the glass ribbon 103. Likewise, referring to FIG. 1, the glass sheet 104 can include the first transverse edge 165 of the glass sheet 104 and the second transverse edge 167 of the glass sheet 104 wherein the vertical separation path 163 can extend along a substantial portion of the entire length "L" of the glass sheet 104 or along the entire length "L" of the glass sheet 104.

A non-limiting exemplary method of heating the transverse separation path 151 will now be discussed with the exemplary polygonal reflection device 215. As shown in FIG. 3, for example, as the first mirror 219a crosses the path of the laser beam 203, a first edge region 221a of the first mirror 219a initially crosses the path of the laser beam 203 to reflect the laser beam spot 209 and expose a first end location 221 of the transverse separation path 151 to the laser beam 203 along the glass ribbon 103. Indeed, as shown, the first end location 221 of the transverse separation path 151 can be exposed to the laser beam spot 209, thereby heating the transverse separation path 151 at that location. As the polygonal reflection device 215 rotates in the counterclockwise direction 217, the angle of the first mirror 219a, relative to the projected laser beam 203, changes such that the laser beam spot 209 travels along a sweep direction 225 extending from the first outer edge portion 211a of the glass ribbon 103 toward the second outer edge portion 211b of the glass ribbon 103.

FIG. 4 illustrates the polygonal reflection device 215 being rotated such that an intermediate portion 221b of the first mirror 219a subsequently crosses the path of the laser beam 203 to reflect the laser beam 203 and expose an intermediate location 301 of the transverse separation path 151 to the laser beam spot 209, thereby heating the transverse separation path 151 at that location.

Figure 5:
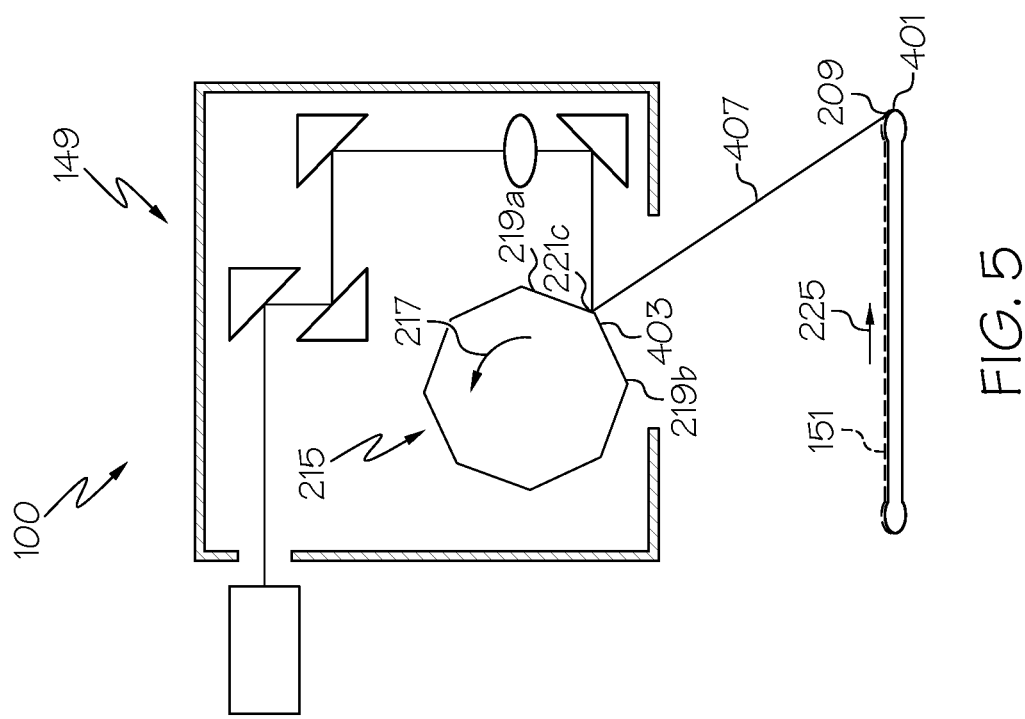
FIG. 5 illustrates the laser beam exposing a second end location of the path on the glass ribbon.

As further shown in FIG. 5, the polygonal reflection device 215 can be even further rotated in the counterclockwise direction 217 such that a second edge portion 221c of the first mirror 219a subsequently crosses the path of the laser beam 203 to reflect the laser beam 203 and expose a second end location 401 of the transverse separation path 151 to the laser beam spot 209, thereby heating the transverse separation path 151 at that location. A further incremental rotation in the counterclockwise direction 217 shown in FIG. 5, can cause a first edge region 403 of the second mirror 219b to cross the path of the laser beam 203, wherein the laser beam spot 209 can disappear from the second end location 401 of the transverse separation path 151 and reappear at the first end location 221 of the transverse separation path 151 as shown in FIG. 3. Of course, as the actual laser beam 203 produces a laser beam spot 209 with a finite diameter and not a single point, there may be a short moment in time where the laser beam spot 209 can simultaneously reflect from adjacent portions of adjacent mirrors. At such moment in time, the laser beam spot 209 can partially appear simultaneously at the outer extremes of the sweep path. For example, referring to FIG. 5, during a short period of time, the beam spot 209 can reflect simultaneously from the second edge portion 221c of the first mirror 219a and from the first edge region 403 of the second mirror 219b. At such moment in time, the beam spot 209 can partially appear at the location (e.g., second end location 401 of the transverse separation path 151) shown in FIG. 5 and partially appear at the location (e.g., first end location 221 of the transverse separation path 151) shown in FIG. 3.

As such, heating can include repeatedly passing the laser beam spot 209 along the transverse separation path 151 to produce thermal stress along the transverse separation path 151. Moreover, in the illustrated embodiment, repeatedly passing the laser beam spot 209 can optionally include repeatedly passing the laser beam spot 209 in the sweep direction 225. Indeed, as each of the mirrors 219a-h crosses the path of the laser beam 203 while the polygonal reflection device 215 rotates in the illustrated counterclockwise direction 217, the laser beam spot 209 can move in the sweep direction 225 from the first end location 221 of the transverse separation path 151 to the second end location 401 of the transverse separation path 151. The laser beam spot 209 can travel at various speeds along the sweep direction 225 depending on the rotational speed of the polygonal reflection device 215. In some embodiments, the laser beam spot 209 can travel from about 0.5 km/s to about 6 km/s, such as from about 1 km/s to about 5 km/s, such as from about 2 km/s to about 4 km/s such as about 3 km/s.

Although not shown, in some embodiments, the transverse separation path 151 may be heated in a wide variety of ways. For example, multiple laser beam generators 201 may be provided and/or the laser beam 203 produced by the laser beam generator 201 may be split into two or more laser beams to simultaneously reflect laser beams from different mirrors and/or from different portions of the same mirror of the polygonal reflection device 215. As such, multiple laser beam spots may be provided that travel simultaneously along the sweep direction 225 or along opposite directions depending on the optical configuration. In some embodiments, the laser beam 203 produced by the laser beam generator 201 may be extended into an elongated laser beam spot 209 configured to simultaneously heat the entire transverse separation path 151. In such embodiments, the laser beam spot 209 may remain stationary while simultaneously heating the entire transverse separation path 151.

Figure 9:
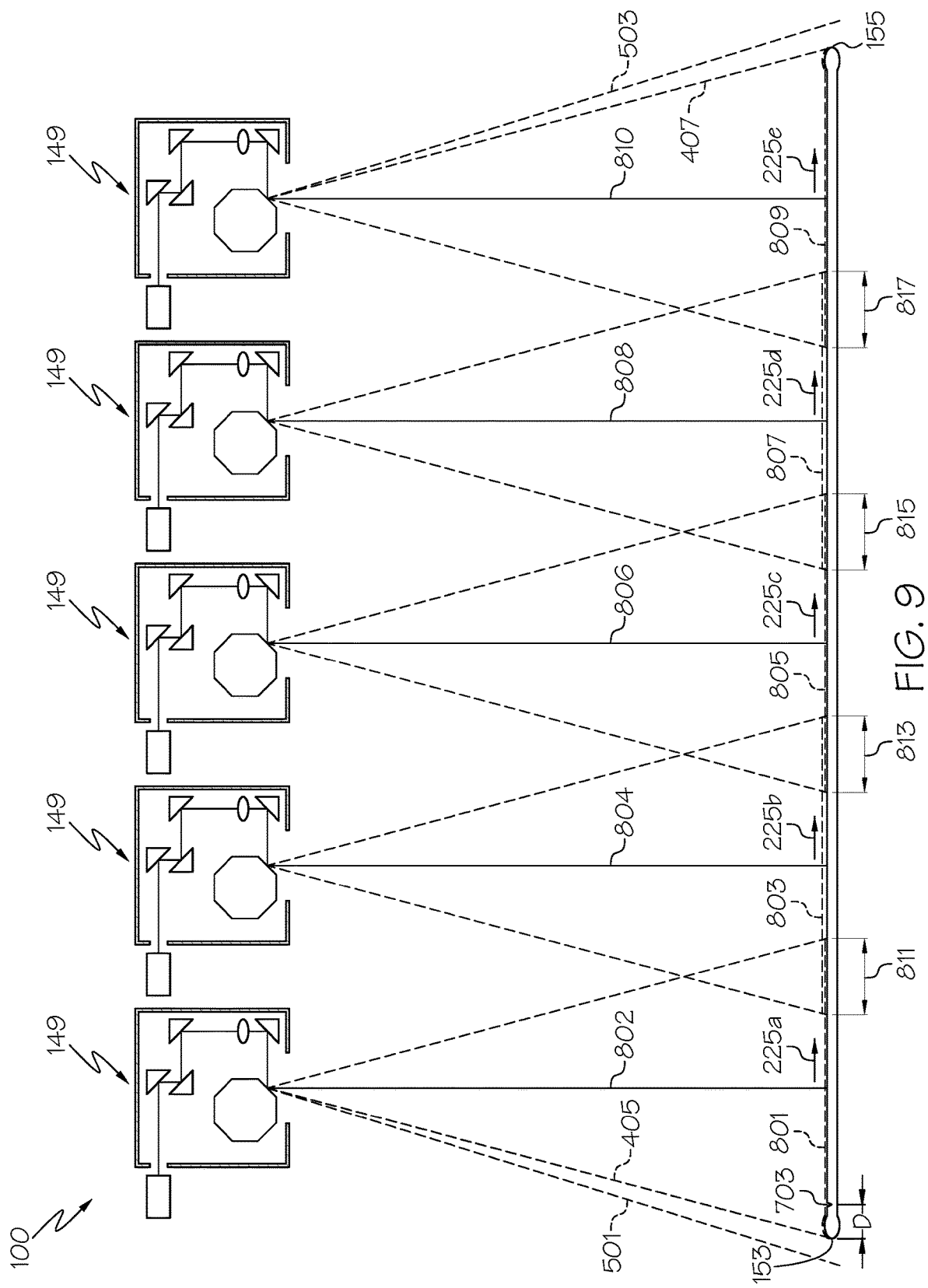
FIG. 9 illustrates another exemplary method wherein the path is exposed to a plurality of laser beams that each produces thermal stress along a corresponding segment of the path.

In some embodiments, a plurality of glass separators 149 may be provided that each produces a segment of the overall transverse separation path 151. For example, as shown in FIG. 9, a plurality of glass separators 149 may be provided that may optionally be similar or identical to the previously-described glass separator 149. It is to be understood that while five glass separation apparatus 149 are depicted in FIG. 9, unless otherwise noted, such depiction should not limit the scope of the claims appended herewith. Thus, in some embodiments, any number of glass separation apparatus (e.g., from one, two, three, four, to greater than five glass separation apparatus) can be employed. Each glass separator 149 may produce a laser beam 802, 804, 806, 808, 810 that can produce thermal stress along a corresponding segment 801, 803, 805, 807, 809 of the overall transverse separation path 151. In some embodiments, the segments 801, 803, 805, 807, 809 of the overall transverse separation path 151 may be positioned end-to-end. However, as shown, each segment of the transverse separation path 151 may overlap at least one adjacent segment of the transverse separation path 151 at overlapping regions 811, 813, 815, 817 to provide sufficient heating between the segments 801, 803, 805, 807, 809. In some embodiments, the overlapping regions 811, 813, 815, 817 may include an overlapped length that is from about 5% to about 40% of the length of at least one of the segments 801, 803, 805, 807, 809, such as from about 10% to about 30%, such as about 10% to about 25% of the length of at least one of the segments 801, 803, 805, 807, 809. In some embodiments, each corresponding segment 801, 803, 805, 807, 809 of the overall transverse separation path 151 can have a length of about 800 mm with each overlapping region 811, 813, 815, 817 having an overlapped length of about 100 mm. Providing the segments 801, 803, 805, 807, 809 of the overall transverse separation path 151 and optional overlapping regions 811, 813, 815, 817 can help achieve a sufficient level of thermal stress along the overall transverse separation path 151 extending along the glass ribbon 103.

Some embodiments of the disclosure demonstrate the laser beam spot 209 traveling along a substantial portion such as the entire dimension of the glass ribbon 103, and in some embodiments, the laser beam spot 209 is also shown to travel off the glass ribbon 103. As such, the transverse separation path 151 can likewise extend along a substantial portion of the glass ribbon 103, such as the entire dimension of the glass ribbon 103. For example, as shown in FIG. 1, the laser beam spot 209 can pass along the entire width "W" of the glass ribbon 103 from the first vertical edge 153 of the glass ribbon 103 to the second vertical edge 155 of the glass ribbon 103 such that the transverse separation path 151 extends along the entire width "W" of the glass ribbon 103. Likewise, as further illustrated in FIG. 1, the laser beam spot 209 can pass along the entire length "L" of the glass sheet 104 from the first transverse edge 165 of the glass sheet 104 to the second transverse edge 167 of the glass sheet 104 such that the vertical separation path 163 extends the entire length "L" of the glass sheet 104. In some embodiments, at least one of the transverse separation path 151 and the vertical separation path 163 can be from about 50 mm to about 5000 mm, such as from about 50 mm to about 1000 mm, although the laser beam spot 209 may be configured to travel along longer or shorter paths in some embodiments.

The laser beam spot 209 can include a circular spot, although elliptical or other shaped spots may be provided in some embodiments. A minimum diameter of a laser beam spot 209 at the focused waist can be from about 1 millimeter (mm) to about 2 mm, when determined as $1/e^2$ of the intensity profile of the laser beam spot 209, although other dimensions may be provided in some embodiments. Likewise, the maximum length of an elliptical or other spot shape can be from about 1 mm to about 3 mm, although other dimensions may be provided in some embodiments. For example, when utilizing a stationary laser beam the shape of the laser beam spot 209 can be substantially elongated and have a length of tens of centimeters (cm), for example in excess of 1 meter (m) in length. One or a plurality of laser beams 203 may be used to expose and heat at least one of the transverse separation path 151 and the vertical separation path 163.

FIGS. 3-6, 8 and 9 demonstrate an embodiment wherein a laser beam 203 sweeps between a first outer position 405 and a second outer position 407. In any of the embodiments of the disclosure, the laser beam 203 can travel off the glass ribbon 103 during heating the transverse separation path 151. For example, as shown in FIGS. 6, 8 and 9, the sweep of the laser beam 203 can optionally extend between a first outermost position 501 and a second outermost position 503 that are outside the first vertical edge 153 of the glass ribbon 103 and the second vertical edge 155 of the glass ribbon 103. Permitting the laser beam 203 to travel off the glass ribbon 103 during heating can ensure that all portions of the glass ribbon 103 along the transverse separation path 151 achieve a sufficient level of thermal stress.

As further illustrated in FIG. 6, while exposing the transverse separation path 151 along the glass ribbon 103 to the laser beam 203, the glass ribbon 103 may be positioned such that the entire transverse separation path 151 is located within a depth of focus "DOF" of the laser beam 203. The depth of focus "DOF" can be calculated by the formula:

$$DOF = \left(\frac{8\lambda}{\pi}\right)\left(\frac{F}{D}\right)^2$$

where "F" is the focal length of lens 207, "D" is the beam diameter before the lens and "λ" is the wavelength.

Positioning the entire transverse separation path 151 within the depth of focus "DOF" of the laser beam 203 can help increase efficiency of energy transfer from the laser beam 203 to the transverse separation path 151. Since the depth of focus "DOF" of the laser beam 203 exceeds amplitudes of the glass warp, thickness variation and motion of the glass ribbon 103 during separation, the depth of focus "DOF" enables separation of non-flat glass with variable thickness, which can also move or to some extent change orientation relative to the laser beam 203. In some embodiments, the depth of focus "DOF" can be from about 20 mm to about 400 mm, such as from about 20 mm to about 200 mm although other depths of focus may be provided in some embodiments.

Furthermore, in some embodiments, the entire glass ribbon 103, in addition to the transverse separation path 151 of the glass ribbon 103, may be positioned within the depth of focus "DOF". The depth of focus "DOF" of the laser beam 203 can be large enough to exceed variations of the glass thickness, glass warp or other possible changes in the position of the glass ribbon 103, and consequently the entire transverse separation path 151 on the glass ribbon 103 can be exposed to the laser beam 203 during the methods of the present disclosure. In some embodiments, the depth of focus "DOF" of the laser beam 203 may exceed amplitudes of glass thickness variations, amplitude of warp (e.g., distortion), amplitude of glass motion relative to the beam source or other variations in processing conditions. Furthermore, in some embodiments, a dimension of the laser beam spot 209 on the major surface(s) 213a, 213b of the glass ribbon 103 can vary while repeatedly passing the laser beam spot 209 along the transverse separation path 151 especially near the ends of the transverse separation path 151. For example, the dimension of the laser beam spot 209 on the major surface(s) 213a, 213b of the glass ribbon 103 may vary along the transverse separation path 151 when the laser beam 203 is focused along a first sweep path 507 or a second sweep path 509 although other paths may be provided while the glass ribbon 103 is still maintained within the depth of focus "DOF".

As illustrated in FIG. 7, if traveling along the second sweep path 509 (shown in FIG. 6), the laser beam spot 209 can apply a varying power density along the transverse separation path 151 due to the changes in the diameter and shape of the laser beam spot 209 along the transverse separation path 151, as represented by the illustrated truncated ellipse-like power density area 601. The ellipse-like power density area 601 on the major surface(s) 213a, 213b of the glass ribbon 103 can be truncated as a result of the laser beam 203 intentionally traveling off the glass ribbon 103 in the embodiment shown in FIG. 7. In some embodiments, a non-truncated elliptical power density area may be provided. For example, end points of the elliptical power density area in some embodiments may be located at the first vertical edge 153 of the glass ribbon 103 and the second vertical edge 155 of the glass ribbon 103. When the first outer edge portion 211a of the glass ribbon 103 and the second outer edge portion 211b of the glass ribbon 103 include thickened edge portions, it may be even more beneficial to separate the glass ribbon 103 using two laser beams that produce maximum power densities located near or at the thickened edge portions (e.g., edge beads) with portions of the laser beam spots overlapping in the central area of the glass ribbon 103. As the maximum power densities are located closer to or at the thickened edge portions, higher thermal stress may be targeted at the thickened edge portions, resulting in increased thermal stress. At the same time, partially overlapping the relatively lower power density provided by the tail of the laser beam paths in the central area of the glass ribbon 103 can provide enhanced thermal stress due to double exposure from the overlapping laser beams. Such overlapping can also be provided at overlapping regions 811, 813, 815, 817 shown in FIG. 9, wherein double exposure can account for the lower power density at the outer ends of the segments 801, 803, 805, 807, 809 of the transverse separation path 151 to help achieve a sufficient level of thermal stress along the overall transverse separation path 151 extending along the glass ribbon 103.

Localized heating of the transverse separation path 151 creates a temperature differential between different portions of the glass ribbon 103 that creates thermal stress along the transverse separation path 151. The process of heating the transverse separation path 151, as discussed above, can be carried out until a predetermined level of stress is achieved. In some embodiments, an exemplary level of stress can be the stress corresponding to the temperature along the transverse separation path 151 that is from about 70% to about 100% of the strain temperature point of the glass, such as from about 80% to about 100%, such as from about 90% to about 100%, such as from about 95% to about 100% of the strain temperature point of the glass. This level of heating avoids generation of residual stress in the glass ribbon 103. In some embodiments, the predetermined level of stress can be the stress corresponding to the temperature along the transverse separation path 151 that is from the strain temperature point up to the annealing point of the glass. While lower temperatures may be possible, it may be desired to reach relatively higher temperatures to maximize the thermal stress along the transverse separation path 151. Providing a relatively high thermal stress can help reduce the separation time after applying the defect 703 discussed more fully below. In some embodiments, the separation time can be from about 0.1 second to about 3 seconds after creating the defect 703, although other separation times are possible in some embodiments.

The time necessary to heat the transverse separation path 151 to the desired level of thermal stress can depend on a wide range of factors such as laser power, type of glass, dimension of the glass, thickness of the glass, or other factors. In some embodiments, the transverse separation path 151 may be sufficiently heated in a range of from about 0.1 seconds to about 5 seconds with a $CO_2$ laser power of from about 300 W to about 1.5 kW and a glass thickness of from about 0.1 mm to about 3 mm.

As set forth above, an exemplary non-limiting method of separating the glass ribbon 103 can include exposing the transverse separation path 151 on the glass ribbon 103 to at least one laser beam 203 to produce thermal stress along the transverse separation path 151 without damaging the glass ribbon 103. The method can also include creating a defect 703 on the transverse separation path 151 while the transverse separation path 151 is under thermal stress produced when exposing the transverse separation path 151 on the glass ribbon 103 to at least one laser beam 203, whereupon the glass ribbon 103 can rapidly separate along the transverse separation path 151 in response to the defect 703.

In some embodiments, the defect 703 can be produced after a predetermined level of thermal stress is achieved along the transverse separation path 151 when exposing the transverse separation path 151 to the at least one laser beam 203. Indeed, as the entire transverse separation path 151 is under a predetermined level of thermal stress, the initiation of the defect 703 can directly result in the glass ribbon 103 rapidly separating along the transverse separation path 151 in response to the defect 703. The rapid separating can begin as the defect 703 is being created or immediately after the defect 703 is created. As such, separation of the glass ribbon 103 can occur as a direct result of the defect 703 that quickly propagates a full body crack 1505 along the entire transverse separation path 151 to separate the glass ribbon 103. As used herein, the term full body crack 1505 refers to a crack that extends through the entire thickness (e.g., thickness "T") of the glass ribbon 103. The time to separate the glass ribbon 103 in accordance with embodiments of the disclosure can significantly reduce the time necessary to separate the glass ribbon 103 when compared to conventional techniques of separating the glass ribbon 103. As such, embodiments of the disclosure can be beneficial in applications where quick separation of the glass ribbon 103 is desirable over conventional techniques. For example, in applications with increased draw speed, quick separation can be beneficial to allow separation to occur within a given travel length of the glass ribbon 103. Furthermore, methods of the disclosure can separate the glass ribbon 103 even at elevated temperature conditions. For example, while separation can occur while the glass ribbon 103 is at room temperature, separation can also occur when the glass ribbon 103 is at an elevated temperature typically below the glass strain point, for example, at a temperature of up to 400° C. although other maximum temperatures may be provided in some embodiments. As such, methods of the disclosure can provide separation before the glass ribbon 103 is cooled during the forming process or during other processing procedures.

In some embodiments, as shown in FIG. 8, as well as in any of the embodiments discussed herein, creating the defect 703 can be performed while exposing the transverse separation path 151 to the at least one laser beam 203 to produce thermal stress along the transverse separation path 151. Creating the defect 703 while exposing the transverse separation path 151 to the laser beam 203 can help maintain a sufficient level of thermal stress along the transverse separation path 151 to provide quick separation of the glass ribbon 103 that occurs rapidly in direct response to creating the defect 703. In some embodiments, exposing the transverse separation path 151 to the laser beam 203 may be completed after creating the defect 703 and may even continue until the separation of the glass ribbon 103 along the transverse separation path 151 is complete. Another advantage of creating the defect 703 while exposing the transverse separation path 151 to the laser beam 203 is reduction of probability of uncontrollable breakage, which may start during exposure of the glass ribbon 103 to the laser beam 203 (e.g., heating), or when the defect 703 is created prior to exposure of the glass ribbon 103 to the laser beam 203. This can enable reliable separation of strengthened glasses, laminated glass structures and any other glasses having high internal stress. Yet another advantage of creating the defect 703 while exposing the glass ribbon 103 to the laser beam 203 is reduction of overall time required for separation of the glass ribbon 103.

In some embodiments, exposing the transverse separation path 151 may be completed just prior to creating the defect 703, at the time the defect 703 is being created, immediately after the defect 703 is created, or shortly after the defect 703 is created. In such embodiments, the defect 703 can still be created when there is sufficient residual thermal stress along the transverse separation path 151 to provide rapid separation of the glass ribbon 103 along the transverse separation path 151. In some embodiments, however, the speed of separation can be increased by continuing to expose the glass ribbon 103 to the at least one laser beam 203 while creating the defect 703 and even after creating the defect 703 (e.g., during the entire separation of the glass ribbon 103). Indeed, continuing to expose the glass ribbon 103 to the laser beam 203 while creating the defect 703 can increase the speed of separation of the glass ribbon 103 by maintaining a predetermined thermal stress, such as a maximum thermal stress along the transverse separation path 151. However, overexposure of the transverse separation path 151 to the laser beam 203 should be avoided to minimize or avoid the generation of residual stress along the separated edges due to overheating.

Creating the defect 703 may be performed in a wide variety of ways. For example, as shown schematically in FIG. 1, in some embodiments, the defect 703 may be created by mechanically engaging the glass ribbon 103 with, for example, a scribe 701 (e.g., score wheel, diamond tip, etc.) or other mechanical device. Indeed, as shown in FIG. 8, a tip of the scribe 701 can create a defect 703 such as a surface imperfection (e.g., surface crack). In some embodiments, the defect 703 may include a point defect or a score line. Although not shown, a support device such as an air bearing or mechanical contact support member may be provided to help counteract the force applied by the scribe 701 to facilitate creation of the defect 703.

In some embodiments, as shown in FIG. 1, the defect 703 may be created with a laser 169. In some embodiments, the laser 169 can include a pulse laser configured to create the defect 703 such as a surface imperfection although subsurface imperfections may also be provided. In some embodiments, the defect 703 produced by the laser 169 can include a crack, a point defect, a score line, or other defect wherein such defect 703 may optionally be created by an ablation process.

In some embodiments, providing the defect 703 as a score line may be beneficial to help direct a proper full body crack 1505 along the direction of the transverse separation path 151. For example, the score line can have a length extending along the transverse separation path 151 and a width that is perpendicular to the transverse separation path 151. Exemplary score lines can have a wide range of lengths and widths, such as a length within a range of from about 0.5 mm to about 5 mm and a width of from about 0.1 mm to about 0.3 mm. If provided as a surface defect, the depth of the defect 703 can be from about 5 micrometers to about 500 micrometers, depending on the type of glass. For example, with chemically strengthened glass, a defect 703 with a deeper depth may be provided to extend past the chemically strengthened layer of the glass ribbon 103.

The defect 703 may be provided at any location along the transverse separation path 151, including on the transverse separation path 151. In some embodiments, the defect 703 can be located near one of the first vertical edge 153 of the glass ribbon 103 or the second vertical edge 155 of the glass ribbon 103. In some embodiments, it can be beneficial to locate the defect 703 near the first vertical edge 153 of the glass ribbon 103 where scanning of the laser beam spot 209 starts as described herein. For example, as shown in FIG. 8, the defect 703 can be applied between the first vertical edge 153 of the glass ribbon 103 and the second vertical edge 155 of the glass ribbon 103, or the defect 703 may be provided at the first vertical edge 153 of the glass ribbon 103 and/or at the second vertical edge 155 of the glass ribbon 103 in some embodiments. Applying the defect 703 between the first vertical edge 153 of the glass ribbon 103 and the second vertical edge 155 of the glass ribbon 103 can help ensure that a crack begins to propagate at the location of the defect 703 rather than at an edge imperfection that may exist at the first vertical edge 153 of the glass ribbon 103 and/or the second vertical edge 155 of the glass ribbon 103. Moreover, applying the defect 703 between the first vertical edge 153 of the glass ribbon 103 and the second vertical edge 155 of the glass ribbon 103 can also result in faster separation of the glass ribbon 103. In some embodiments, the defect 703 can be created on an edge bead commonly found at the first outer edge portion 211*a* and the second outer edge portion 211*b* of the glass ribbon 103. Alternatively, as shown in FIGS. 8 and 9, the defect 703 may optionally be provided inboard of the edge beads. In some embodiments, the defect 703 can be created a distance from at least one edge of the glass ribbon 103, wherein the distance is from about 1 mm to about 25 mm. For example, as shown in FIGS. 8 and 9, in some embodiments, the defect 703 may be created a distance "D" from the first vertical edge 153 of the glass ribbon 103 or the second vertical edge 155 of the glass ribbon 103, where "D" can be from about 1 mm to about 25 mm, such as from about 1 mm to about 10 mm, although different distances may be provided in some embodiments.

In some embodiments, the defect 703 may be created at an intermediate location 301 of the transverse separation path 151 or closer to the first vertical edge 153 of the glass ribbon 103 or the second vertical edge 155 of the glass ribbon 103. In some embodiments, as shown in FIG. 8, the defect 703 may be created closer to the first vertical edge 153 of the glass ribbon 103 than the second vertical edge 155 of the glass ribbon 103. Providing the defect 703 closer to the first vertical edge 153 of the glass ribbon 103 (e.g., a distance "D" from the first vertical edge 153) can be particularly beneficial when the laser beam spot 209 travels in the sweep direction 225 from the first vertical edge 153 toward the second vertical edge 155, as discussed above. In such an embodiment, the first vertical edge 153 can be upstream along the transverse separation path 151 along the sweep direction 225 of the laser beam spot 209. As the full body crack 1505 tends to propagate in the sweep direction 225 of the laser beam spot 209, locating the defect 703 closer to the first vertical edge 153 of the glass ribbon 103 can help propagate the full body crack 1505 quickly downstream along the transverse separation path 151 along the glass ribbon 103 in the sweep direction 225. Furthermore, the defect 703 can be located the distance "D" from the first vertical edge 153 that is nevertheless close enough to the first vertical edge 153 of the glass ribbon 103 to also allow the full body crack 1505 to propagate upstream to intersect with the first vertical edge 153 of the glass ribbon 103 thereby separating the glass ribbon 103 along the transverse separation path 151.

Furthermore, with reference to FIG. 9, the laser beams 802, 804, 806, 808, 810 can be timed to allow the laser beam spot 209 produced by each laser beam to travel along the corresponding sweep directions 225*a*, 225*b*, 225*c*, 225*d*, 225*e* in a sequential pattern such that the laser beam spots from adjacent laser beams may coexist along the overlapping regions 811, 813, 815, 817. As such, a laser beam spot 209 may substantially continuously travel along the sweep directions 225*a*, 225*b*, 225*c*, 225*d*, 225*e* along the overall dimension of the glass ribbon 103 to help quickly drive the full body crack 1505 along each corresponding segment 801, 803, 805, 807, 809 of the overall transverse separation path 151 to separate the glass ribbon 103 along the overall transverse separation path 151.

Any of the methods discussed herein may be applied to separate glass (e.g., glass ribbon 103, glass sheet 104) including but not limited to the exemplary types of glass ribbons 103 and glass sheets 104 disclosed herein. As such, embodiments discussed with respect to the glass ribbon 103 may also apply to the glass sheet 104. For example, as illustrated with respect to FIG. 1, the transverse separation path 151 can extend along the width "W" of the glass ribbon 103 between the first vertical edge 153 of the glass ribbon 103 and the second vertical edge 155 of the glass ribbon 103. In such embodiments, creating the defect 703 can separate a glass sheet 104 from the glass ribbon 103 as shown in FIG. 1. In some embodiments also illustrated in FIG. 1, the vertical separation path 163 can extend along the length "L" of the glass sheet 104 between the first transverse edge 165 of the glass sheet 104 and the second transverse edge 167 of the glass sheet 104. In such embodiments, creating the defect 703 can separate the outer portion 159 of the glass sheet 104 from the central portion 161 of the glass sheet 104.

In some embodiments, any of the disclosed methods can facilitate separating of a wide range of glass including glass ribbons 103 and glass sheets 104 that may be flat (as shown) or may have a non-flat (e.g., warped) configuration such as bowed into a C-shape, S-shape or other configuration. Furthermore, any of the disclosed methods can facilitate separation of glass including glass ribbons 103 and glass sheets 104 with a substantially uniform thickness or a non-uniform variable thickness. For example, as shown, a glass ribbon 103 with relatively thick edge beads and a relatively thin central portion 161 can be separated.

In some embodiments, glass including the glass ribbons 103 and the glass sheets 104 may be separated when the glass is relatively stationary or when the glass is in motion. For example, the glass ribbon 103 may be separated while in motion as the glass ribbon 103 is being drawn from the glass former 140 or if the glass ribbon 103 is slightly swinging and/or twisting relative to the glass former 140. Still further, any of the methods of the disclosure can be used to separate glass including glass ribbons 103 and glass sheets 104 that are at an elevated temperature not exceeding approximately the strain point of the glass.

Furthermore, methods of the disclosure can be used to separate non-strengthened glass or strengthened glass including non-strengthened glass ribbons 103 and glass sheets 104 or strengthened glass ribbons 103 and glass sheets 104. For example, methods can be used to separate a strengthened glass (e.g., chemically strengthened glass) including at least one outer layer under compression and another layer in tension. In some embodiments, methods of the disclosure can be used to separate strengthened glass that is strengthened on both sides, wherein the two major surfaces of the glass are in compression and the center portion of the glass is in tension.

In some embodiments, methods of the disclosure may be used to separate glass including laminated glass layers. In some embodiments, the laminated structure can include a compressive surface layer and a central layer under tension. In some embodiments, the laminated structure can include two compressive surface layers with a central layer under tension sandwiched between the two compressive layers. In still further embodiments, methods of the disclosure may be used to separate laminated glass layers where at least two of a plurality of layers include different compositions and/or different coefficients of thermal expansion. In some embodiments the glass may be a chemically or thermally strengthened glass, wherein the glass includes a surface compressive stress layer produced by ion exchange or thermal processing.

As shown in FIG. 1, in some embodiments, the method of separating the glass sheet 104 from the glass ribbon 103 can be carried out without the need to bend the glass ribbon 103 or the glass sheet 104, including the outer portions 159 of the glass sheet 104. Indeed, as shown in FIG. 1, the glass separator 149 can separate the glass sheet 104 from the glass ribbon 103 while the glass sheet 104 and the glass ribbon 103 remain vertically oriented. In such an embodiment, debris (e.g., separation debris 1001 shown in FIGS. 10, 11, and 13) generated during separation can be drawn vertically downward by gravity, thereby avoiding a horizontal or angled surface on which the debris may otherwise land if the glass ribbon 103 or glass sheet 104 were to include a bent (e.g., non-vertical) orientation. Likewise, due to the vertical orientation of the glass ribbon 103 and the glass sheet 104, environmental debris 1002 (see FIGS. 10, 11, and 13) may be less likely to come into contact with the glass ribbon 103 and the glass sheet 104 as such environmental debris 1002 can also be drawn downward by gravity. While it is recognized that subsequent procedures to remove debris from the glass ribbon 103 and the glass sheet 104 can be employed, in some embodiments it can be desirable to avoid surface contamination of the glass ribbon 103 and the glass sheet 104 entirely or to at least reduce the time debris may be in contact with a major surface 213a, 213b of the glass ribbon 103 or a major surface 214a, 214b of the glass sheet 104, thereby decreasing the chance that a relatively strong bond develops between the debris and the glass ribbon 103 or the glass sheet 104.

In addition to or alternatively to employing the vacuum 148 (e.g., first vacuum 148a, second vacuum 148b) to remove separation debris 1001 from the glass ribbon 103, in some embodiments, to further facilitate removal of the separation debris 1001, the separation debris 1001 may be entrained in a curtain of gas and quickly carried away from the glass ribbon 103 and/or the glass sheet 104, thereby even further reducing opportunity for the separation debris 1001 to contact with and attach itself to the pristine major surfaces 213a, 213b of the glass ribbon 103 and the pristine major surfaces 214a, 214b of the glass sheet 104. In some embodiments, as shown in FIG. 2, a first elongated gas port 185a and a second elongated gas port 185b may be positioned adjacent the glass former 140, such as near the lower opening 183 where the glass ribbon 103 exits the glass former 140. The first elongated gas port 185a and the second elongated gas port 185b can be oriented to respectively distribute a first outer curtain of gas 187a and a second outer curtain of gas 187b, for example, along the entire width "W" of the glass ribbon 103 or even greater than the entire width "W" of the glass ribbon 103. In some embodiments, the first elongated gas port 185a and the second elongated gas port 185b can be oriented to respectively distribute a first outer curtain of gas 187a and a second outer curtain of gas 187b along less than the entire width "W" of the glass ribbon 103. Additionally, in some embodiments, the first outer curtain of gas 187a and the second outer curtain of gas 187b can surround the glass ribbon 103 entirely, in some embodiments, and can isolate the glass ribbon 103 from contamination with environmental debris 1002. The first outer curtain of gas 187a and the second outer curtain of gas 187b can be employed to isolate the glass ribbon 103 regardless of the temperature of the glass ribbon 103, including relatively high temperatures at which traditional surface coatings and protectants cannot ordinarily be applied to the glass ribbon 103. For example, some traditional surface coatings and protectants may be suitable when a temperature of the glass ribbon 103 is at or below 200° C., at or below 150° C., or at or below 100° C.; whereas, the first outer curtain of gas 187a and the second outer curtain of gas 187b of the present application can be employed to isolate the glass ribbon 103 when the glass ribbon 103 includes temperatures above 100° C., above 150° C., above 200° C., above 300° C., above 400° C., above 500° C., or any other temperature of the glass ribbon 103. The first elongated gas port 185a and the second elongated gas port 185b can include a single elongated nozzle, port, jet, etc. from which gas can be distributed or a plurality of nozzles, ports, jets, etc. from which gas can be distributed to form a continuous, uniform curtain of gas that may inhibit or even prevent penetration by environmental debris 1002. In some embodiments, each of the first elongated gas port 185a and the second elongated gas port 185b can include any one or more of a continuous elongated slot and a plurality of elongated slots oriented to respectively distribute the first outer curtain of gas 187a and the second outer curtain of gas 187b.

In some embodiments, (e.g., as shown in FIG. 13 which illustrates an alternative embodiment of FIG. 11), the first elongated gas port 185a and the second elongated gas port 185b can also be oriented to respectively distribute a first inner curtain of gas 187c and a second inner curtain of gas 187d. The first inner curtain of gas 187c and the second inner curtain of gas 187d can, in some embodiments, extend along the entire width "W" of the glass ribbon 103 or even greater than the entire width "W" of the glass ribbon 103. In some embodiments, the first elongated gas port 185a and the second elongated gas port 185b can also be oriented to respectively distribute a first inner curtain of gas 187c and a second inner curtain of gas 187d that can extend along less than the entire width "W" of the glass ribbon 103. Additionally, in some embodiments, the first inner curtain of gas 187c and the second inner curtain of gas 187d can surround the glass ribbon 103 entirely and can isolate the glass ribbon 103 from contamination with at least one of environmental debris 1002 and separation debris 1001. In some embodiments, the first inner curtain of gas 187c and the second inner curtain of gas 187d can include the same, similar, or different features as the first outer curtain of gas 187a and the second outer curtain of gas 187b. For example, in some embodiments, the first inner curtain of gas 187c and the second inner curtain of gas 187d can be employed to isolate the glass ribbon 103 regardless of the temperature of the glass ribbon 103, including relatively high temperatures (e.g., above 100° C., above 150° C., above 200° C., above 300° C., above 400° C., above 500° C., or any other temperature of the glass ribbon 103) at which traditional surface coatings and protectants cannot ordinarily be applied to the glass ribbon 103. The first elongated gas port 185a and the second elongated gas port 185b can include a single elongated nozzle, port, jet, etc. from which gas can be distributed or a plurality of nozzles, ports, jets, etc. from which gas can be distributed to form one or more continuous, uniform curtains of gas that may inhibit or even prevent penetration by environmental debris 1002. In some embodiments, each of the first elongated gas port 185a and the second elongated gas port 185b can include any one or more of a continuous elongated slot and a plurality of elongated slots oriented to respectively distribute the first outer curtain of gas 187a and the first inner curtain of gas 187c, as well as the second outer curtain of gas 187b, and the second inner curtain of gas 187d.

As further shown in FIGS. 1, 10, 11, and 13, the glass processing apparatus 100 can include a vacuum port 1011 (e.g., an elongated vacuum port) positioned downstream (e.g., along the draw direction 177, shown in FIG. 2) from the glass separator 149 and oriented to receive debris entrained in the first outer curtain of gas 187a and the second outer curtain of gas 187b. In some embodiments, the vacuum port 1011 can be oriented to receive debris entrained in the first inner curtain of gas 187c and the second inner curtain of gas 187d. A vacuum source 1013 can pull debris (e.g., separation debris 1001, environmental debris 1002) entrained in any one or more of the first outer curtain of gas 187a, the first inner curtain of gas 187c, the second outer curtain of gas 187b, and the second inner curtain of gas 187d into the vacuum port 1011. The vacuum source 1013 can include a blower, a vacuum chamber, a pump, a fan, or other suitable mechanism to create an under pressure (e.g., negative pressure, suction) at the vacuum port 1011.

As shown, the first outer curtain of gas 187a can include a first outer upstream portion 188a that is spaced apart from the first major surface 213a of the glass ribbon 103 and a first outer downstream portion 189a that converges inward toward the first major surface 213a of the glass ribbon 103 and impinges on the first major surface 213a of the glass ribbon 103. Likewise, the second outer curtain of gas 187b can include a second outer upstream portion 188b that is spaced apart from the second major surface 213b of the glass ribbon 103 and a second outer downstream portion 189b that converges inward toward the second major surface 213b of the glass ribbon 103 and impinges on the second major surface 213b of the glass ribbon 103. As shown, the first outer upstream portion 188a of the first outer curtain of gas 187a and the second outer upstream portion 188b of the second outer curtain of gas 187b can be parallel to the draw plane 181. As further shown, the first outer downstream portion 189a of the first outer curtain of gas 187a and the second outer downstream portion 189b of the second outer curtain of gas 187b can be symmetrically disposed relative to the draw plane 181 and impinge on the glass ribbon 103 at a common elevation relative to the draw plane 181. A symmetrical disposition of the first outer curtain of gas 187a and the second outer curtain of gas 187b relative to the draw plane 181 can provide for application of equal and opposite forces on the glass ribbon 103 from the first outer curtain of gas 187a and the second outer curtain of gas 187b. Advantageously, equal and opposite application of forces on opposing major surfaces (e.g., first major surface 213a, second major surface 213b) of the glass ribbon 103 can minimize induced stress in the glass ribbon 103 from external forces and can also maintain the glass ribbon 103 in a vertical orientation along the draw plane 181, reducing the likelihood, in some embodiments, of debris (e.g., separation debris 1001, environmental debris 1002) from contacting the first major surface 213a of the glass ribbon 103 and the second major surface 213b of the glass ribbon 103 as such debris may travel downward away from the glass ribbon 103 due, at least in part, to gravity. As shown, the glass ribbon 103 can be drawn between the first outer upstream portion 188a of the first outer curtain of gas 187a and the second outer upstream portion 188b of the second outer curtain of gas 187b, and then the glass ribbon 103 can be drawn between the first outer downstream portion 189a of the first outer curtain of gas 187a and the second outer downstream portion 189b of the second outer curtain of gas 187b.

As shown in FIG. 13, in some embodiments, the first inner curtain of gas 187c can include a first inner upstream portion 188c that is spaced apart from the first major surface 213a of the glass ribbon 103 between the first major surface 213a of the glass ribbon 103 and the first outer upstream portion 188a of the first outer curtain of gas 187a. The first inner curtain of gas 187c can also include a first inner downstream portion 189c that converges inward toward the first major surface 213a of the glass ribbon 103 and impinges on the first major surface 213a of the glass ribbon 103 upstream from where the first outer downstream portion 189a of the first outer curtain of gas 187a impinges on the glass ribbon 103. Likewise, the second inner curtain of gas 187d can include a second inner upstream portion 188d that is spaced apart from the second major surface 213b of the glass ribbon 103 between the second major surface 213b of the glass ribbon 103 and the second outer upstream portion 188b of the second outer curtain of gas 187b. The second inner curtain of gas 187d can also include a second inner downstream portion 189d that converges inward toward the second major surface 213b of the glass ribbon 103 and impinges on the second major surface 213b of the glass ribbon 103 upstream from where the second outer downstream portion 189b of the second outer curtain of gas 187b impinges on the glass ribbon 103.

In some embodiments, the first inner upstream portion 188c of the first inner curtain of gas 187c and the second inner upstream portion 188d of the second inner curtain of gas 187d can be parallel to the draw plane 181. As further shown, the first inner downstream portion 189c of the first inner curtain of gas 187c and the second inner downstream portion 189d of the second inner curtain of gas 187d can be symmetrically disposed relative to the draw plane 181 and impinge on the glass ribbon 103 at a common elevation relative to the draw plane 181. In some embodiments, a symmetrical disposition of the first inner curtain of gas 187c and the second inner curtain of gas 187d relative to the draw plane 181 can provide for application of equal and opposite forces on the glass ribbon 103 from the first inner curtain of gas 187c and the second inner curtain of gas 187d. Advantageously, equal and opposite application of forces on opposing major surfaces (e.g., first major surface 213a, second major surface 213b) of the glass ribbon 103 can minimize induced stress in the glass ribbon 103 from external forces and can also maintain the glass ribbon 103 in a vertical orientation along the draw plane 181, reducing the likelihood, in some embodiments, of debris (e.g., separation debris 1001, environmental debris 1002) from contacting the first major surface 213a of the glass ribbon 103 and the second major surface 213b of the glass ribbon 103 as such debris may travel downward away from the glass ribbon 103 due, at least in part, to gravity. As shown, the glass ribbon 103 can be drawn between the first inner upstream portion 188c of the first inner curtain of gas 187c and the second inner upstream portion 188d of the second inner curtain of gas 187d, and then the glass ribbon 103 can be drawn between the first inner downstream portion 189c of the first inner curtain of gas 187c and the second inner downstream portion 189d of the second inner curtain of gas 187d.

Figure 11:
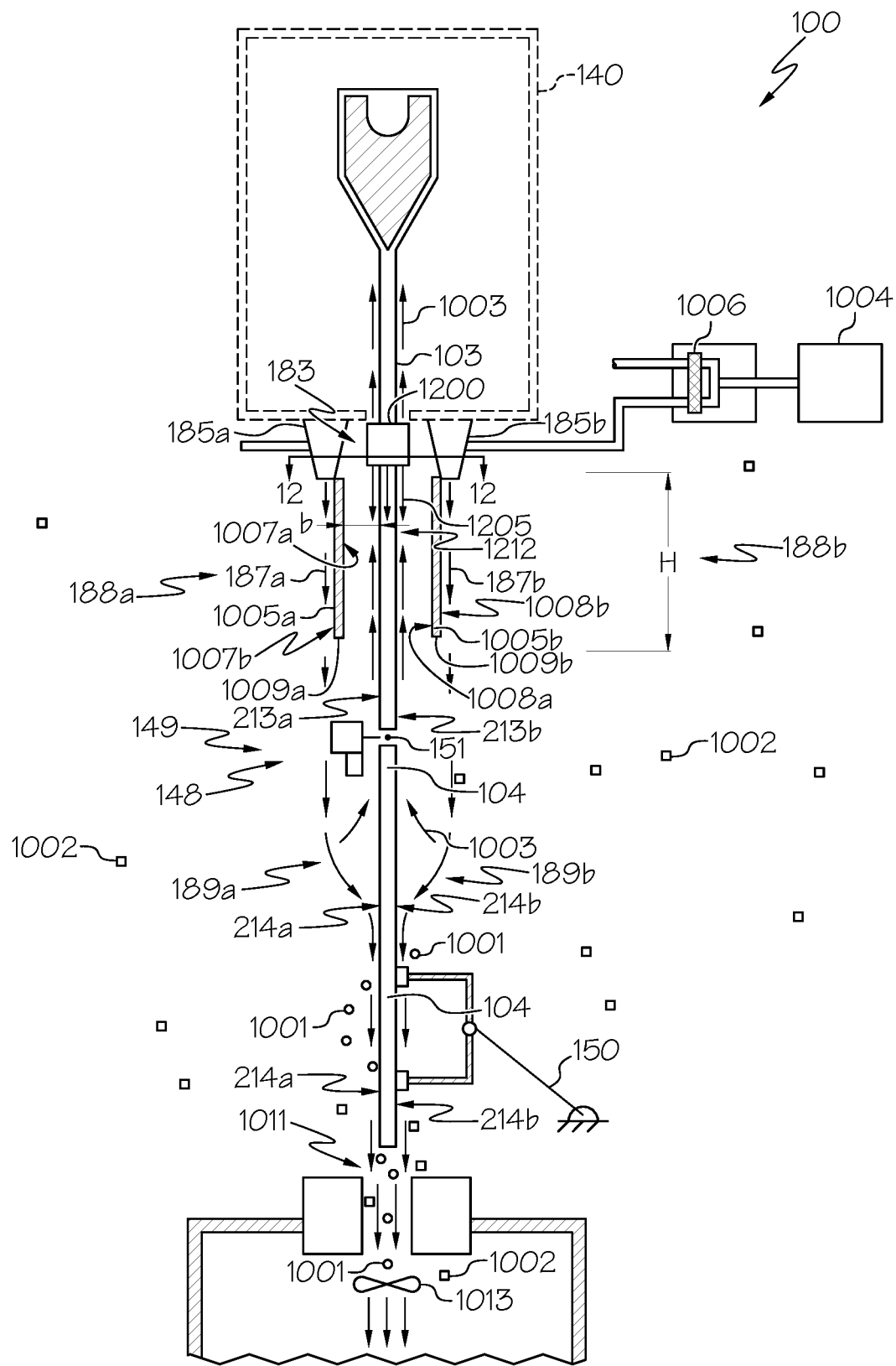
FIG. 11 is a cross-sectional view of the fusion down-draw apparatus along line 10-10 of FIG. 1 illustrating a glass separator positioned at an upstream location.

The gas of which any one or more of the first outer curtain of gas 187a, the first inner curtain of gas 187c, the second outer curtain of gas 187b, and the second inner curtain of gas 187d is formed can include air, an inert gas (e.g., nitrogen or other suitable gases), clean dry air, humidified air, or the like, in some embodiments. As shown in FIGS. 10, 11, and 13, the gas may be filtered by a filter 1006 placed between a source 1004 of pressurized gas, such as a compressed gas tank, an air compressor, etc., to provide clean gas out of the first elongated gas port 185a and the second elongated gas port 185b. Moreover, in some embodiments, the moisture content of the gas may be greatly reduced which, as compared to gas with higher moisture content, may decrease a likelihood of attachment of the debris to the first major surface 213a and the second major surface 213b of the glass ribbon 103 or to the first major surface 214a and the second major surface 214b of the glass sheet 104. In some embodiments, a temperature of the gas may be controlled, for example the gas may be heated or cooled, to assist in the control of stress, compaction or other attributes of the glass ribbon 103 and the glass sheet 104 as may be desired. In some embodiments, the flow rate of the gas may be controlled with or without temperature control to also assist in the control of stress, compaction or other attributes of the glass ribbon 103 and the glass sheet 104 as may be desired.

In some embodiments, any one or more of the first outer curtain of gas 187a, the first inner curtain of gas 187c, the second outer curtain of gas 187b, and the second inner curtain of gas 187d may be approximately 1 mm from an adjacent major surface (e.g., first major surface 213a, second major surface 213b) of the glass ribbon 103. Such distance can be defined as a lateral distance between the adjacent major surface (e.g., first major surface 213a, second major surface 213b) of the glass ribbon 103 and the corresponding first elongated gas port 185a and the second elongated gas port 185b from which the first outer curtain of gas 187a and the first inner curtain of gas 187c as well as the second outer curtain of gas 187b and the second inner curtain of gas 187d are respectively distributed. Of course, this distance may vary and, unless otherwise noted, such a disclosure should not limit the scope of the claims appended herewith. For example, the distance of any one or more of the first outer curtain of gas 187a, the first inner curtain of gas 187c, the second outer curtain of gas 187b, and the second inner curtain of gas 187d to an adjacent major surface (e.g., first major surface 213a, second major surface 213b) of the glass ribbon 103 may be between about 1 mm and about 50 mm, between about 5 mm and 40 mm, between about 10 mm and about 30 mm, and may also vary in the draw direction 177 along the glass ribbon 103 itself. In some embodiments, the distance of at least one of the first outer curtain of gas 187a and the first inner curtain of gas 187c to the first major surface 213a of the glass ribbon 103 or to the first major surface 214a of the glass sheet 104 may be greater or smaller than the distance of at least one of the second outer curtain of gas 187b and the second inner curtain of gas 187d to the second major surface 213b of the glass ribbon 103 or to the second major surface 214b of the glass sheet 104.

In some embodiments, under normal operation, the glass former 140 may draw a cooling stream 1003 of gas through the lower opening 183 of the glass former 140. For example, the glass ribbon 103 may tend to heat the gas within the interior of the glass former 140, and due to the pressure differential, based at least on natural convection, the heated air can rise within the interior of the glass former 140, thereby creating the cooling stream 1003 of gas drawn through the lower opening 183 of the glass former 140. In some embodiments, the cooling stream 1003 of gas can include gas provided in the first outer curtain of gas 187a from the first elongated gas port 185a and the second outer curtain of gas 187b from the second elongated gas port 185b. Likewise, in some embodiments, the cooling stream 1003 of gas can include gas provided in the first inner curtain of gas 187c from the first elongated gas port 185a and the second inner curtain of gas 187d from the second elongated gas port 185b. Accordingly, the cooling stream 1003 can include clean gas filtered by the filter 1006 placed between the source 1004 of pressurized gas and the first elongated gas port 185a and the second elongated gas port 185b.

In some embodiments, gas entering the lower opening 183 of the glass former 140 via the cooling stream 1003 can be controlled and clean of any contaminants and particles that may otherwise interfere with the glass former 140. For example, in some embodiments, the first inner curtain of gas 187c and the second inner curtain of gas 187d can flow to counteract (e.g., slow) the flow of the cooling stream 1003 thus preventing any debris (e.g., separation debris 1001, environmental debris 1002) entrained in the cooling stream 1003 from entering in to the lower opening 183 of the glass former 140. By counteracting the flow of the cooling stream 1003, debris entrained in the cooling stream 1003 can also be more readily drawn into at least one of the vacuum 148 and the vacuum port 1011 as compared to, for example, debris entrained in a cooling stream 1003 that is traveling at a higher velocity. Moreover, by providing the first outer curtain of gas 187a, the first inner curtain of gas 187c, the second outer curtain of gas 187b, and the second inner curtain of gas 187d, gas entering the lower opening 183 of the glass former 140 via the cooling stream 1003 can be controlled and clean of any contaminants and particles that may otherwise interfere with the glass former 140. In some embodiments, the first inner curtain of gas 187c and the second inner curtain of gas 187d can also prevent debris from recirculating between the first outer curtain of gas 187a and the second outer curtain of gas 187b. In some embodiments, recirculating debris (e.g., which may occur when the first inner curtain of gas 187c and the second inner curtain of gas 187d are not provided) can contaminate the glass ribbon 103 and can enter into the lower opening 183 of the glass former 140. Accordingly, the features of the disclosure can, in some embodiments, be employed to produce a glass ribbon 103 that can include higher quality attributes and characteristics, including pristine first and second major surfaces 213a, 213b of the glass ribbon 103. Moreover, by reducing and preventing contamination of the glass ribbon 103 with debris, subsequent cleaning steps to, for example, remove debris from the glass ribbon 103 may be reduced performed more expediently, and, in some embodiments, avoided all together.

In some embodiments, a baffle (e.g., first baffle 1005a, second baffle 1005b) may be provided to avoid interference between the first outer curtain of gas 187a and the second outer curtain of gas 187b with the cooling stream 1003 being drawn into the lower opening 183 of the glass former 140. In some embodiments, any of the baffles of the disclosure can extend downstream in a direction away from the glass former 140. In some embodiments, any of the baffles of the disclosure can be positioned at least partially outside the glass former 140, such as entirely outside of the glass former 140. In further examples, at least a portion of any of the baffles of the disclosure can extend partially within the glass former 140. As shown, the cooling stream 1003 can pass between the first major surface 213a of the glass ribbon 103 and a first inner surface 1007a of the first baffle 1005a and also between the second major surface 213b of the glass ribbon 103 and a second inner surface 1008a of the second baffle 1005b. The cooling stream 1003 can travel in an upstream direction opposite a downstream direction of the first outer curtain of gas 187a and the second outer curtain of gas 187b. Furthermore, as shown in FIG. 1, the first baffle 1005a and the second baffle 1005b can extend along the entire width "W" of the glass ribbon 103 and, as shown, can extend along greater than the entire width "W" of the glass ribbon 103. In some embodiments, the first baffle 1005a and the second baffle 1005b can extend along less than the entire width "W" of the glass ribbon 103.

Likewise, in some embodiments, the first baffle 1005a and the second baffle 1005b may be provided to avoid interference between the first outer curtain of gas 187a and the first inner curtain of gas 187c and between the second outer curtain of gas 187b and the second inner curtain of gas 187d. In some embodiments, the cooling stream 1003 can be drawn into the lower opening 183 of the glass former 140 by passing between the first major surface 213a of the glass ribbon 103 and the first inner upstream portion 188c of the first inner curtain of gas 187c and also between the second major surface 213b of the glass ribbon 103 and the second inner upstream portion 188d of the second inner curtain of gas 187d. The cooling stream 1003 can travel in an upstream direction opposite a downstream direction of the first inner curtain of gas 187c and the second inner curtain of gas 187d.

In addition, the first baffle 1005a and the second baffle 1005b can extend the first outer upstream portion 188a of the first outer curtain of gas 187a and the second outer upstream portion 188b of the second outer curtain of gas 187b to control the elevation at which the first outer downstream portion 189a of the first outer curtain of gas 187a impinges on the first major surface 213a of the glass ribbon 103 as well as to control the elevation at which the second outer downstream portion 189b of the second outer curtain of gas 187b impinges on the second major surface 213b of the glass ribbon 103. Similarly, in some embodiments, the first baffle 1005a and the second baffle 1005b can extend the first inner upstream portion 188c of the first inner curtain of gas 187c and the second inner upstream portion 188d of the second inner curtain of gas 187d to control the elevation at which the first inner downstream portion 189c of the first inner curtain of gas 187c impinges on the first major surface 213a of the glass ribbon 103 as well as to control the elevation at which the second inner downstream portion 189d of the second inner curtain of gas 187d impinges on the second major surface 213b of the glass ribbon 103.

In some embodiments, the first baffle 1005a and/or the second baffle 1005b can be adjustable such that the height "H" of each of the first baffle 1005a and the second baffle 1005b can be selectively adjusted which can, in turn, control the elevation at which the first outer downstream portion 189a of the first outer curtain of gas 187a impinges on the first major surface 213a of the glass ribbon 103 as well as control the elevation at which the second outer downstream portion 189b of the second outer curtain of gas 187b impinges on the second major surface 213b of the glass ribbon 103. Similarly, in some embodiments, the height "H" of each of the first baffle 1005a and the second baffle 1005b can be selectively adjusted to control the elevation at which the first inner downstream portion 189c of the first inner curtain of gas 187c impinges on the first major surface 213a of the glass ribbon 103 as well as to control the elevation at which the second inner downstream portion 189d of the second inner curtain of gas 187d impinges on the second major surface 213b of the glass ribbon 103.

As further illustrated in FIGS. 10, 11, and 13, the first elongated gas port 185a can be oriented to distribute the first outer curtain of gas 187a to pass over the outer surface (e.g., first outer surface 1007b) of the first baffle 1005a before traveling over a first downstream edge 1009a of the first baffle 1005a. Likewise, the second elongated gas port 185b can be oriented to distribute the second outer curtain of gas 187b to pass over the outer surface (e.g., second outer surface 1008b) of the second baffle 1005b before traveling over a second downstream edge 1009b of the second baffle 1005b. As shown, after passing over the first downstream edge 1009a, the first outer curtain of gas 187a and the second outer curtain of gas 187b converge to impinge on the corresponding first major surface 213a and second major surface 213b of the glass ribbon 103 and then closely travel along the first major surface 213a and the second major surface 213b of the glass ribbon 103, thereby facilitating the entrainment of the debris within the separation zone. The debris entrained within the first outer curtain of gas 187a and the second outer curtain of gas 187b can then be pulled into the vacuum port 1011 by gravity and by the vacuum source 1013, where the debris may then be discarded. In some embodiments, the debris entrained within the first outer curtain of gas 187a and the second outer curtain of gas 187b can be pulled into the vacuum 148 (e.g., first vacuum 148a, second vacuum 148b) by, for example, a first vacuum source 147a and a second vacuum source 147b (shown in FIG. 13) where the debris may then be discarded. In some embodiments, the first vacuum source 147a and the second vacuum source 147b can include a blower, a vacuum chamber, a pump, a fan, or other suitable mechanism to create an under pressure (e.g., negative pressure, suction) at the first vacuum source 147a and the second vacuum source 147b.

As illustrated in FIG. 13, in some embodiments, the first elongated gas port 185a can be oriented to distribute the first inner curtain of gas 187c to pass over the inner surface (e.g., first inner surface 1007a) of the first baffle 1005a. In some embodiments, the first inner curtain of gas 187c can pass over the first inner surface 1007a of the first baffle 1005a before traveling over the first downstream edge 1009a of the first baffle 1005a. Likewise, the second elongated gas port 185b can be oriented to distribute the second inner curtain of gas 187d to pass over the inner surface (e.g., second inner surface 1008a) of the second baffle 1005b. In some embodiments, the second inner curtain of gas 187d can pass over the second inner surface 1008a of the second baffle 1005b before traveling over the second downstream edge 1009b of the second baffle 1005b. As shown, after passing over the first downstream edge 1009a, the first inner curtain of gas 187c and the second inner curtain of gas 187d can converge to impinge on the corresponding first major surface 213a and second major surface 213b of the glass ribbon 103 and then closely travel along the first major surface 213a and the second major surface 213b of the glass ribbon 103, thereby facilitating the entrainment of the debris within the separation zone. The debris entrained within the first inner curtain of gas 187c and the second inner curtain of gas 187d can then be pulled into the vacuum port 1011 by gravity and by the vacuum source 1013, where the debris may then be discarded. In some embodiments, the debris entrained within the first inner curtain of gas 187c and the second inner curtain of gas 187d can be pulled into the vacuum 148 (e.g., first vacuum 148a, second vacuum 148b) by the first vacuum source 147a and the second vacuum source 147b where the debris may then be discarded. In some embodiments, as illustrated, the debris entrained within the first inner curtain of gas 187c and the second inner curtain of gas 187d can be pulled into the vacuum 148 (e.g., first vacuum 148a, second vacuum 148b) at least one of upstream from where the first outer downstream portion 189a of the first outer curtain of gas 187a impinges on the first major surface 213a of the glass ribbon 103 or the first major surface 214a of the glass sheet 104 and upstream from where the second outer downstream portion 189b of the second outer curtain of gas 187b impinges on the second major surface 213b of the glass ribbon 103 or the second major surface 214b of the glass sheet 104.

In some embodiments, the inner surface (e.g., first inner surface 1007a, second inner surface 1008a) of each of the first baffle 1005a and the second baffle 1005b can be spaced a distance "b" from the respective major surfaces 213a, 213b of the glass ribbon 103 sufficient to allow development of the cooling stream 1003 entering the lower opening 183 of the glass former 140. In some embodiments, distance "b" can be from about 2 centimeters (cm) to about 200 centimeters, from about 10 cm to about 150 cm, from about 25 cm to about 125 cm, from about 60 cm to about 65 cm, about 63.5 cm, and all subranges therebetween. Such distances "b" of the first baffle 1005a and the second baffle 1005b from the glass ribbon 103 can be selected so as to not interfere with the stability of the glass ribbon 103 and to provide sufficient clearance for any movement of the glass separator 149 along the glass ribbon 103. Likewise, in some embodiments, the inner surface of each of the first baffle 1005a and the second baffle 1005b can be spaced the distance "b" from the respective major surfaces 213a, 213b of the glass ribbon 103 sufficient to allow development of the cooling stream 1003 entering the lower opening 183 of the glass former 140 and to provide space for the first inner curtain of gas 187c and the second inner curtain of gas 187d to travel between the respective first baffle 1005a and the first major surface 213a of the glass ribbon 103 and between the second baffle 1005b and the second major surface 213b of the glass ribbon 103 so as to not interfere with the stability of the glass ribbon 103 and to provide sufficient clearance for any movement of the glass separator 149 along the glass ribbon 103.

In some embodiments, the first baffle 1005a and the second baffle 1005b can be positioned such that the height "H" of each of the first baffle 1005a and the second baffle 1005b can be fixed at any height within a range of from about 0 meters (m) to about 2.5 meters, from about 0 meters to about 0.9 meters, from about 2 centimeters (cm) to about 250 centimeters, from about 2 centimeters to about 200 centimeters, from about 10 cm to about 150 cm, from about 25 cm to about 125 cm, and all subranges therebetween. In some embodiments, the first baffle 1005a and the second baffle 1005b can be selectively adjustable such that the height "H" of each of the first baffle 1005a and the second baffle 1005b can be selectively adjusted from about 0 meters (m) to 2.5 meters, from about 0 meters to about 0.9 meters, from about 2 centimeters (cm) to about 250 centimeters, from about 2 centimeters to about 200 centimeters, from about 10 cm to about 150 cm, from about 25 cm to about 125 cm, and all subranges therebetween. In some embodiments, the adjustable height of the first baffle 1005a and the second baffle 1005b can correspond to a position of the glass separator 149 as the glass separator 149 travels along the draw direction 177 relative to an elevation on the draw plane 181 to separate the glass sheet 104 from the glass ribbon 103. For example, in some embodiments, as the glass separator 149 travels from an upstream position to a downstream position along the draw direction 177, the first baffle 1005a and the second baffle 1005b can extend from a retracted position defining a minimum height of the baffles 1005a, 1005b to an extended position defining a maximum height of the baffles 1005a, 1005b. Similarly, in some embodiments, as the glass separator 149 travels from a downstream position to an upstream position along the draw direction 177, the first baffle 1005a and the second baffle 1005b can retract from the extended position defining a maximum height of the baffles 1005a, 1005b to the retracted position defining a minimum height of the baffles 1005a, 1005b.

In some embodiments, the height "H" of the first baffle 1005a can be measured from a bottom of the glass former 140 to the first downstream edge 1009a of the first baffle 1005a and the height "H" of the second baffle 1005b can be measured from the bottom of the glass former 140 to the second downstream edge 1009b of the second baffle 1005b. In some embodiments, the height "H" of the first baffle 1005a can be defined as a vertical distance measured from the first elongated gas port 185a (e.g., an exit of the first elongated gas port 185a from which the first outer curtain of gas 187a and the first inner curtain of gas 187c can be distributed) to the first downstream edge 1009a of the first baffle 1005a, and the height "H" of the second baffle 1005b can be defined as a vertical distance measured from the second elongated gas port 185b (e.g., an exit of the second elongated gas port 185b from which the second outer curtain of gas 187b and the second inner curtain of gas 187d can be distributed) to the second downstream edge 1009b of the second baffle 1005b.

Figure 12:
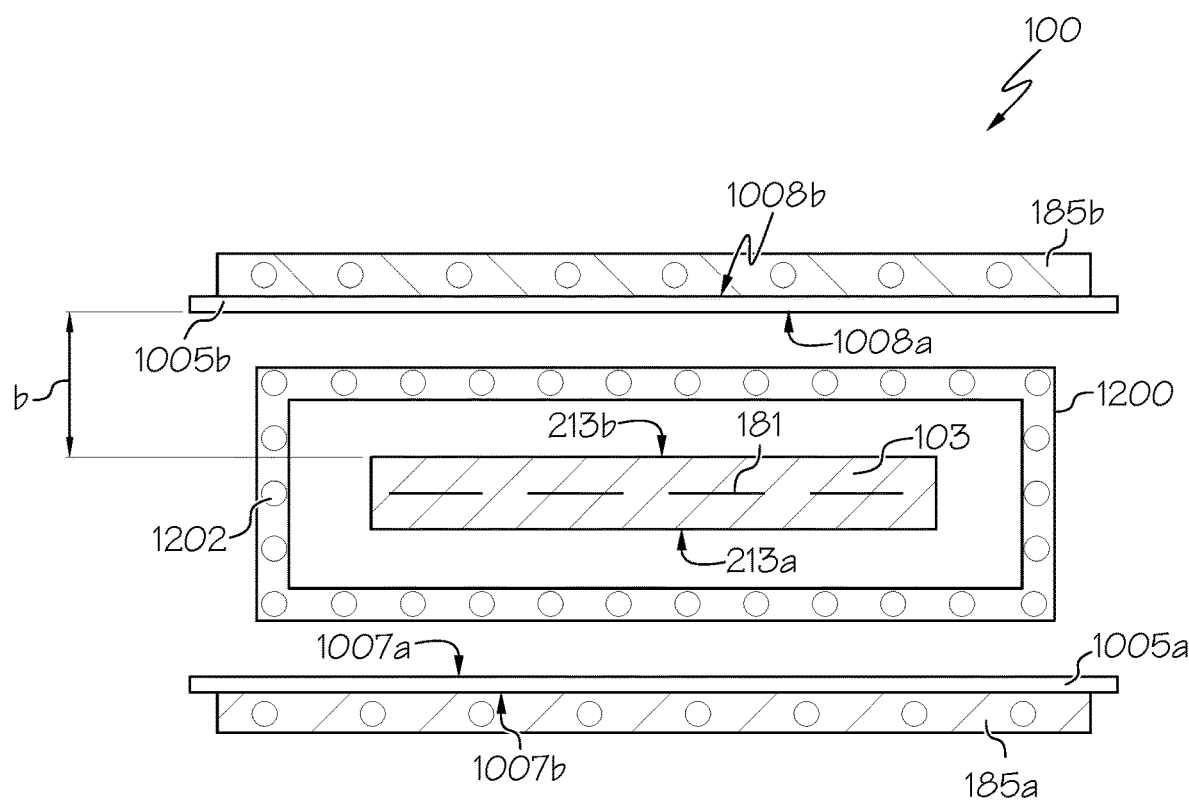
FIG. 12 is a cross-sectional view of the fusion down-draw apparatus along line 12-12 of FIGS. 10 and 11.

As shown in FIGS. 10, 11, and 13, the first baffle 1005a and the second baffle 1005b can be provided as a pair, with an inner surface of each baffle facing the corresponding facing major surfaces 213a, 213b of the glass ribbon 103 and an outer surface of each baffle facing away from the glass ribbon 103. For example, as shown in FIG. 12, the first inner surface 1007a of the first baffle 1005a can be positioned facing the draw plane 181. Similarly, the second inner surface 1008a of the second baffle 1005b can be positioned facing the draw plane 181 and facing the first inner surface 1007a of the first baffle 1005a. The first elongated gas port 185a can be oriented to dispense the first outer curtain of gas 187a to pass over the first outer surface 1007b of the first baffle 1005a before passing over the first downstream edge 1009a of the first baffle 1005a. The second elongated gas port 185b can be oriented to dispense the second outer curtain of gas 187b to pass over the second outer surface 1008b of the second baffle 1005b before passing over the second downstream edge 1009b of the second baffle 1005b.

Figure 14:
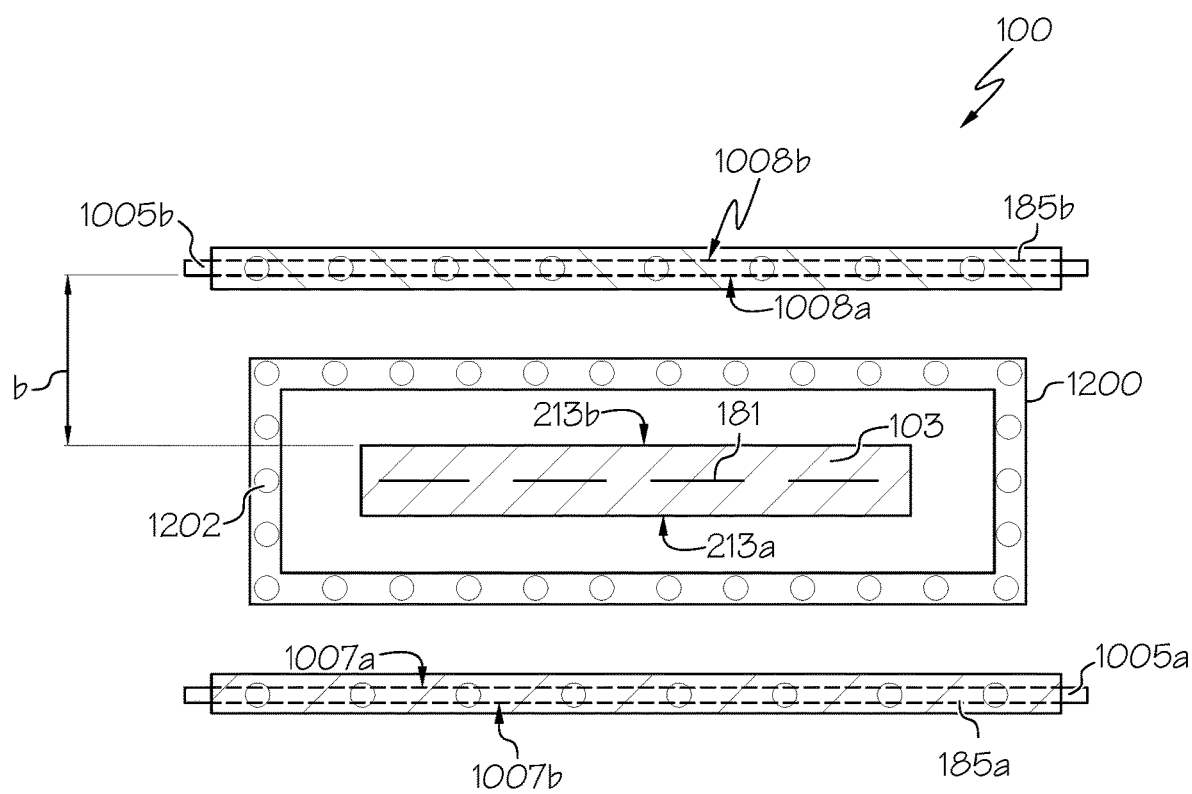
FIG. 14 is a cross-sectional view of the fusion down-draw apparatus along line 14-14 of FIG. 13.

In some embodiments, for example, as shown in FIG. 14, the first baffle 1005a can be positioned to split (e.g., divide, partition) the first elongated gas port 185a such that the first elongated gas port 185a can be oriented to dispense the first outer curtain of gas 187a to pass over the first outer surface 1007b of the first baffle 1005a before passing over the first downstream edge 1009a of the first baffle 1005a and to dispense the first inner curtain of gas 187c to pass over the first inner surface 1007a of the first baffle 1005a. Similarly, the second baffle 1005b can be positioned to split (e.g., divide, partition) the second elongated gas port 185b such that the second elongated gas port 185b can be oriented to dispense the second outer curtain of gas 187b to pass over the second outer surface 1008b of the second baffle 1005b before passing over the second downstream edge 1009b of the second baffle 1005b and to dispense the second inner curtain of gas 187d to pass over the second inner surface 1008a of the second baffle 1005b.

In some embodiments, the first elongated gas port 185a and the second elongated gas port 185b can include a single elongated nozzle, port, jet, etc. that can be split by the respective first baffle 1005a and the second baffle 1005b and from which gas can be distributed to pass over both sides of each of the respective first baffle 1005a and the second baffle 1005b to form continuous, uniform curtains of gas that may inhibit or even prevent penetration by environmental debris 1002. In some embodiments, the first elongated gas port 185a and the second elongated gas port 185b can include a plurality of nozzles, ports, jets, etc. that can be arranged on both sides of the first baffle 1005a and the second baffle 1005b and from which gas can be distributed to form continuous, uniform curtains of gas that may inhibit or even prevent penetration by environmental debris 1002. In some embodiments, each of the first elongated gas port 185a and the second elongated gas port 185b can include any one or more of a continuous elongated slot and a plurality of elongated slots oriented to respectively distribute the first outer curtain of gas 187a and the first inner curtain of gas 187c as well as the second outer curtain of gas 187b and the second inner curtain of gas 187d.

The first baffle 1005a and the second baffle 1005b can be parallel to the draw plane 181 and, in some embodiments, can extend along an entire width "W" of the glass ribbon 103. Similarly, any one or more of the first outer curtain of gas 187a, the first inner curtain of gas 187c, the second outer curtain of gas 187b, and the second inner curtain of gas 187d can extend along the entire width "W" of the glass ribbon 103. The glass ribbon 103 can be drawn between the first inner surface 1007a of the first baffle 1005a and the second inner surface 1008a of the second baffle 1005b. In some embodiments, the first downstream edge 1009a of the first baffle 1005a and the second downstream edge 1009b of the second baffle 1005b can be symmetrically disposed relative to the draw plane 181 at a common upstream elevation relative to the draw plane 181 such that the first outer downstream portion 189a of the first outer curtain of gas 187a and the second outer downstream portion 189b of the second outer curtain of gas 187b can be symmetrically disposed relative to the draw plane 181 and impinge on the glass ribbon 103 at a common downstream elevation relative to the draw plane 181.

As shown, in some embodiments, the first baffle 1005a and the second baffle 1005b may be parallel to the draw plane 181 of the glass former 140 and parallel to the glass ribbon 103 (e.g., oriented at an angle of zero degrees relative to vertical, with vertical being defined as a direction parallel to the draw plane 181), although other orientations are possible in some embodiments. For example, in some embodiments, the first baffle 1005a and the second baffle 1005b may be oriented, in a fixed or selectively adjustable orientation, at an angle relative to vertical within a range of from about 0° to about 45° inward toward the draw plane 181, from about 0° to about 30° inward toward the draw plane 181, from about 0° to about 15° inward toward the draw plane 181, 0° to about 5° inward toward the draw plane 181, and all angles and sub angles therebetween. If the baffle is angled too far inward toward the draw plane 181 (e.g., at an angle relative to vertical greater than 45° inward toward the draw plane 181), the curtain of gas (e.g., any one or more of the first outer curtain of gas 187a, the first inner curtain of gas 187c, the second outer curtain of gas 187b, and the second inner curtain of gas 187d) may converge too quickly and impinge on the glass ribbon 103 at a higher elevation than desired. Conversely, in some embodiments, if the baffle is angled too far outward away from the draw plane 181 (e.g., at an angle relative to vertical greater than 5° outward away from the draw plane 181), the curtain of gas (e.g., any one or more of the first outer curtain of gas 187a, the first inner curtain of gas 187c, the second outer curtain of gas 187b, and the second inner curtain of gas 187d) may have difficulty converging or may not converge at all and therefore may not impinge on the glass ribbon 103, thus preventing creation of a suitable curtain of gas to isolate the glass ribbon 103 from at least one of environmental debris 1002 and separation debris 1001.

In some embodiments, each of the first baffle 1005a and the second baffle 1005b may be manufactured from a rigid material that maintains a shape when subjected to applied forces or a flexible material the shape of which can shift and change when subjected to applied forces. For example, in some embodiments, a rigid material from which the first baffle 1005a and the second baffle 1005b can be manufactured can provide a structure which maintains a predefined shape during operation. Conversely, in some embodiments, a flexible material from which the first baffle 1005a and the second baffle 1005b can be manufactured can provide a structure which adjusts to define a shape or a plurality of shapes during operation.

In some embodiments, each of the first baffle 1005a and the second baffle 1005b may be provided as a segmented baffle, having at least two portions, each of the at least two portions being oriented at a different angle relative to vertical. For example, in some embodiments, the segmented baffle can include an upper portion of the segmented baffle oriented at zero degrees from vertical and a lower portion of the segmented baffle, downstream from the upper portion of the segmented baffle, oriented, in a fixed or selectively adjustable orientation, at an angle relative to vertical within a range of from about 0° to about 45° inward toward the draw plane 181, from about 0° to about 30° inward toward the draw plane 181, from about 0° to about 15° inward toward the draw plane 181, 0° to about 5° inward toward the draw plane 181, and all angles and sub angles therebetween. As discussed above, if the lower portion of the segmented baffle is angled too far inward toward the draw plane 181 (e.g., at an angle relative to vertical greater than 45° inward toward the draw plane 181), the curtain of gas (e.g., any one or more of the first outer curtain of gas 187a, the first inner curtain of gas 187c, the second outer curtain of gas 187b, and the second inner curtain of gas 187d) may converge too quickly and impinge on the glass ribbon 103 at a higher elevation than desired. Conversely, in some embodiments, if the lower portion of the segmented baffle is angled too far outward away from the draw plane 181 (e.g., at an angle relative to vertical greater than 5° outward away from the draw plane 181), the curtain of gas (e.g., any one or more of the first outer curtain of gas 187a, the first inner curtain of gas 187c, the second outer curtain of gas 187b, and the second inner curtain of gas 187d) may have difficulty converging or may not converge at all and therefore may not impinge on the glass ribbon 103, thus preventing creation of a suitable curtain of gas to isolate the glass ribbon 103 from at least one of environmental debris 1002 and separation debris 1001.

In some embodiments, a velocity of the first outer curtain of gas 187a and the second outer curtain of gas 187b can be controlled (e.g., increased, decreased) to adjust (e.g., extend, shorten) the first outer upstream portion 188a of the first outer curtain of gas 187a and the second outer upstream portion 188b of the second outer curtain of gas 187b to control the elevation at which the first outer downstream portion 189a of the first outer curtain of gas 187a impinges on the first major surface 213a of the glass ribbon 103 as well as to control the elevation at which the second outer downstream portion 189b of the second outer curtain of gas 187b impinges on the second major surface 213b of the glass ribbon 103. Similarly, in some embodiments, a velocity of the first inner curtain of gas 187c and the second inner curtain of gas 187d can be controlled (e.g., increased, decreased) to adjust (e.g., extend, shorten) the first inner upstream portion 188c of the first inner curtain of gas 187c and the second inner upstream portion 188d of the second inner curtain of gas 187d to control the elevation at which the first inner downstream portion 189c of the first inner curtain of gas 187c impinges on the first major surface 213a of the glass ribbon 103 as well as to control the elevation at which the second inner downstream portion 189d of the second inner curtain of gas 187d impinges on the second major surface 213b of the glass ribbon 103. In some embodiments, a temperature of the gas from which any one or more of the first outer curtain of gas 187a, the first inner curtain of gas 187c, the second outer curtain of gas 187b, and the second inner curtain of gas 187d is formed can be controlled, adjusted, and maintained.

In some embodiments, a flow rate (e.g., volume of gas per unit time) of any one or more of the first outer curtain of gas 187a, the first inner curtain of gas 187c, the second outer curtain of gas 187b, and the second inner curtain of gas 187d can be controlled to provide a same, similar, or different flow rate among the any one or more of the first outer curtain of gas 187a, the first inner curtain of gas 187c, the second outer curtain of gas 187b, and the second inner curtain of gas 187d as well as to maintain constant and to adjust a flow rate of the any one or more of the first outer curtain of gas 187a, the first inner curtain of gas 187c, the second outer curtain of gas 187b, and the second inner curtain of gas 187d. For example, in some embodiments, the first inner curtain of gas 187c can include a flow rate that is within a range of 0% (e.g., no flow) to about 40%, for example, from about 0% to about 20%, of the flow rate of the gas provided from the first elongated gas port 185a. Accordingly, in some embodiments, the first outer curtain of gas 187a can include a corresponding flow rate that is within a range of 100% to about 60%, for example from about 100% to about 80% of the flow rate of the gas provided from the first elongated gas port 185a. Likewise, in some embodiments, the second inner curtain of gas 187d can include a flow rate that is within a range of 0% (e.g., no flow) to about 40%, for example, from about 0% to about 20%, of the flow rate of the gas provided from the second elongated gas port 185b. Accordingly, in some embodiments, the second outer curtain of gas 187b can include a corresponding flow rate that is within a range of 100% to about 60%, for example from about 100% to about 80% of the flow rate of the gas provided from the second elongated gas port 185b. It is to be understood that, in some embodiments, the flow rate of any one or more of the first outer curtain of gas 187a, the first inner curtain of gas 187c, the second outer curtain of gas 187b, and the second inner curtain of gas 187d may include other flow rates including flow rates not explicitly disclosed herein without departing from the scope of the disclosure.

In some embodiments, only the first outer curtain of gas 187a and the second outer curtain of gas 187b may be provided during operation to create a controlled environment in which the glass ribbon 103 can be isolated from the environmental debris 1002. In some embodiments, the first outer curtain of gas 187a, the first inner curtain of gas 187c, the second outer curtain of gas 187b, and the second inner curtain of gas 187d may be provided during operation to create a controlled environment in which the glass ribbon 103 can be isolated from at least one of the environmental debris 1002 and the separation debris 1001. In some embodiments, any one or more of the first outer curtain of gas 187a, the first inner curtain of gas 187c, the second outer curtain of gas 187b, and the second inner curtain of gas 187d may be selectively provided (e.g., at least one of continuously, intermittently, periodically, etc.) during operation to selectively create the controlled environment in which the glass ribbon 103 can be isolated from at least one of the environmental debris 1002 and the separation debris 1001.

As shown in FIGS. 10, 11, and 13, the first outer curtain of gas 187a and the second outer curtain of gas 187b can travel along the corresponding first major surface 213a of the glass ribbon 103 and the second major surface 213b of the glass ribbon 103 along the transverse separation path 151. Consequently, separation debris 1001 can be entrained in the first outer curtain of gas 187a and the second outer curtain of gas 187b and quickly passed over the glass sheet 104 with relatively little time to attach or otherwise contact the first major surface 214a and the second major surface 214b of the glass sheet 104. Moreover, the first outer curtain of gas 187a and the second outer curtain of gas 187b can create a gas barrier (e.g., an effective clean room) that environmental debris 1002 will not penetrate. In addition, the first outer curtain of gas 187a and the second outer curtain of gas 187b can likewise entrain environmental debris 1002 as well as the separation debris 1001, both of which debris types can then be quickly passed over the glass sheet 104 with relatively little time to attach or otherwise contact the first major surface 214a and the second major surface 214b of the glass sheet 104 and subsequently deposited in the vacuum port 1011. Moreover, the first outer curtain of gas 187a and the second outer curtain of gas 187b can isolate the glass ribbon 103 from ambient air and maintain a higher temperature of the glass ribbon 103 along the transverse separation path 151 which can be advantageous during some separation processes which may be better facilitated when the glass ribbon 103 is provided at relatively higher temperatures.

As shown in FIG. 13, in some embodiments, the first inner curtain of gas 187c and the second inner curtain of gas 187d can travel along the corresponding first major surface 213a of the glass ribbon 103 and the second major surface 213b of the glass ribbon 103 along the transverse separation path 151. Consequently, separation debris 1001 can be entrained in the first inner curtain of gas 187c and the second inner curtain of gas 187d and quickly passed over the glass sheet 104 with relatively little time to attach or otherwise contact the first major surface 214a and the second major surface 214b of the glass sheet 104. Moreover, the first inner curtain of gas 187c and the second inner curtain of gas 187d can create a gas barrier (e.g., an effective clean room) that environmental debris 1002 will not penetrate. In addition, the first inner curtain of gas 187c and the second inner curtain of gas 187d can likewise entrain environmental debris 1002 as well as the separation debris 1001, both of which debris types can then be quickly passed over the glass sheet 104 with relatively little time to attach or otherwise contact the first major surface 214a and the second major surface 214b of the glass sheet 104 and subsequently deposited in the vacuum port 1011. Moreover, the first inner curtain of gas 187*c* and the second inner curtain of gas 187*d* can isolate the glass ribbon 103 from ambient air and maintain a higher temperature of the glass ribbon 103 along the transverse separation path 151 which can be advantageous during some separation processes which may be better facilitated when the glass ribbon 103 is provided at relatively higher temperatures.

Additionally, in some embodiments, the first inner curtain of gas 187*c* and the second inner curtain of gas 187*d* can likewise entrain environmental debris 1002 as well as the separation debris 1001, both of which debris types can then be quickly passed over the glass ribbon 103 with relatively little time to attach or otherwise contact the first major surface 213*a* and the second major surface 213*b* of the glass ribbon 103 and subsequently deposited in the corresponding first vacuum 148*a* and second vacuum 148*b*. For example, the first inner upstream portion 188*c* of the first inner curtain of gas 187*c* and the second inner upstream portion 188*d* of the second inner curtain of gas 187*d* can travel along a respective first inner upstream path and second inner upstream path to pass over the glass separator 149 on both major sides of the glass ribbon 103. The corresponding first vacuum 148*a* and second vacuum 148*b* can then draw the respective first inner curtain of gas 187*c* and the second inner curtain of gas 187*d* into the first vacuum 148*a* and second vacuum 148*b*. In some embodiments, the first vacuum 148*a* and the second vacuum 148*b* can also draw a component of gas from the first outer curtain of gas 187*a* and the second outer curtain of gas 187*b* that, for example, may be traveling in an upstream direction based at least in part on natural convection, into the first vacuum 148*a* and second vacuum 148*b* entraining at least one of separation debris 1001 and environmental debris 1002 in the process and preventing contamination of the glass ribbon 103.

As shown in FIG. 10, in some embodiments, the glass separator 149 can be positioned downstream (e.g., along the draw direction 177, shown in FIG. 2) from where the first outer downstream portion 189*a* of the first outer curtain of gas 187*a* impinges on the first major surface 213*a* of the glass ribbon 103. In some embodiments, the glass separator 149 can be positioned downstream from where the second outer downstream portion 189*b* of the second outer curtain of gas 187*b* impinges on the second major surface 213*b* of the glass ribbon 103. Further, in some embodiments, the glass separator 149 can be positioned downstream from where the first outer downstream portion 189*a* of the first outer curtain of gas 187*a* impinges on the first major surface 213*a* of the glass ribbon 103 and downstream from where the second outer downstream portion 189*b* of the second outer curtain of gas 187*b* impinges on the second major surface 213*b* of the glass ribbon 103. By positioning the glass separator 149 downstream from where at least one of the first outer downstream portion 189*a* of the first outer curtain of gas 187*a* impinges on the first major surface 213*a* of the glass ribbon 103 and downstream from where the second outer downstream portion 189*b* of the second outer curtain of gas 187*b* impinges on the second major surface 213*b* of the glass ribbon 103, and by separating the glass sheet 104 from the glass ribbon 103 downstream from where at least one of the first outer downstream portion 189*a* of the first outer curtain of gas 187*a* impinges on the first major surface 213*a* of the glass ribbon 103 and downstream from where the second outer downstream portion 189b of the second outer curtain of gas 187*b* impinges on the second major surface 213*b* of the glass ribbon 103, separation debris 1001 can be immediately entrained in at least one of the first outer curtain of gas 187*a* and the second outer curtain of gas 187*b*. The separation debris 1001 entrained in the at least one of the first outer curtain of gas 187*a* and the second outer curtain of gas 187*b* can then be drawn into the vacuum port 1011 with an underpressure applied to the vacuum port 1011. By entraining the separation debris 1001 in at least one of the first outer curtain of gas 187*a* and the second outer curtain of gas 187*b* and then drawing the separation debris 1001 into the vacuum port 1011, the separation debris 1001 can be removed from the area surrounding the glass ribbon 103 and can be prevented from contacting and adhering to the major surfaces 213*a*, 213*b* of the glass ribbon 103 and the major surfaces 214*a*, 214*b* of the glass sheet 104.

As shown in FIG. 11, in some embodiments, the glass separator 149 can be positioned upstream (e.g., along the draw direction 177, shown in FIG. 2) from where the first outer downstream portion 189*a* of the first outer curtain of gas 187*a* impinges on the first major surface 213*a* of the glass ribbon 103. In some embodiments, the glass separator 149 can be positioned upstream from where the second outer downstream portion 189*b* of the second outer curtain of gas 187*b* impinges on the second major surface 213*b* of the glass ribbon 103. Further, in some embodiments, the glass separator 149 can be positioned upstream from where the first outer downstream portion 189*a* of the first outer curtain of gas 187*a* impinges on the first major surface 213*a* of the glass ribbon 103 and upstream from where the second outer downstream portion 189*b* of the second outer curtain of gas 187*b* impinges on the second major surface 213*b* of the glass ribbon 103. By positioning the glass separator 149 upstream from where at least one of the first outer downstream portion 189*a* of the first outer curtain of gas 187*a* impinges on the first major surface 213*a* of the glass ribbon 103 and upstream from where the second outer downstream portion 189*b* of the second outer curtain of gas 187*b* impinges on the second major surface 213*b* of the glass ribbon 103, and by separating the glass sheet 104 from the glass ribbon 103 upstream from where at least one of the first outer downstream portion 189*a* of the first outer curtain of gas 187*a* impinges on the first major surface 213*a* of the glass ribbon 103 and upstream from where the second outer downstream portion 189*b* of the second outer curtain of gas 187*b* impinges on the second major surface 213*b* of the glass ribbon 103, the glass ribbon 103 and the glass sheet 104 can be isolated within an area 1212 defined laterally between the first outer curtain of gas 187*a* and the second outer curtain of gas 187*b* from environmental debris 1002 that may otherwise contact and adhere to the major surfaces 213*a*, 213*b* of the glass ribbon 103 and the major surfaces 214*a*, 214*b* of the glass sheet 104. As shown, in some embodiments, the area 1212 can be upstream from where at least one of the first outer downstream portion 189*a* of the first outer curtain of gas 187*a* impinges on the first major surface 213*a* of the glass ribbon 103 and upstream from where the second outer downstream portion 189*b* of the second outer curtain of gas 187*b* impinges on the second major surface 213*b* of the glass ribbon 103. In some embodiments, with operation of the vacuum 148, separation debris 1001 produced within the area 1212 can be removed from the area 1212. In addition, separation debris 1001 can travel downward by gravity and can be entrained in the at least one of the first outer curtain of gas 187*a* and the second outer curtain of gas 187*b*. The separation debris 1001 entrained in the at least one of the first outer curtain of gas 187*a* and the second outer curtain of gas 187*b* can then be drawn into the vacuum port 1011 with an underpressure applied to the vacuum port 1011.

As shown in FIG. 13, in some embodiments, the glass separator 149 can be positioned downstream (e.g., along the draw direction 177, shown in FIG. 2) from where the first inner downstream portion 189c of the first inner curtain of gas 187c impinges on the first major surface 213a of the glass ribbon 103. In some embodiments, the glass separator 149 can be positioned downstream from where the second inner downstream portion 189d of the second inner curtain of gas 187d impinges on the second major surface 213b of the glass ribbon 103. In some embodiments, the glass separator 149 can be positioned downstream from where the first inner downstream portion 189c of the first inner curtain of gas 187c impinges on the first major surface 213a of the glass ribbon 103 and downstream from where the second inner downstream portion 189d of the second inner curtain of gas 187d impinges on the second major surface 213b of the glass ribbon 103. By positioning the glass separator 149 downstream from where at least one of the first inner downstream portion 189c of the first inner curtain of gas 187c impinges on the first major surface 213a of the glass ribbon 103 and downstream from where the second inner downstream portion 189d of the second inner curtain of gas 187d impinges on the second major surface 213b of the glass ribbon 103, and by separating the glass sheet 104 from the glass ribbon 103 downstream from where at least one of the first inner downstream portion 189c of the first inner curtain of gas 187c impinges on the first major surface 213a of the glass ribbon 103 and downstream from where the second inner downstream portion 189d of the second inner curtain of gas 187d impinges on the second major surface 213b of the glass ribbon 103, separation debris 1001 can be immediately entrained in at least one of the first inner curtain of gas 187c and the second inner curtain of gas 187d. The separation debris 1001 entrained in the at least one of the first inner curtain of gas 187c and the second inner curtain of gas 187d can then be drawn into at least one of the vacuum port 1011 with an underpressure applied to the vacuum port 1011 and the first vacuum 148a and the second vacuum 148b. By entraining the separation debris 1001 in at least one of the first inner curtain of gas 187c and the second inner curtain of gas 187d and then drawing the separation debris 1001 into the at least one of the vacuum port 1011 and the first vacuum 148a and second vacuum 148b, the separation debris 1001 can be removed from the area surrounding the glass ribbon 103 and can be prevented from contacting and adhering to the major surfaces 213a, 213b of the glass ribbon 103 and the major surfaces 214a, 214b of the glass sheet 104.

As shown in FIG. 13, in some embodiments, the glass separator 149 can be positioned upstream (e.g., along the draw direction 177, shown in FIG. 2) from where the first outer downstream portion 189a of the first outer curtain of gas 187a impinges on the first major surface 213a of the glass ribbon 103 and downstream from where the first inner downstream portion 189c of the first inner curtain of gas 187c impinges on the first major surface 213a of the glass ribbon 103. In some embodiments, the glass separator 149 can be positioned upstream from where the second outer downstream portion 189b of the second outer curtain of gas 187b impinges on the second major surface 213b of the glass ribbon 103 and downstream from where the second inner downstream portion 189d of the second inner curtain of gas 187d impinges on the second major surface 213b of the glass ribbon 103. In some embodiments, the glass separator 149 can be positioned upstream from where the first outer downstream portion 189a of the first outer curtain of gas 187a impinges on the first major surface 213a of the glass ribbon 103 and upstream from where the second outer downstream portion 189b of the second outer curtain of gas 187b impinges on the second major surface 213b of the glass ribbon 103 and downstream from where the first inner downstream portion 189c of the first inner curtain of gas 187c impinges on the first major surface 213a of the glass ribbon 103 and downstream from where the second inner downstream portion 189d of the second inner curtain of gas 187d impinges on the second major surface 213b of the glass ribbon 103.

In some embodiments, the glass ribbon 103 and the glass sheet 104 can be isolated within an area 1212 defined laterally between the first outer curtain of gas 187a and the second outer curtain of gas 187b from environmental debris 1002 that may otherwise contact and adhere to the major surfaces 213a, 213b of the glass ribbon 103 and the major surfaces 214a, 214b of the glass sheet 104. For example, in some embodiments, the glass ribbon 103 and the glass sheet 104 can be isolated within the area 1212 by positioning the glass separator 149 upstream from where the first outer downstream portion 189a of the first outer curtain of gas 187a impinges on the first major surface 213a of the glass ribbon 103 and upstream from where the second outer downstream portion 189b of the second outer curtain of gas 187b impinges on the second major surface 213b of the glass ribbon 103. In addition, the glass ribbon 103 and the glass sheet 104 can be isolated within the area 1212 by positioning the glass separator 149 downstream from where the first inner downstream portion 189c of the first inner curtain of gas 187c impinges on the first major surface 213a of the glass ribbon 103 and downstream from where the second inner downstream portion 189d of the second inner curtain of gas 187d impinges on the second major surface 213b of the glass ribbon 103. Accordingly, by separating the glass sheet 104 from the glass ribbon 103 upstream from where the first outer downstream portion 189a of the first outer curtain of gas 187a impinges on the first major surface 213a of the glass ribbon 103 and upstream from where the second outer downstream portion 189b of the second outer curtain of gas 187b impinges on the second major surface 213b of the glass ribbon 103 and downstream from where the first inner downstream portion 189c of the first inner curtain of gas 187c impinges on the first major surface 213a of the glass ribbon 103 and downstream from where the second inner downstream portion 189d of the second inner curtain of gas 187d impinges on the second major surface 213b of the glass ribbon 103, the glass ribbon 103 and the glass sheet 104 can be isolated within the area 1212 from contact with at least one of environmental debris 1002 and separation debris 1001.

Likewise, the glass ribbon 103 and the glass sheet 104 can be isolated within the area 1212 defined laterally between the first inner curtain of gas 187c and the second inner curtain of gas 187d from at least one of environmental debris 1002 and separation debris 1001 that may otherwise contact and adhere to the major surfaces 213a, 213b of the glass ribbon 103 and the major surfaces 214a, 214b of the glass sheet 104. As shown, in some embodiments, the area 1212 can be upstream from where at least one of the first outer downstream portion 189a of the first outer curtain of gas 187a impinges on the first major surface 213a of the glass ribbon 103 and upstream from where the second outer downstream portion 189b of the second outer curtain of gas 187b impinges on the second major surface 213b of the glass ribbon 103. In some embodiments, the area 1212 can be upstream from where at least one of the first inner downstream portion 189c of the first inner curtain of gas 187c impinges on the first major surface 213a of the glass ribbon 103 and upstream from where the second inner downstream portion 189d of the second inner curtain of gas 187d impinges on the second maj or surface 213b of the glass ribbon 103.

Accordingly, in some embodiments, the glass separator 149 can be positioned between the first outer curtain of gas 187a and the first inner curtain of gas 187c facing the first major surface 213a of the glass ribbon 103, and the glass separator 149 can be positioned between the second outer curtain of gas 187b and the second inner curtain of gas 187d facing the second major surface 213b of the glass ribbon 103. The first outer curtain of gas 187a, the first inner curtain of gas 187c, the second outer curtain of gas 187b, and the second inner curtain of gas 187d can therefore enclose the glass separator 149 and isolate the glass ribbon 103 from at least one of the separation debris 1001 and the environmental debris 1002 contacting and adhering to the major surfaces 213a, 213b of the glass ribbon 103. In some embodiments, for example, with operation of the vacuum 148 (e.g., first vacuum 148a, second vacuum 148b), separation debris 1001 produced within the area 1212 can be removed from the area 1212. In addition, separation debris 1001 can travel downward by gravity and can be entrained in the at least one of the first outer curtain of gas 187a, the first inner curtain of gas 187c, the second outer curtain of gas 187b, and the second inner curtain of gas 187d. The separation debris 1001 entrained in the at least one of the first outer curtain of gas 187a, the first inner curtain of gas 187c, the second outer curtain of gas 187b, and the second inner curtain of gas 187d can then be drawn into the vacuum port 1011 with an underpressure applied to the vacuum port 1011.

As further shown, the glass processing apparatus 100 can include an optional gas dispenser 1200 including a gas outlet 1202 oriented to dispense a gas stream 1205 in the draw direction 177 along the draw plane 181. The gas outlet 1202 can be positioned downstream (e.g., along the draw direction 177, shown in FIG. 2) from the glass former 140 and upstream (e.g., along the draw direction 177) from the glass separator 149. In some embodiments, the gas outlet 1202 can be oriented to dispense the gas stream 1205 along the draw plane 181 along an entire width of the draw plane 181 (e.g., along an entire width "W" of the glass ribbon 103). In some embodiments, the gas outlet 1202 can be oriented to dispense the gas stream 1205 along the draw plane 181 to circumscribe the draw plane 181 (e.g., to circumscribe the glass ribbon 103). As shown in FIGS. 12 and 14, the gas dispenser 1200 can circumscribe the draw plane 181 (e.g., circumscribe the glass ribbon 103) and the gas outlet 1202 of the gas dispenser 1200 can be laterally positioned between the first baffle 1005a and the second baffle 1005b. As with the gas provided to the first outer curtain of gas 187a and the second outer curtain of gas 187b, the gas provided to the gas dispenser 1200 can be filtered and clean of any contaminants.

The gas dispenser 1200 can purge debris, including separation debris 1001 as well as any environmental debris 1002 that may have penetrated any one or more of the first outer curtain of gas 187a, the first inner curtain of gas 187c, the second outer curtain of gas 187b, and the second inner curtain of gas 187d from the area 1212. As shown, the gas dispenser 1200 can dispense a gas stream 1205 in the draw direction 177 along the draw plane 181. In some embodiments, the gas stream 1205 can extend along an entire width "W" of the glass ribbon 103 and, in some embodiments, the gas stream 1205 can circumscribe the draw plane 181 and can circumscribe the glass ribbon 103. It is to be understood that the gas outlet 1202 of the gas dispenser 1200 can include any one or more nozzles, ports, jets, etc. that individually or in combination can be oriented to dispense the gas stream 1205 in the draw direction 177 along the draw plane 181. In some embodiments, the gas outlet 1202 can include any one or more of a continuous elongated slot and a plurality of elongated slots oriented to dispense the gas stream 1205 in the draw direction 177 along the draw plane 181. In some embodiments, the gas dispenser can flush the area 1212 free of any particulates without recirculating the air in the area 1212. Moreover, the gas dispenser 1200 can be selectively operated to, for example, purge debris from the area 1212 at the beginning of the glass manufacturing process, periodically throughout the glass manufacturing process, and at the end of the glass manufacturing process.

As indicated by arrow 1301 in FIG. 15, the glass processing apparatus 100 can also include a washer 1303 that can receive the glass sheet 104 relatively quickly after the glass sheet 104 has been separated from the glass ribbon 103 and/or after the outer portions 159 have been separated from the central portion 161 of the glass sheet 104, discussed with reference to FIG. 1 above. In some embodiments, the glass sheet 104 can be quickly moved between the separation station (e.g., the glass separator 149) and the washing station (e.g., the washer 1303). As discussed above, moving the glass sheet 104 relatively quickly from the glass separator 149 to be received by the washer 1303 can help prevent debris (e.g., glass shards, particles, etc.) from adhering to a pristine major surface (e.g., the first major surface 214a of the glass sheet 104 and the second major surface 214b of the glass sheet 104). Indeed, debris landing on a major surface 214a, 214b of the glass sheet 104 during the separation steps can be quickly removed before the debris has time to form a significant bond with the major surface 214a, 214b of the glass sheet 104. In some embodiments, relatively quick movement of the glass sheet 104 (represented by travel direction 1321 in FIGS. 1 and 15) can involve a time lapse of from about 1 second to about 20 seconds, such as from about 1 second to about 15 seconds, from the time the glass sheet 104 leaves the separation station until the glass sheet 104 begins being received by the washer 1303.

The washer 1303 can include a housing 1305 with a first liquid dispenser 1307 (e.g., a plurality of first liquid dispensers 1307) including a first liquid nozzle 1309 (e.g., a plurality of first liquid nozzles 1309) oriented to dispense liquid against the major surfaces 214a, 214b of the glass sheet 104. While not shown, an exemplary washer 1303 can dispense liquid against both the first major surface 214a of the glass sheet 104 and the second major surface 214b of the glass sheet 104. Accordingly, the depiction of single-sided dispensing, unless otherwise noted, should not limit the scope of the claims appended herewith as such a depiction was conducted for purposes of visual clarity. As shown, the first liquid nozzles 1309 can optionally rotate about a rotational axis as indicated by rotational arrows 1311. In some embodiments (not shown), the first liquid nozzles 1309 can be fixed and non-rotating. Suitable nozzles can include any one or more cone nozzles, flat nozzles, solid stream nozzles, hollow cone nozzles, fine spray nozzles, oval nozzles, square nozzles, etc. In some embodiments, the nozzles can include a flow rate from about 0.25 to about 2500 gallons per minute (gpm) that operate with pressures of from about 0 psi to about 4000 psi. Other nozzle types and designs, including nozzles not explicitly disclosed herein, may be provided in some embodiments.

Figure 15:
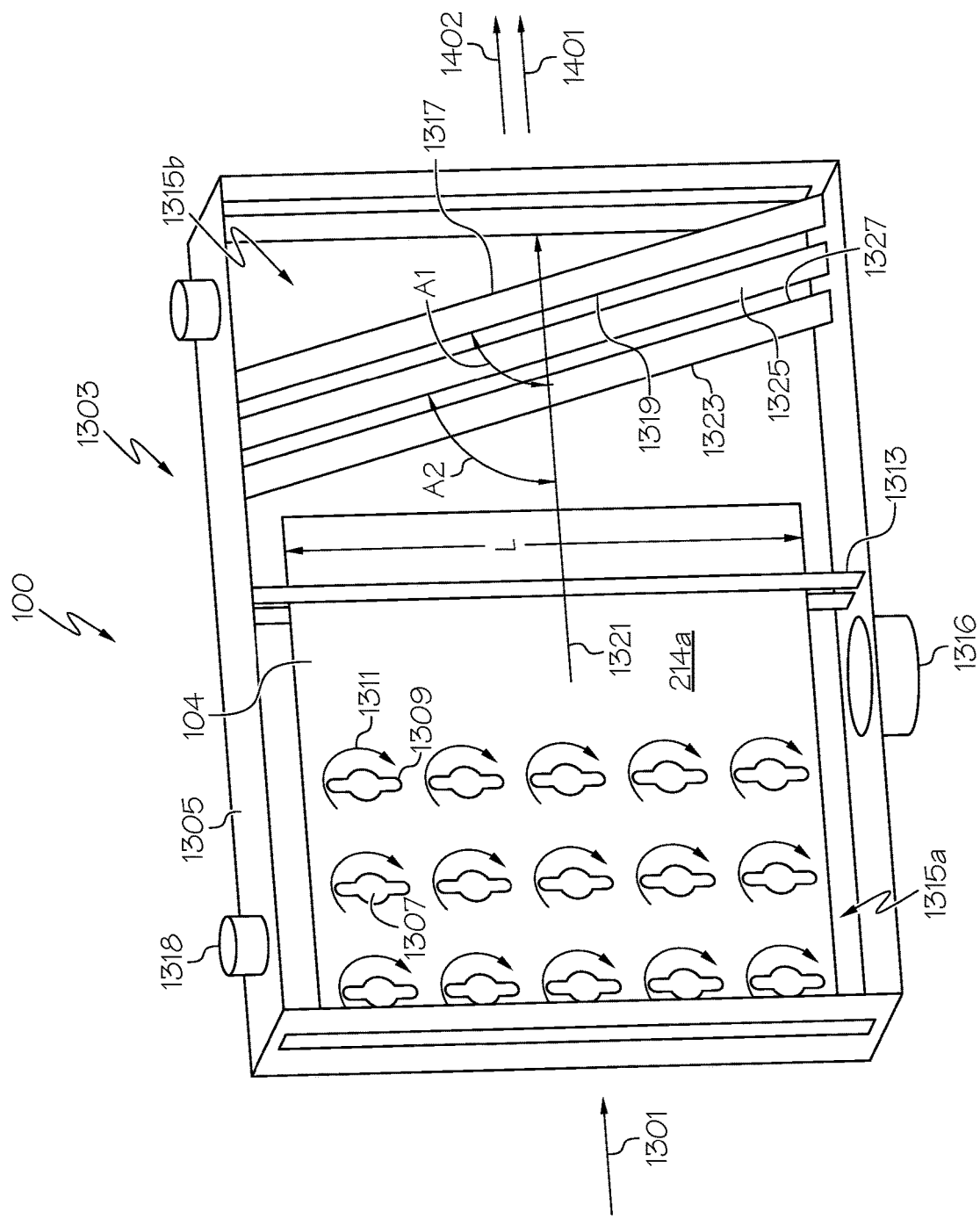
FIG. 15 is a schematic perspective view of a washing station of the glass processing apparatus.

In some embodiments, the housing 1305 can be substantially enclosed, although a side wall of FIG. 15 has been removed to reveal features in the interior of the housing 1305. In some embodiments, the housing 1305 can include a partition 1313 dividing an interior of the housing 1305 into a first area 1315a and a second area 1315b. The second area 1315b can be positioned downstream (e.g., along travel direction 1321) from the first area 1315a. In the illustrated embodiment, the first area 1315a can include the first liquid dispenser 1307. A drain 1316 can be provided to remove the liquid with any debris entrained in the liquid from the process of washing within the first area 1315a. A vent 1318 can also be provided to prevent pressure build up and to allow vapor and/or gas to escape from the first area 1315a of the housing 1305. As shown, exemplary embodiments can process a glass sheet 104 in a vertical orientation. Suitable mechanisms used for such vertical orientation and movement thereof are described in U.S. Application No. 62/066,656, filed Oct. 21, 2014, the entirety of which is incorporated herein by reference.

The washer 1303 can further include a gas knife 1317 positioned downstream (e.g., along travel direction 1321) from the first liquid dispenser 1307, such as within the second area 1315b of the housing 1305, as shown. The gas knife 1317 can include a gas nozzle 1319 (e.g., an elongated nozzle) oriented to extend along the entire length "L" of the glass sheet 104 and oriented to dispense gas against the major surfaces 214a, 214b of the glass sheet 104 to remove liquid from the major surfaces 214a, 214b of the glass sheet 104. The gas knife 1317 may be oriented at a first angle "A1" relative to the travel direction 1321 of the glass sheet 104 through the washer 1303. In some embodiments, the first angle "A1" can be about 90° (e.g., vertical), about 45°, from about 45° to about 90°, for example, from about 60° to about 85°, for example, from about 70° to about 80°, and all ranges and subranges therebetween. In some embodiments, the first angle "A1" can be about 135°, from about 90° to about 135°, for example, from about 95° to about 120°, for example, from about 100° to about 110°, and all ranges and subranges therebetween. The gas knife 1317 can be designed to dispense gas against the major surfaces 214a, 214b of the glass sheet 104 to remove liquid from the major surfaces 214a, 214b of the glass sheet 104. Suitable gases include, but are not limited to, air, nitrogen, low humidity gases, and the like.

As further illustrated, the second area 1315b can optionally include a second liquid dispenser 1323 including a second liquid nozzle 1327 oriented to rinse the major surfaces 214a, 214b of the glass sheet 104 at a location upstream (e.g., along travel direction 1321) from the gas knife 1317. In some embodiments, the second liquid dispenser 1323 can include a lower pressure liquid stream when compared to the pressure of the liquid stream generated by the first liquid dispenser 1307 in the first area 1315a. Indeed, the lower pressure liquid stream of the second liquid dispenser 1323 can flood the major surfaces 214a, 214b of the glass sheet 104 to remove any detergents, chemicals, debris, or other impurities remaining on the glass sheet 104. As shown, in some embodiments, a deflector 1325 can be positioned downstream (e.g., along travel direction 1321) from the second liquid dispenser 1323 and upstream from the gas knife 1317. The deflector 1325 can be oriented to direct an amount of liquid from the second liquid dispenser 1323 away from the gas knife 1317. As shown, the deflector 1325, such as a wiper blade, may be oriented at a second angle "A2" relative to the travel direction 1321 of the glass sheet 104 through the washer 1303. As shown, the first angle "A1" and the second angle "A2" can be substantially equal to one another; however, such a depiction, unless otherwise noted, should not limit the scope of the claims appended herewith as different angles (oblique, acute, etc. to the direction of travel) may be provided in some embodiments. Moreover, as shown, the second liquid dispenser 1323 may likewise optionally include a second liquid nozzle 1327 (e.g., an elongated liquid nozzle) oriented at a similar or identical angle of the deflector 1325 and the gas knife 1317 relative to the travel direction 1321 of the glass sheet 104 through the washer 1303. The deflector 1325, can direct liquid from the second liquid dispenser 1323 downward and away from the gas knife 1317, thereby reducing the amount of liquid that the gas knife 1317 is required to remove from the glass sheet 104.

Although features of FIG. 15 are illustrated acting on a single one of the major surfaces 214a, 214b of the glass sheet 104, it will be appreciated that similar or identical features may be provided on both sides of the glass sheet 104 to thoroughly wash both the first major surface 214a of the glass sheet 104 and the second major surface 214b of the glass sheet 104. Accordingly, the left side perspective view of the washer 1303 can be a mirror image of the right side perspective view of the washer 1303 illustrated in FIG. 15 and the above discussion and the depiction in FIG. 15 were made for purposes of visual clarity.

Figure 16:
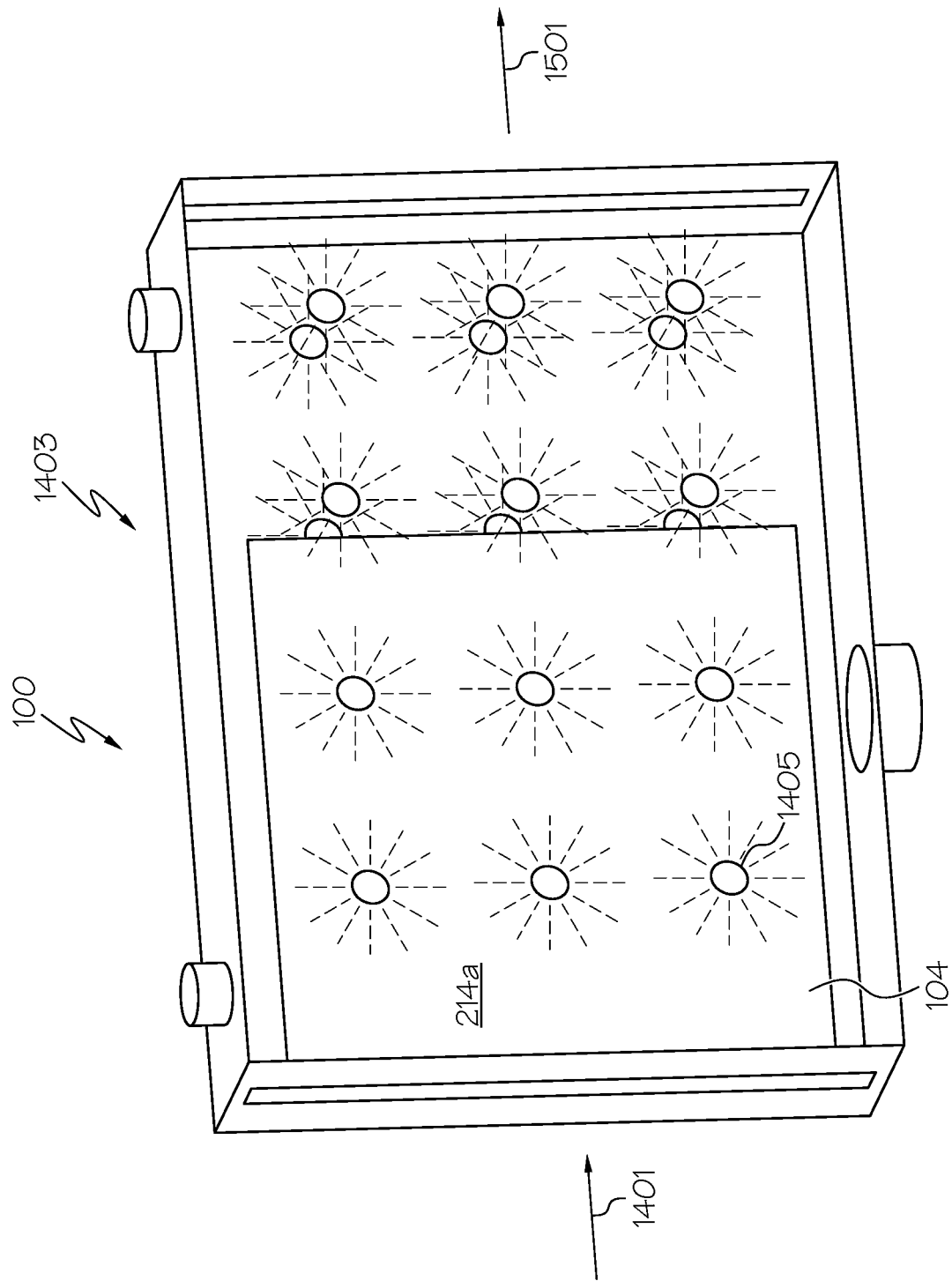
FIG. 16 is a schematic perspective view of a coating application station of the glass processing apparatus.

As indicated by arrow 1401 in FIG. 15, the clean and dry glass sheet 104 exiting the washer 1303 may then be coated by a coating chamber 1403, shown in FIG. 16 to protect the clean major surfaces 214a, 214b of the glass sheet 104. Alternatively, as indicated by arrow 1402 in FIG. 15, the clean and dry glass sheet 104 exiting the washer 1303 may then be coated a sheet surface protection apparatus including the exemplary embodiment of the coating chamber 1403, shown in FIGS. 17 and 18, to protect the clean major surfaces 214a, 214b of the glass sheet 104. In some embodiments, the coating chamber 1403 can be provided either alone or in combination with any one or more features of a fog chamber 1453, plasma deposition chamber, or other suitable coating chamber to provide a coating to coat at least one of the first major surface 214a and the second major surface 214b of the glass sheet 104.

FIG. 16 is a schematic perspective view of a coating application station of the glass processing apparatus 100. With reference to FIG. 16, while only a single side of the glass sheet 104 is illustrated as being coated, it is understood that both sides of the glass sheet 104 can be coated to protect both the first major surface 214a of the glass sheet 104 and the second major surface 214b of the glass sheet 104. Accordingly, the left side perspective view of the coating chamber 1403 can be a mirror image of the right side perspective view of the coating chamber 1403 illustrated in FIG. 16. Vents or exhaust pipes may be provided for the coating chamber 1403 to evacuate portions of or all of the coating chamber 1403. As shown, exemplary embodiments can process the glass sheet 104 in a vertical orientation. Suitable mechanisms used for such vertical orientation and movement thereof is described in U.S. Application No. 62/066,656, filed Oct. 21, 2014, the entirety of which is incorporated herein by reference.

As shown in FIG. 16, in some embodiments, the coating chamber 1403 can include a dispensing port 1405 (e.g., a plurality of dispensing ports 1405) such as a spray nozzle, on one or both sides of the glass sheet 104 oriented to dispense the coating on a major surface (e.g., the first major surface 214a and the second major surface 214b) of the glass sheet 104. In some embodiments, a first plurality of dispensing ports 1405 and a second plurality of dispensing ports 1405 can be provided. Each of the first plurality of dispensing ports can be oriented to dispense a coating on the first major surface 214a of the glass sheet 104, and each of the second plurality of dispensing ports can be oriented to dispense a coating on the second major surface 214b of the glass sheet 104. Although not required, the any one or more of the dispensing ports 1405 can include a plasma deposition port oriented to dispense plasma to coat one or both major surfaces 214a, 214b of the glass sheet 104. The coating on a major surface 214a, 214b of the glass sheet 104 can include a polymer that may be readily removed during a downstream process as discussed below. In some embodiments, the coating can provide a protective layer on at least one of the major surfaces 214a, 214b of the glass sheet 104.

In some embodiments, hydrocarbon precursors can be used for coatings that resist temperatures greater than 400° C. Exemplary hydrocarbon coatings can have a tunable surface energy spectrum from 30 mJ/m$^2$ to 75 mJ/m$^2$ by adding functional groups on top of the hydrocarbon coating either by means of a working gas or by additional precursors. In some embodiments, an organometallic coating can be deposited that can withstand higher than 400° C. temperature. In yet additional embodiments, a combination of hydrocarbon and organosilicon precursors can be used for coatings that can resist temperatures greater than 400° C. with tunable surface energies between 30-75 mJ/m$^2$. Surface energy can also be controlled in some embodiments by adding other functional groups to an organometallic coating such as, but not limited to, amines, hydroxyls, carbonyls and carboxylics, etc., or by controlling coating (top) composition or porosity.

As used herein, the terms "plasma," "atmospheric plasma," and variations thereof are intended to denote a gas that passes through a high frequency electric field. Encountering the electromagnetic field produces ionization of the gas atoms and frees electrons which are accelerated to a high velocity and, thus, a high kinetic energy. Some of the high velocity electrons ionize other atoms by colliding with their outermost electrons and those freed electrons can in turn produce additional ionization, resulting in a cascading ionization effect. The resultant plasma can flow in a stream and the energetic particles caught in this stream can be projected toward an object (e.g., the glass sheet 104).

The plasma can, in various embodiments, be an atmospheric pressure (AP) plasma and a thermal or non-thermal plasma. For example, the temperature of the plasma can range from room temperature (e.g., approximately 25° C.) to higher temperatures, such as up to about 300° C. By way of non-limiting embodiments, the temperature of the plasma can range from about 25° C. to about 300° C., such as from about 50° C. to about 250° C., or from about 100° C. to about 200° C., including all ranges and subranges therebetween. The plasma can include at least one gas chosen from argon, helium, nitrogen, air, hydrogen, water vapor, and mixtures thereof, to name a few. According to some embodiments, argon can be employed as the plasma gas.

In non-limiting embodiments, the plasma can also include at least one hydrocarbon, which can be present in the form of a gas. Suitable hydrocarbons can include, but are not limited to, $C_1$-$C_{12}$ hydrocarbons, such as methane, ethane, propane, butane, pentane, hexane, heptane, octane, nonane, decane, undecane, dodecane, and combinations thereof, to name a few. According to various embodiments, volatile hydrocarbons with low boiling points (e.g., less than 100° C.) may be used, for example, $C_1$-$C_6$ hydrocarbons. In still further embodiments, the hydrocarbon can be methane or ethane. The plasma can include, for example, from about 1% to about 20% by volume of the at least one hydrocarbon, such as from about 2% to about 18%, from about 3% to about 15%, from about 4% to about 12%, from about 5% to about 10%, or from about 6% to about 8%, including all ranges and subranges therebetween.

Contact between the plasma and a major surface 214a, 214b of the glass sheet 104 can be achieved using any suitable means known in the art, for example, any number of plasma jets, nozzles, or torches can be used to scan a major surface 214a, 214b of the glass sheet 104. The scan speed can be varied as necessary to achieve the desired coating density and/or efficiency for a particular application. For example, the scan speed can range from about 5 mm/s to about 100 mm/s, such as from about 10 mm/s to about 75 mm/s, from about 25 mm/s to about 60 mm/s, or from about 40 mm/s to about 50 mm/s, including all ranges and subranges therebetween.

The residence time, (e.g., time period during which the plasma contacts the major surface 214a, 214b of the glass sheet 104) can likewise vary depending on the scan speed and the desired coating properties. By way of a non-limiting embodiment, the residence time can range from less than a second to several minutes, such as from about 1 second to about 10 minutes, from about 30 seconds to about 9 minutes, from about 1 minute to about 8 minutes, from about 2 minutes to about 7 minutes, from about 3 minutes to about 6 minutes, or from about 4 minutes to about 5 minutes, including all ranges and subranges therebetween. In various embodiments, a major surface 214a, 214b of the glass sheet 104 can be contacted with the plasma in a single pass or, in some embodiments, multiple passes may be employed, such as 2 or more passes, 3 or more passes, 4 or more passes, 5 or more passes, 10 or more passes, 20 or more passes, and so on.

As depicted in FIG. 16, after contact with the plasma, at least a portion of a major surface 214a, 214b of the glass sheet 104 may be coated with an exemplary hydrocarbon layer. In certain embodiments, an entire major surface 214a, 214b of the glass sheet 104 can be coated with the hydrocarbon layer. In some embodiments, desired portions of a major surface 214a, 214b of the glass sheet 104 can be coated, such as, for example, the edges or perimeter of the glass sheet 104, the central region, or any other region or pattern as desired. The coated portion of a major surface 214a, 214b of the glass sheet 104 may, in various embodiments, have an overall surface energy of less than about 50 mJ/m$^2$, such as less than about 45 mJ/m$^2$, less than about 40 mJ/m$^2$, less than about 35 mJ/m$^2$, less than about 30 mJ/m$^2$, or less than about 25 mJ/m$^2$, including all ranges and subranges therebetween. The polar surface energy can be, for example, less than about 15 mJ/m$^2$, such as less than about 10, less than about 9, less than about 8, less than about 7, less than about 6, less than about 5, less than about 4, less than about 3, less than about 2, or less than about 1 mJ/m$^2$, including all ranges and subranges therebetween. The dispersive energy of the coated portion can, in certain embodiments, be greater than about 25 mJ/m$^2$, such as greater than about 30 mJ/m$^2$, greater than about 35 mJ/m$^2$, or greater than about 40 mJ/m$^2$, including all ranges and subranges therebetween.

According to various embodiments, after contact with the plasma, the coated portion of a major surface 214a, 214b of the glass sheet 104 may have a contact angle ranging from about 20 degrees to about 95 degrees, such as from about 30 degrees to about 90 degrees, from about 40 degrees to about 85 degrees, from about 50 degrees to about 80 degrees, or from about 60 degrees to about 70 degrees, including all ranges and subranges therebetween. The hydrocarbon layer can also, in certain embodiments, be removed from the glass sheet 104 as desired, (e.g., prior to finishing the glass sheet 104 for end-use application). As discussed above with respect to the methods disclosed herein, wet and/or dry cleaning methods can be used to remove the hydrocarbon layer. After cleaning, the contact angle of the previously coated major surface 214a, 214b of the glass sheet 104 can be greatly reduced, e.g., to as low as 0 degrees. For example, the contact angle when coated can be as high as 95 degrees and, after cleaning, the contact angle can be less than 20 degrees, such as less than 15 degrees, less than 10 degrees, less than 5 degrees, less than 3 degrees, less than 2 degrees, or less than 1 degree, including all ranges and subranges therebetween.

Figure 17:
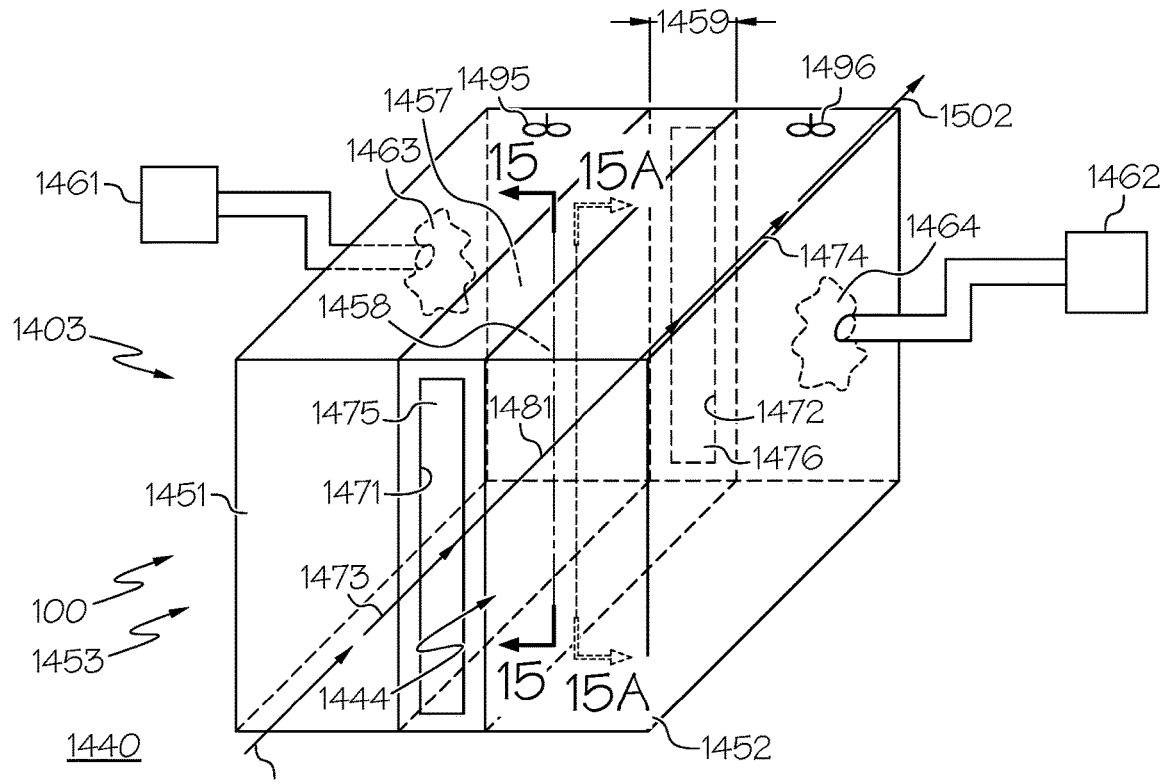
FIG. 17 is a schematic perspective view of another coating application station of the glass processing apparatus.
Figure 18:
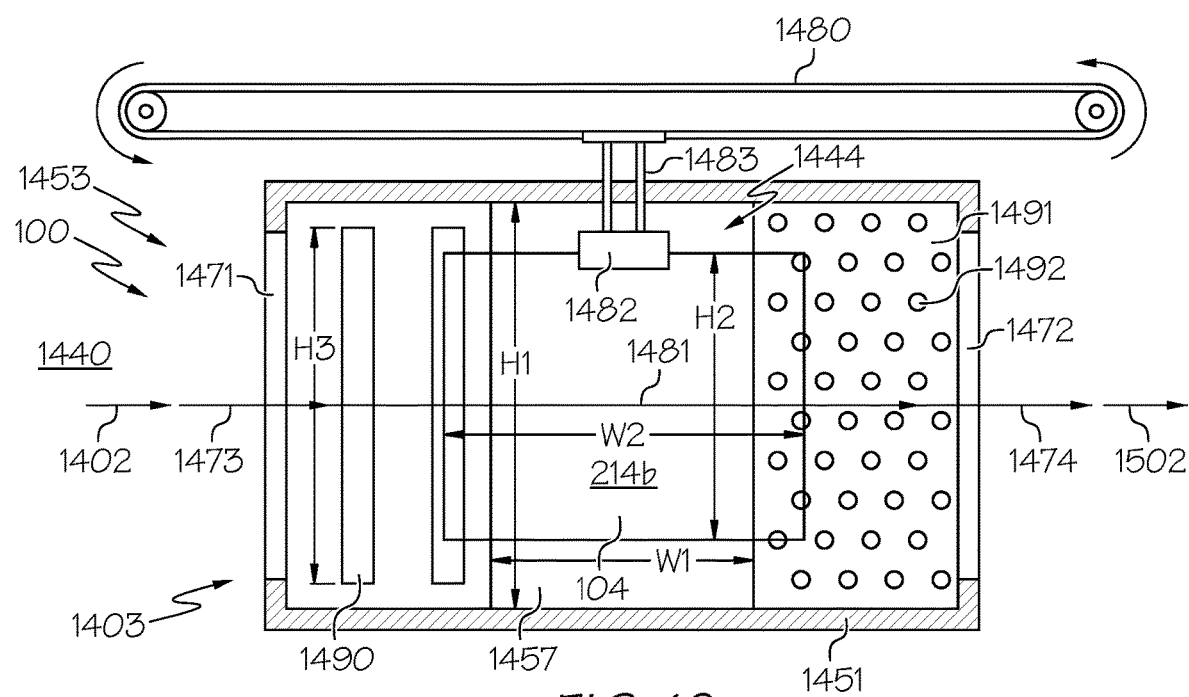
FIG. 18 is a schematic cross-section view of the coating application station along line 15-15 of FIG. 17.

FIG. 17 is a schematic perspective view of another embodiment of a sheet surface protection apparatus of the coating chamber 1403 of the glass processing apparatus 100, and FIG. 18 is a cross-sectional view of the coating chamber 1403 along line 15-15 of FIG. 17. As shown in FIG. 17, in some embodiments, an exemplary, non-limiting coating chamber 1403 can include a fog chamber 1453 that can include one or more enclosures (e.g., at least one of a first enclosure 1451 and a second enclosure 1452). The coating chamber 1403 can also include a fog generator (e.g., first fog generator 1461, second fog generator 1462) to provide fog (schematically illustrated as fog 1463 and fog 1464) to the enclosure (e.g., respective first enclosure 1451, respective second enclosure 1452). In some embodiments, the fog chamber 1453 can include a passage (e.g., first opening 1457, second opening 1458) in the enclosure (e.g., respective first enclosure 1451, respective second enclosure 1452) from which fog can exit the enclosure to contact at least one major surface 214a, 214b of the glass sheet 104. In some embodiments, the fog can condense on the at least one major surface 214a, 214b of the glass sheet 104 and deposit a fog coating onto the at least one major surface 214a, 214b of the glass sheet 104.

In some embodiments, only a single enclosure may be provided, and in some embodiments, more than one enclosure may be provided. Thus, unless otherwise noted, the figures should not limit the scope of the claims appended herewith. In some embodiments, the glass processing apparatus 100 can include the fog chamber 1453 including at least one of the first enclosure 1451 and the second enclosure 1452, at least one of the first fog generator 1461 to provide fog 1463 to the first enclosure 1451 and the second fog generator 1462 to provide fog 1464 to the second enclosure 1452. The fog chamber 1453 can include at least one of the first passage (e.g., the first opening 1457) in the first enclosure 1451 from which fog 1463 can exit the first enclosure 1451 to contact a first major surface 214a of the glass sheet 104, and the second passage (e.g., second opening 1458) in the second enclosure 1452 from which fog 1464 can exit the second enclosure 1452 to contact a second major surface 214b of the glass sheet 104. In some embodiments, the first passage (e.g., first opening 1457) can face the passage (e.g., second opening 1458). In some embodiments, the first passage (e.g., first opening 1457) can be spaced a predetermined distance 1459 from the second passage (e.g., second opening 1458). The predetermined distance 1459 can define a travel path 1481 for the glass sheet 104. In some embodiments, the travel path 1481 can extend along the first passage and the second passage laterally between the first passage and the second passage. Accordingly, in some embodiments, the predetermined distance 1459 between the first passage and the second passage can be chosen to provide an area between the first enclosure 1451 and the second enclosure 1452 into which the glass sheet 104 can be positioned to be exposed to the fog.

It is to be understood that the fog chamber 1453 including the first enclosure 1451 and the second enclosure 1452 can include any shape and construction. Accordingly, although the fog chamber 1453 including the first enclosure 1451 and the second enclosure 1452 are illustrated as rectangular enclosures (e.g., boxes), such illustration, unless otherwise noted, should not limit the scope of the disclosure. For example, in some embodiments, a location in which the fog chamber 1453 may be positioned and employed can include other components. Thus, in some embodiments, the location, shape, construction, etc. of the environment in which the fog chamber 1453 is employed, including any components in the environment, can control at least in part a shape of the first enclosure 1451 and the second enclosure 1452. In some embodiments, the fog chamber 1453 including the first enclosure 1451 and the second enclosure 1452 can be constructed from and include any one or more shapes and features without departing from the scope of the disclosure. In addition, it is to be understood that in some embodiments, a single fog generator can be provided. For example, a single fog generator can provide fog that can be transported (e.g., via plumbing, tubing, conduit, etc.) to the first enclosure 1451 and the second enclosure 1452 of the fog chamber 1453. Likewise, in some embodiments, a plurality of fog generators can be provided to produce fog that can be transported (e.g., via plumbing, tubing, conduit, etc.) to the first enclosure 1451 and the second enclosure 1452 of the fog chamber 1453. In some embodiments, one or more fog generators can be positioned within at least one of the first enclosure 1451 and the second enclosure 1452 to provide fog within the at least one of the first enclosure 1451 and the second enclosure 1452 without employing plumbing, tubing, conduit, etc. to transport the fog.

In some embodiments, the fog generator can include any one or more of an ultrasonic fog generator, an atomizer fog generator, an ultrasonic or pneumatic atomizer, an airless fogger, and any other device that produces a fog. For example, in some embodiments, the fog generator can include any one or more of a Prototype Vicks ultrasonic fog generator, a Mainland Mart ultrasonic fog generator, a TSI atomizer fogger, and an atomic layer deposition or aerosol coating system available from Beneq. In some embodiments, the fog generator can include a fog system manufactured by Atomizing Systems, Inc. that can include any one or more of a pump, a motor, water filters, a control panel, nozzles, and tubing. In some embodiments, an Atomizing Systems fog system can be operated with an adjustable working pressure between about 400 psi to about 3200 psi. In some embodiments, the fog system can include any one or more nozzles having an orifice within a range of from about 0.1 mm to about 0.4 mm with a flow rate at 1000 psi of from about 0.01 gallons per minute (gpm) to about 0.12 gpm; for example, about 0.11 mm (about 0.014 gpm to about 0.017 gpm), about 0.13 mm (about 0.020 gpm), about 0.14 mm (about 0.025 gpm), about 0.15 mm (about 0.026 gpm), about 0.20 mm (about 0.046 gpm), about 0.25 mm (about 0.072 gpm), about 0.30 mm (about 0.092 gpm), and about 0.38 mm (0.120 gpm). In some embodiments, the fog system can include a nozzle that includes a stainless steel body with a ruby-orifice, an impingement pin, and a polypropylene filter to avoid trapping particles in the base of the nozzle. High pressure liquid can then be provided to the nozzle, with a fine liquid jet shooting against the impingement pin to produce fog. Non-limiting embodiments of nozzles can include ASI-4R, ASI-45R, ASI-5R, ASI-55R, ASI-6R, ASI- 8R, ASI-10R, ASI-12R, and ASI-15R. In some embodiments, the fog generator can include a fog system manufactured by Mee Industries, Inc. that can include a MeeFog brand impaction-pin type fog nozzle including a 150 micrometer diameter opening that produces fog at an operating pressure of about 2000 psi. Other fog systems, including fog systems not explicitly disclosed herein can be employed in some embodiments.

In some embodiments, the fog generator can operate periodically to provide fog (e.g., when the glass sheet 104 is provided in the fog chamber 1453) or continuously to provide fog (e.g., to maintain a fog within the fog chamber 1453 irrespective of whether the glass sheet 104 is provided within the fog chamber 1453). In some embodiments, continuously providing fog within the fog chamber 1453 can provide a more uniform, consistent fog that can better coat the major surfaces 214a, 214b of the glass sheet 104 than, for example, providing fog periodically or intermittently. Alternatively, providing fog periodically can be advantageous, in some embodiments, either alone or in combination with continuously providing fog to, for example, add additional fog to the fog chamber 1453, replace fog that has been depleted from the fog chamber 1453, and to circulate and redistribute fog within the fog chamber 1453 to provide a uniform, consistent fog within the fog chamber 1453.

In some embodiments, the fog can apply a thin fog coating chemistry onto the major surfaces 214a, 214b of the glass sheet 104. In some embodiments, the fog can provide a fog coating chemistry that provides a coating that includes a wettability (e.g., contact angle where a liquid-vapor interface meets one of the major surfaces 214a, 214b of the glass sheet 104) that is about 30° to about 60°, for example about 45° to about 60°, for example about 55° to about 60° including all ranges and subranges therebetween. In some embodiments, the fog coating chemistry can reduce adhesion of contamination (e.g., at least one of environmental debris 1002 and separation debris 1001) onto the major surfaces 214a, 214b of the glass sheet 104 and protect the glass sheet 104 from scratches and chips. In some embodiments, the fog coating chemistry can collect debris (e.g., at least one of environmental debris 1002 and separation debris 1001) preventing the debris from contacting the glass surface and can then be removed from the glass sheet 104 by washing, for example. In some embodiments, the fog coating chemistry can include a mono-layer or a multi-layer coating that can be deposited onto the major surfaces 214a, 214b of the glass sheet 104. The fog can include a variety of chemical components and compounds, the specific composition of which, unless otherwise noted, is not intended to limit the scope of the disclosure.

In non-limiting embodiments, the fog can include at least one hydrocarbon, which can be present in the form of a gas. Suitable hydrocarbons can include, but are not limited to, $C_1$-$C_{12}$ hydrocarbons, such as methane, ethane, propane, butane, pentane, hexane, heptane, octane, nonane, decane, undecane, dodecane, and combinations thereof, to name a few. According to various embodiments, volatile hydrocarbons with low boiling points (e.g., less than 100° C.) may be used, for example, $C_1$-$C_6$ hydrocarbons. In still further embodiments, the hydrocarbon can be methane or ethane. The plasma can include, for example, from about 1% to about 20% by volume of the at least one hydrocarbon, such as from about 2% to about 18%, from about 3% to about 15%, from about 4% to about 12%, from about 5% to about 10%, or from about 6% to about 8%, including all ranges and subranges therebetween. In addition, in some embodiments, the fog can include particles including a particle size (e.g., droplet size) of about 5 μm to about 15 μm, for example about 10 μm to about 15 μm, for example about 10 μm to about 12 μm including all ranges and subranges therebetween. In some embodiments, a fog including a particle size within these ranges can provide a better quality (e.g., more uniformly distributed) surface coating than, for example, fog including particle sizes that fall outside these ranges. However, in some embodiments, a fog with particles of any particle size including particle sizes not explicitly disclosed herein can be provided.

In some embodiments, one or more fans (e.g., first fan 1495, second fan 1496) can be provided to circulate the fog within at least one of the first enclosure 1451 and the second enclosure 1452. In some embodiments, for example, the first fan 1495 and the second fan 1496 can redistribute particles having at least one of a different size and weight that may have developed a non-uniform fog distribution within the fog chamber 1453 based on gravity acting on the fog. For example, in some embodiments, larger, heavier fog particles may settle toward the bottom of the first enclosure 1451 and the second enclosure 1452 based on gravity, and the first fan 1495 and the second fan 1496 can be operated to redistribute the larger, heavier fog particles towards the top of the first enclosure 1451 and the second enclosure 1452 to counteract gravity. In some embodiments, providing a fog having a uniform distribution of particles can produce a better quality fog coating on the glass sheet 104 than, for example, providing a fog with a non-uniform distribution of particles.

As shown in FIG. 18, in some embodiments, the glass processing apparatus 100 can include a conveyor 1480 defining the travel path 1481 extending along at least one of the first passage (e.g., first opening 1457) and the second passage (e.g., second opening 1458). In some embodiments, the conveyor 1480 can be oriented to traverse the glass sheet 104 along the travel path 1481. For example, in some embodiments, the conveyor 1480 can include a pulley system, a track, or a belt to which a bracket 1483 and a clip 1482 can be connected. The clip 1482 can hold the glass sheet 104 in an orientation where the glass sheet 104 can be suspended from the conveyor 1480, such that the glass sheet 104 can travel along the travel path 1481 through the fog chamber 1453. In some embodiments, the conveyor 1480 can be oriented to traverse the glass sheet 104 along the travel path 1481 between the first passage and the second passage. In some embodiments, as the glass sheet 104 travels along the travel path 1481, the first major surface 214a of the glass sheet 104 can face the first passage (e.g., first opening 1457) of the first enclosure 1451 and the second major surface 214b of the glass sheet 104 can face the second passage (e.g., the second opening 1458) of the second enclosure 1452. In some embodiments, the conveyor is positioned external to the fog chamber and configured so the glass sheet is in a vertical orientation as it travels internally and laterally through the fog chamber during the processing.

In some embodiments, as shown, a height H1 of the first passage (e.g., first opening 1457) and the second passage (e.g., second opening 1458) can extend between an inner surface of a top wall of the first enclosure 1451 (or the second enclosure 1452) and an inner surface of a bottom wall of the first enclosure 1451 (or the second enclosure). In some embodiments, the height H1 of the first passage (e.g., first opening 1457) and the second passage (e.g., second opening 1458) can be greater than the height H2 of the glass sheet 104. Thus, in some embodiments, as the glass sheet 104 travels along the travel path 1481, the entire height H2 of the first major surface 214a of the glass sheet 104 can face the first passage of the first enclosure 1451 and the entire height H2 of the second major surface 214b of the glass sheet 104 can face the second passage of the second enclosure 1452. As the glass sheet 104 travels along the travel path 1481, the entire first major surface 214a and second major surface 214b can be exposed, for example evenly exposed, to fog exiting the respective first passage (e.g., first opening 1457) and second passage (e.g., second opening 1458).

In some embodiments, the width W1 of the first opening 1457 may be less than the width W2 of the glass sheet 104 although the width W1 may be equal to or greater than the width W2 of the glass sheet 104 in further embodiments. As the glass sheet 104 travels along travel path 1481, the entire width W2 of the major surface(s) 214a, 214b of the glass sheet 104 can each eventually face the respective opening(s) 1457, 1458. Consequently, the entire width W2 of the major surface(s) 214a, 214b of the glass sheet 104 can be exposed to fog 1463, 1464 even though the width W1 of the opening (s) 1457, 1458 may be less than the width W2 of the glass sheet 104.

In some embodiments, the glass sheet 104 can travel along the travel path 1481 through the fog chamber 1453 once (e.g., a single pass). In some embodiments, the glass sheet 104 can travel along the travel path 1481 through the fog chamber 1453 a plurality of times (e.g., multiple passes). In some embodiments, the glass sheet 104 can travel at least one of forward along the travel path 1481 and backwards (e.g., in an opposite direction) along the travel path 1481 through the fog chamber 1453. In some embodiments, the glass sheet can be placed (e.g., manually placed) into the fog chamber 1453. In some embodiments, the glass sheet 104 can be held in a stationary position (e.g., without traversing along the travel path 1481) while the fog condenses on at least one major surface 214a, 214b of the glass sheet 104. In some embodiments, the conveyor 1480 can provide the glass sheet 104 to the fog chamber 1453 where the glass sheet 104 can be exposed to the fog, and then the conveyor 1480 can deliver the glass sheet 104 from the fog chamber 1453 with the fog coating chemistry applied to the glass sheet 104.

For purposes of the description of the fog chamber 1453, an area of a major surface of a glass sheet is considered "facing" a passage if a footprint of the area of the major surface projecting away from the major surface in a direction perpendicular to the major surface passes through the passage. FIG. 18 illustrates an area of the first major surface 214a facing the first opening 1457 in the first enclosure 1451 to be exposed to the fog 1463. Indeed, a footprint of the area of the first major surface 214a projecting away from the first major surface 214a in a direction perpendicular to the first major surface 214a passes through the first opening 1457. Likewise, in a similar manner, an area of the second major surface 214b can face the second opening 1458 in the second enclosure 1452 to be exposed to the fog 1464.

In some embodiments, a section along broken line 15A-15A (i.e., opposite section 15-15 in FIG. 17) may appear as a mirror image of FIG. 18. As such, in some embodiments, the features (e.g., dimensions) of the first passage (e.g., first opening 1457) may be identical to the features (e.g., dimensions) of the second passage (e.g., second opening 1458). Consequently, while FIG. 18 illustrates an embodiment where only a single side (e.g., first major surface 214a) of the glass sheet 104 is coated with fog, a mirror image of FIG. 18 along line 15A-15A of FIG. 17 can be representative of an embodiment where both the first major surface 214a and the second major surface 214b are simultaneously coated with fog 1463, 1464 passing through the respective passages, for example, to protect both the first major surface 214a and the second major surface 214b of the glass sheet 104.

In some embodiments, in addition or alternatively to the first opening 1457 and/or the second opening 1458, the passage of the fog chamber 1453 can optionally include a slot nozzle 1490 positioned upstream or downstream along the travel path 1481 from the first opening 1457. For instance, as shown in FIG. 18, in one embodiment the slot nozzle 1490 can be positioned upstream relative to the first opening 1457 wherein a glass sheet traveling along direction 1402 through the inlet 1471 will first encounter the slot nozzle 1490 prior to the first opening 1457. In addition or alternatively, in some embodiments, the passage of the fog chamber 1453 can include a slot nozzle 1490 positioned upstream or downstream along the travel path 1481 from the second opening 1458. For example, when viewed along section line 15A-15A of FIG. 17, a mirror image of FIG. 18 can represent the slot nozzle 1490 being positioned upstream relative to the second opening 1458 wherein a glass sheet 104 traveling along direction 1402 through the inlet 1471 will first encounter the slot nozzle 1490 prior to the second opening 1458.

As shown in FIG. 18, in some embodiments, the fog chamber 1453 can provide fog to areas of the first major surface 214a and/or the second major surface 214b, such as area(s) along the entire height 112 of the glass sheet 104, that face the respective slot nozzle 1490. Thus, in some embodiments, fog can exit the first enclosure 1451 through the slot nozzle 1490 to contact the first major surface 214a of the glass sheet 104. In some embodiments, the slot nozzle 1490 can include an elongated aperture or a plurality of elongated apertures through which fog can pass. In some embodiments, the elongated aperture can include a height 113 that can be greater than or equal to the height 112 of the glass sheet 104 such that fog passing through the slot nozzle 1490 can be exposed to the height 112 (e.g., the entire height 112) of the glass sheet 104. In some embodiments, the fog chamber 1453 can include a plurality of slot nozzles 1490 (e.g., two slot nozzles, three slot nozzles, etc.) that may be aligned, such as parallel, relative to one another and spaced apart sequentially along the travel path 1481. For example, in some embodiments, a plurality of elongated apertures can be spaced apart along the travel path 1481 extending along the passage of the fog chamber 1453.

In some embodiments, in addition or alternative to the first opening 1457, the second opening 1458 and/or the slot nozzle(s) 1490, the passage of the fog chamber 1453 can optionally include a diffuser nozzle 1491 positioned upstream or downstream along the travel path 1481 from the first opening 1457. For example, as shown in FIG. 18, in some embodiments, the diffuser nozzle 1491 can be positioned downstream along the travel path 1481 relative to the first opening 1457 wherein a glass sheet traveling along direction 1402 through the inlet 1471 will first encounter the first opening 1457 prior to the diffuser nozzle 1491. In addition or alternatively, in some embodiments, the passage of the fog chamber 1453 can include the diffuser nozzle 1491 positioned upstream or downstream along the travel path 1481 from the second opening 1458. For example, when viewed along section line 15A-15A of FIG. 17, a mirror image of FIG. 18 can represent the diffuser nozzle 1491 being positioned downstream along the travel path 1481 relative to the second opening 1458 wherein a glass sheet 104 traveling along travel path 1481 through the inlet 1471 will first encounter the second opening 1458 prior to the diffuser nozzle 1491.

As shown in FIG. 18, in some embodiments, the fog chamber 1453 can provide fog to areas of the first major surface 214a and/or the second major surface 214b, such as area(s) along the entire height 112 of the glass sheet 104, that face the respective diffuser nozzle 1491. Thus, in some embodiments, fog can exit the first enclosure 1451 or the second enclosure 1452, through the respective diffuser nozzle 1491 to contact the respective first major surface 214a or second major surface 214b of the glass sheet 104. In some embodiments, the diffuser nozzle 1491 can include a plurality of apertures 1492 through which fog can pass. The diffuser nozzle 1491 can include any number of apertures 1492 of any size, shape, and distribution. For example, the plurality of apertures 1492 can be arranged in a pattern that includes at least one of staggered and equally spaced apertures.

Embodiments of the passage of the fog chamber 1453 can include a single one or any combination of the first opening 1457, the slot nozzle(s) 1490 and the diffuser nozzle 1491. Furthermore, in some embodiments, opening(s), slot nozzle(s) and diffuser nozzle(s) may all be provided with any one or more being partially or entirely deactivated. For example, a mask may be positioned partially or entirely over one or more of the passages (e.g., first opening 1457, the slot nozzle(s) 1490 and/or the diffuser nozzle 1491) to inhibit, such as prevent, fog from passing through the passage at the masked location.

Accordingly, although illustrated with respect to the first enclosure 1451, it is to be understood that, in some embodiments, the fog chamber 1453 can include a first slot nozzle 1490 positioned relative to the first opening 1457, where fog can exit the first enclosure 1451 through the first slot nozzle 1490 to contact the first major surface 214a of the glass sheet 104, and a second slot nozzle (not shown) positioned in the second opening 1458, where fog can exit the second enclosure 1452 through the second slot nozzle to contact the second major surface 214b of the glass sheet 104. In some embodiments, each of the first slot nozzle 1490 and the second slot nozzle can include an elongated aperture or a plurality of elongated apertures through which fog can pass. Likewise, in some embodiments, the fog chamber 1453 can include a first diffuser nozzle 1491 positioned relative to the first opening 1457, where fog can exit the first enclosure 1451 through the first diffuser nozzle 1491 to contact the first major surface 214a of the glass sheet 104, and a second diffuser nozzle (not shown) positioned relative to the second opening 1458, where fog can exit the second enclosure 1452 through the second diffuser nozzle to contact the second major surface 214b of the glass sheet 104. In some embodiments, each of the first diffuser nozzle 1491 and the second diffuser nozzle can include a plurality of apertures 1492 through which fog can pass. In some embodiments, the diffuser nozzle 1491 can provide a permeable barrier that both contains the fog within the first enclosure 1451 and also allows the fog to pass through the plurality of apertures 1492 of the diffuser nozzle 1491 to contact the glass sheet 104.

In some embodiments, the fog chamber 1453 can include an inlet 1471 defining an inlet pathway 1473 extending from an exterior 1440 of the fog chamber 1453 through the inlet 1471 to an interior 1444 of the fog chamber 1453. The inlet 1471 can be oriented to receive the glass sheet 104 to pass along the inlet pathway 1473 from the exterior 1440 of the fog chamber 1453 to the interior 1444 of the fog chamber 1453. In some embodiments, the gas chamber 1453 can include an inlet door 1475 (shown in FIG. 17 but not shown in FIG. 18 for clarity) to selectively block the inlet 1471. In some embodiments, the direction 1402 can extend through inlet 1471 and laterally between the first passage (e.g., first opening 1457) and the second passage (e.g., second opening 1458). Furthermore, when a glass sheet 104 is not present, in some embodiments, the first passage (e.g., first opening 1457) can face the second passage (e.g., second opening 1458), and the first passage can be spaced the predetermined distance 1459 from the second passage to define the travel path 1481 for the glass sheet 104. As shown, the travel path 1481 can extend in through the inlet 1471 and laterally between the first passage and the second passage.

In some embodiments, the fog chamber 1453 can include an outlet 1472 defining an outlet pathway 1474 extending from the interior 1444 of the fog chamber 1453 through the outlet 1472 to the exterior 1440 of the fog chamber 1453. The outlet 1472 can be oriented to receive the glass sheet 104 to travel along the outlet pathway 1474 from the interior 1444 of the fog chamber 1453 to the exterior 1440 of the fog chamber 1453. In some embodiments, the fog chamber 1453 can include an outlet door 1476 (schematically shown in FIG. 17 and not shown in FIG. 18 for clarity) to selectively block the outlet 1472. In some embodiments, the travel path 1481 can extend in through the inlet 1471, laterally between the first passage and the second passage, and out through the second opening 1458.

In some embodiments, a method of processing a glass sheet 104 can include providing the glass sheet 104 to the fog chamber 1453, providing fog 1463, 1464 to at least one of a first enclosure 1451 and a second enclosure 1452 of the fog chamber 1453, and contacting at least one major surface 214a, 214b of the glass sheet 104 with the fog by passing the fog from the at least one of the first enclosure 1451 through the first passage including the first opening 1457 in the first enclosure 1451 and the second enclosure 1452 through the second passage including the second opening 1458 in the second enclosure 1452. In some embodiments, contacting the first major surface 214a of the glass sheet 104 can include passing the fog from the first enclosure 1451 through another passage in the form of the slot nozzle 1490. In such examples, contacting the second major surface 214b of the glass sheet 104 can include passing the fog from the second enclosure 1452 through the elongated aperture of a slot nozzle 1490 positioned relative to the first opening 1457. In some embodiments, the passage may include a diffuser nozzle 1491 wherein contacting the first major surface 214a of the glass sheet 104 can include passing the fog from the first enclosure 1451 through a plurality of apertures 1492 of the diffuser nozzle 1491 positioned relative to the first opening 1457. Similarly, contacting the second major surface 214b of the glass sheet 104 with the fog can include passing the fog from the second enclosure 1452 through a second opening 1458 relative to the second enclosure 1452. In some embodiments, contacting the second major surface 214b of the glass sheet 104 can include passing the fog from the second enclosure 1452 through a second elongated aperture of a second slot nozzle (not shown) positioned relative to the second opening 1458. In some embodiments, contacting the second major surface 214b of the glass sheet 104 can include passing the fog from the second enclosure 1452 through a second plurality of apertures of a second diffuser nozzle (not shown) positioned relative to the second opening 1458.

In some embodiments, the method can include traversing the glass sheet 104 along the inlet pathway 1473 from an exterior 1440 of the fog chamber 1453 through the inlet 1471 of the fog chamber 1453 to the interior 1444 of the fog chamber 1453. In some embodiments, the method can include opening an inlet door 1475 that selectively blocks the inlet 1471, traversing the glass sheet 104 along the inlet pathway 1473 from the exterior 1440 of the fog chamber 1453 through the inlet 1471 to the interior 1444 of the fog chamber 1453, and then closing the inlet door 1475 to block the inlet 1471. In some embodiments, the method can include traversing the glass sheet 104 along an outlet pathway 1474 from the interior 1444 of the fog chamber 1453 through the outlet 1472 of the fog chamber 1453. In some embodiments, the method can include opening the outlet door 1476 that selectively blocks the outlet 1472 of the fog chamber 1453, traversing the glass sheet 104 along the outlet pathway 1474 from the interior 1444 of the fog chamber 1453 through the outlet 1472 to the exterior 1440 of the fog chamber 1453, and then closing the outlet door 1476 to block the outlet 1472. In some embodiments, the method can include conveying the glass sheet 104 from the inlet 1471 of the fog chamber 1453 to the outlet 1472 of the fog chamber 1453 along the travel path 1481 extending along the first passage and the second passage laterally between the first passage and the second passage.

By selectively opening and closing the inlet door 1475 to selectively block the inlet 1471 and the outlet door 1476 to block the outlet 1472, in some embodiments, fog within the fog chamber 1453 can be controlled and contained within the fog chamber 1453 without dispersing into the environment in which the fog chamber 1453 is employed. Accordingly, in some embodiments, the inlet door 1475 can block the inlet 1471 and the outlet door 1476 can block the outlet 1472 to provide a sealed enclosure in which the fog can be contained, thus permitting selective access into and out of the fog chamber 1453 when desired. In addition, in some embodiments, the fog may include chemicals which are desired to be controlled and contained within the fog chamber 1453 as compared to being dispersed into the environment in which the fog chamber 1453 is employed. The inlet door 1475 and the outlet door 1476 can therefore prevent the fog including any chemical in the fog from escaping to the environment. In some embodiments, the inlet 1471 or the outlet 1472 can be provided alone, and the glass sheet 104 can be provided to and delivered from the fog chamber 1453 through only the inlet 1471 or through only the outlet 1472.

While the freshly coated glass sheet 104 may already be of a desired predetermined size, in some embodiments, the glass sheet 104 may also be resized to provide the glass sheet 104 with final dimensions desired by a customer. For example, as illustrated by arrow 1501 in FIG. 16 and arrow 1502 in FIGS. 17 and 18, the glass sheet 104 may optionally proceed to a resizing station, shown in FIG. 19, wherein the glass sheet 104 can be separated into a final desired size. In the illustrated embodiment, a full body crack 1505 may be propagated by a cooling zone 1507 trailing a laser heated zone 1509, although other techniques such as score and/or break may be provided in some embodiments. Regardless of the technique used, any debris generated during separating can be prevented from contacting the first major surface 214*a* of the glass sheet 104 and the second major surface 214*b* of the glass sheet 104 by a corresponding first coating layer 1503*a* applied to the first major surface 214*a* of the glass sheet 104 and a second coating layer 1503*b* applied to the second major surface 214*b* of the glass sheet 104 with the coating chamber 1403.

Figure 19:
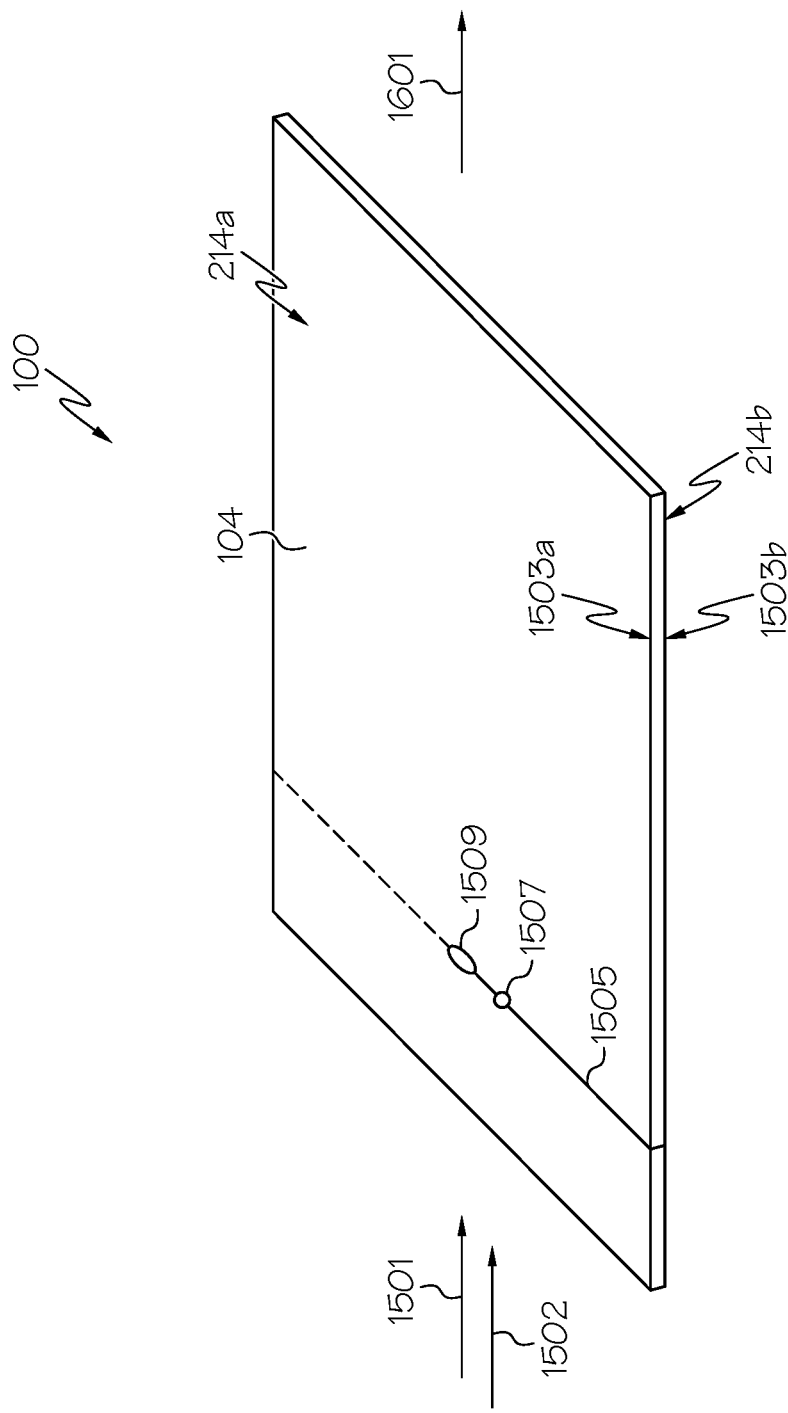
FIG. 19 is a schematic perspective view of a resizing station of the glass processing apparatus.
Figure 20:
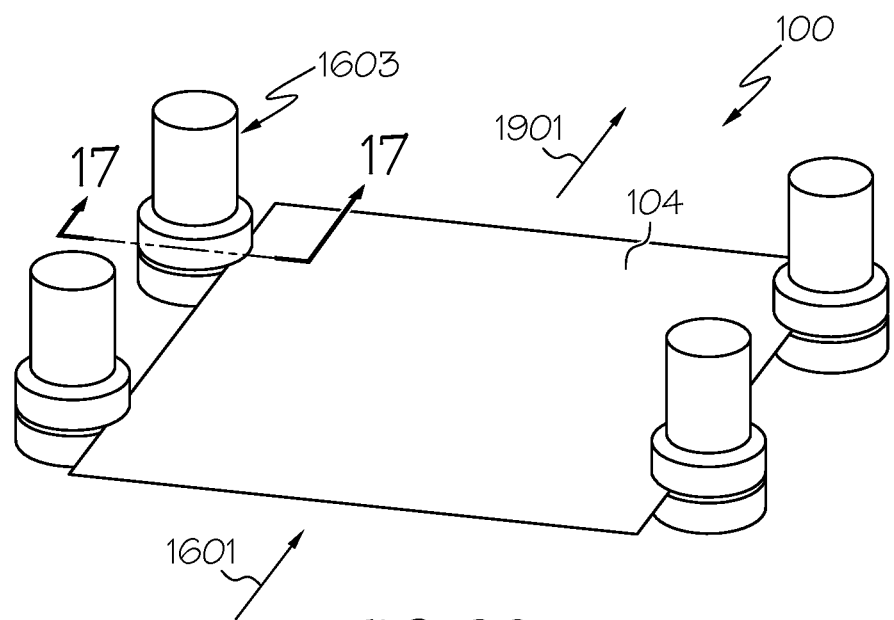
FIG. 20 is a schematic perspective view of a finishing station of the glass processing apparatus.

As indicated by arrow 1601 in FIG. 19, the glass sheet 104 can then pass to an edge finishing station, shown in FIG. 20, where the edges of the glass sheet 104 can be finished to remove microcracks or other imperfections that may otherwise compromise the strength of the glass sheet 104. In some embodiments, as shown, multiple grinding devices 1603 can be provided to reduce processing time. In some embodiments, one or more of the grinding devices 1603 may provide different finishing operations. For example, one grinding device 1603 can provide a rough grinding step, while another grinding device 1603 (e.g., with a finer grinding wheel) may provide a fine-tuned grinding or polishing step. In addition, although not shown, another similar device may be provided with a cleaning wheel designed to remove debris generated during polishing and/or grinding.

Figure 21:
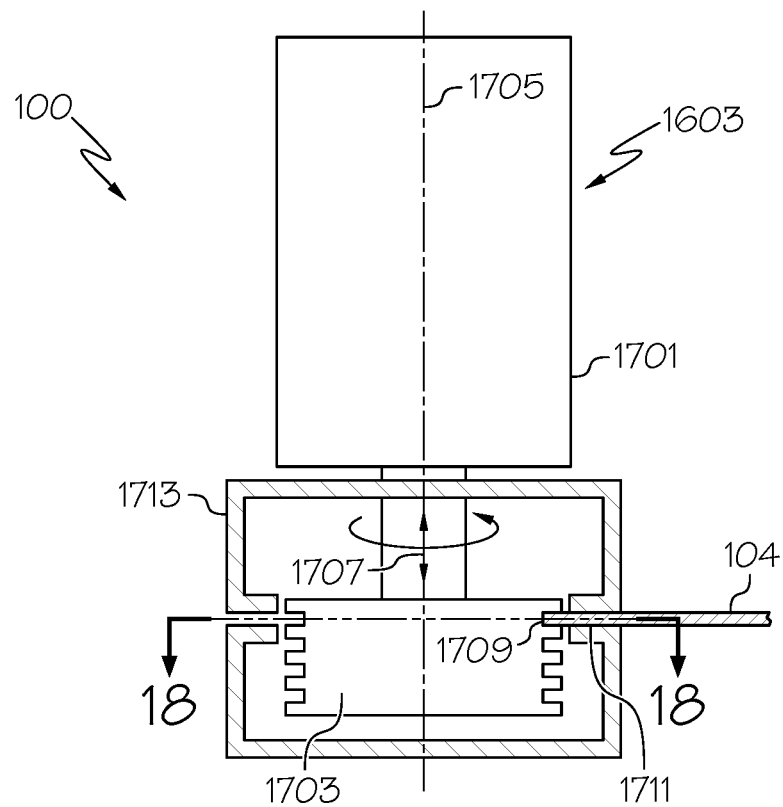
FIG. 21 is a partial schematic cross-sectional view of an edge finishing apparatus along line 17-17 of FIG. 20.

In the embodiment shown in FIG. 21, a spindle 1701 may drive a grinding wheel 1703 to rotate about a rotational axis 1705. The grinding wheel 1703 may be moved vertically (e.g., as indicated by double arrow 1707) to expose an appropriate groove in the grinding wheel 1703 to receive a corresponding edge 1709 of the glass sheet 104. As shown in FIG. 21, the edge 1709 of the glass sheet 104 can be received through a lateral opening 1711 in a shroud 1713. A fluid lubricant and/or coolant (not shown), can be applied to the edge 1709 of the glass sheet 104 within the interior of the shroud 1713, for example as a stream of fluid. The shroud 1713 can shield the protective coatings of the glass sheet 104 outside of the shroud 1713 from significant debris entrained within the fluid coolant generated during the edge machining techniques. Rather than depositing the stream of fluid on the glass sheet 104, the stream of fluid can exit at fluid exit ports 1801, 1803 positioned away from the glass sheet 104, as illustrated in FIG. 22.

Figure 22:
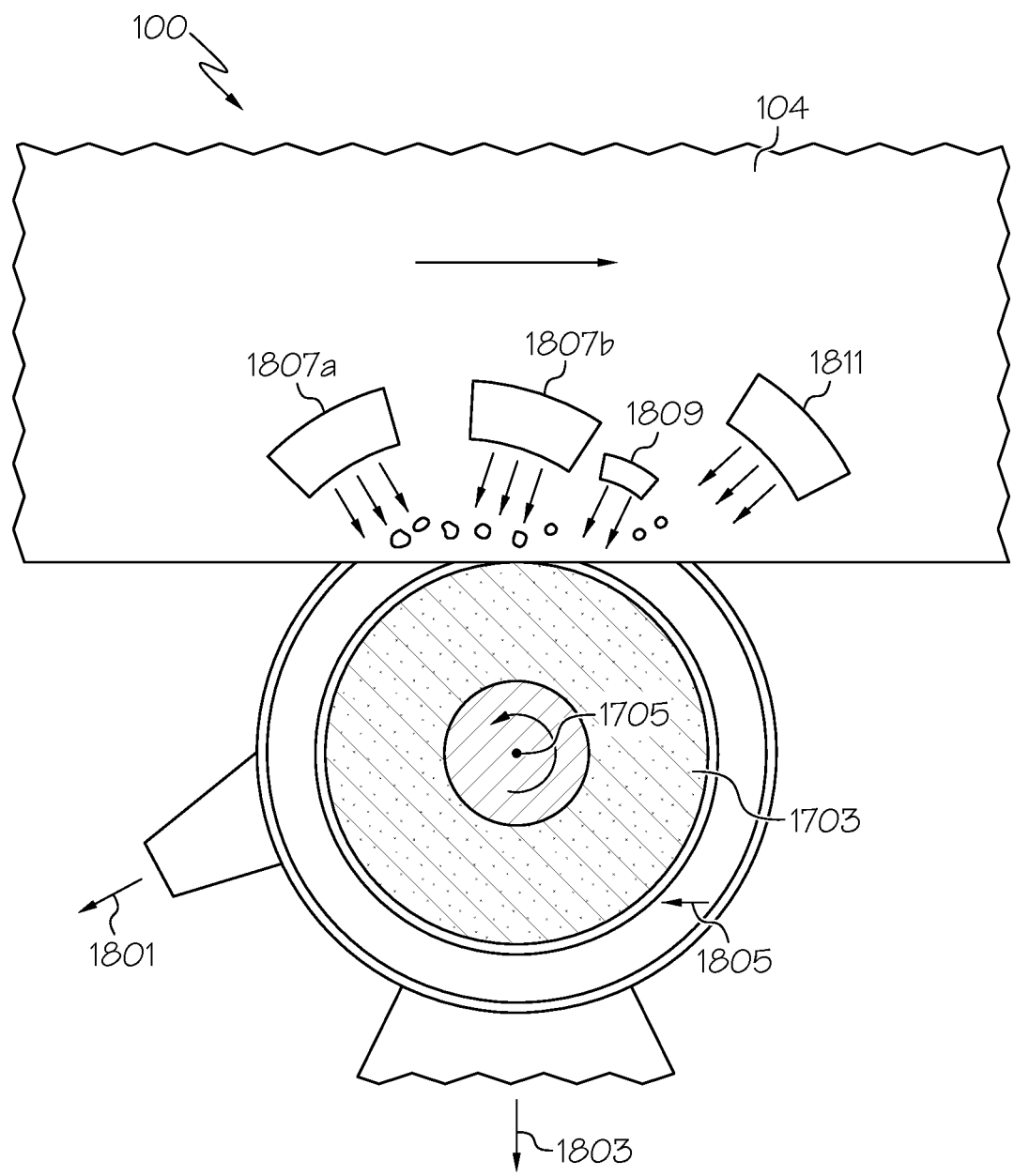
FIG. 22 is a schematic cross-sectional view of the edge finishing apparatus along line 18-18 of FIG. 21.

As further shown in FIG. 22, in some embodiments, a fluid stream 1805 (e.g., lubricant) may be impinged upon the working surface of the grinding wheel 1703 to remove debris embedded within the grinding wheel 1703, thereby renewing the grinding capability of the grinding wheel 1703. In some embodiments, one or more grinding device gas nozzles 1807*a*, 1807*b* may direct gas toward the lateral opening 1711 to arrest fluid within the shroud 1713 from migrating toward an interior of the glass sheet 104. Consequently, the grinding device gas nozzles 1807*a*, 1807*b* can further facilitate the functionality of the shroud 1713, thereby reducing exposure of the central portions of the glass sheet 104 to debris and fluid. In some embodiments, as shown in FIG. 22, a trailing grinding device nozzle 1809 may be provided to clean the edges (e.g., within the shroud 1713) from liquid entrained with debris. As further illustrated a grinding device gas knife 1811 may also be provided to more thoroughly remove any residual fluid remaining on the glass sheet 104 from the machining procedure.

Figure 23:
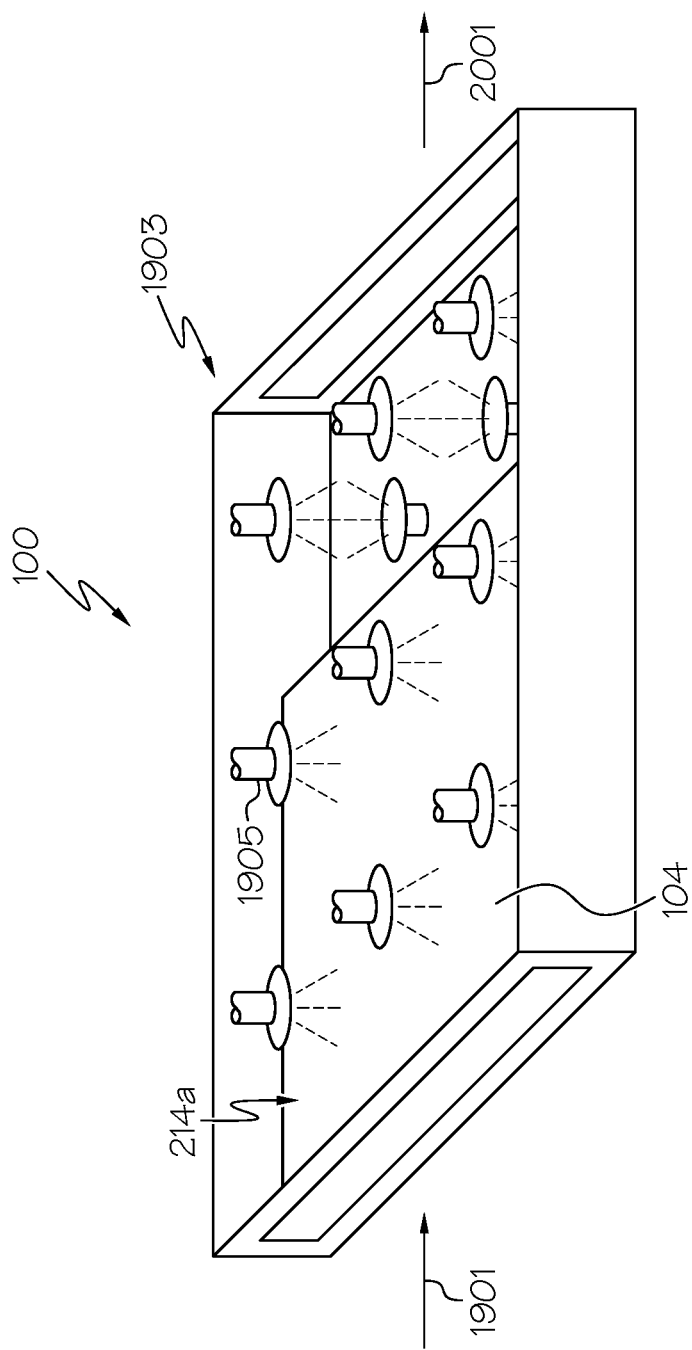
FIG. 23 is a partial schematic perspective view of a coating removal station of the glass processing apparatus.
Figure 24:
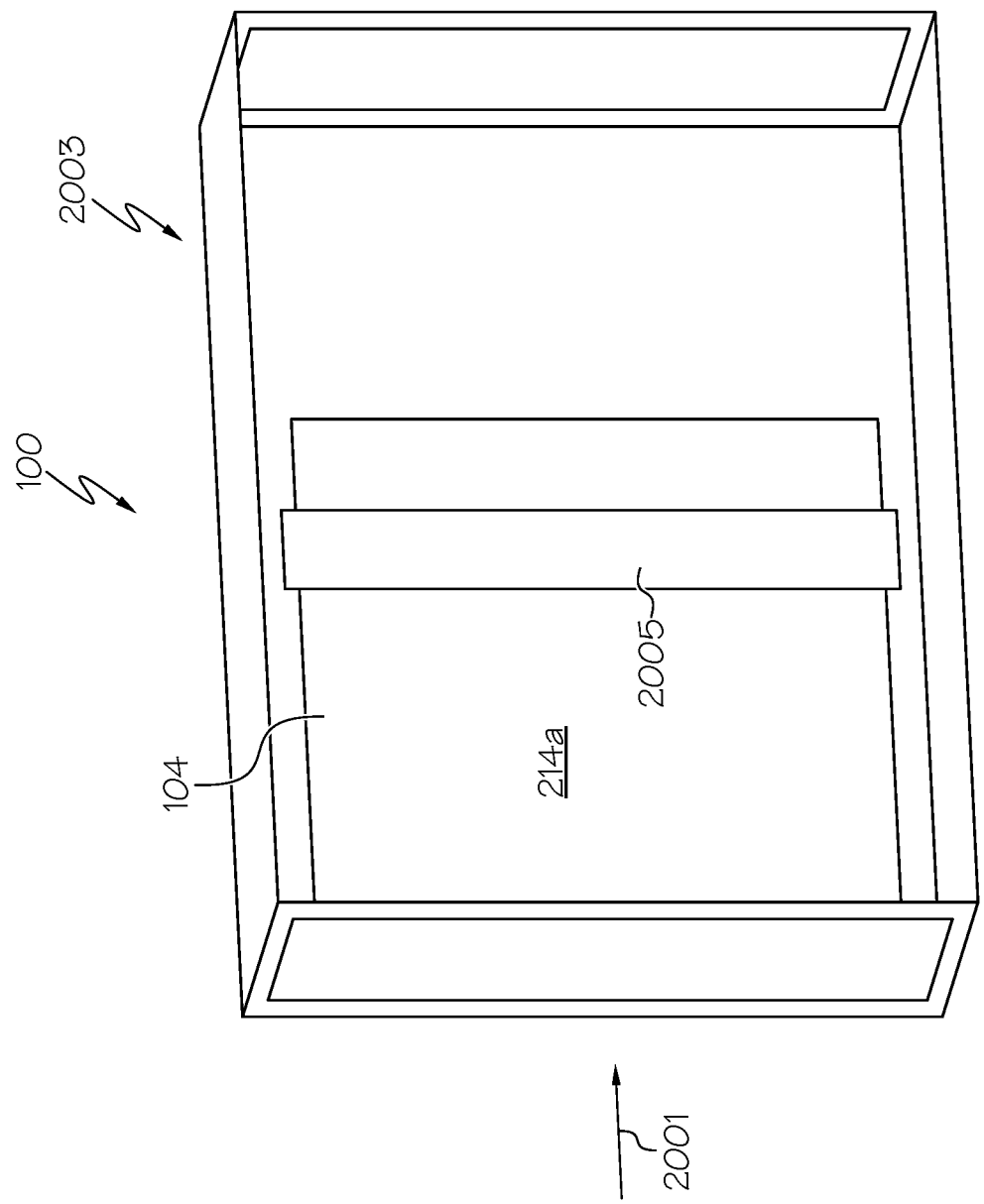
FIG. 24 is a partial schematic perspective view of an inspection station of the glass processing apparatus.

As shown by arrow 1901 in FIG. 20, once the edges of the glass sheet 104 are finished, the protective coating (e.g., first coating layer 1503*a*, second coating layer 1503*b*) may be removed in a coating removal station 1903 shown in FIG. 23. In some embodiments, a plurality of washing heads 1905 can be provided to expose both sides of the glass sheet 104 to a liquid designed to remove the protective coating. For example, the liquid can include an alkaline and/or a detergent with or without brushing or other techniques designed to remove the protective layers from the glass sheet 104. Any debris deposited on the protective layers may also be washed away with the liquid.

Although not shown, the glass sheet 104 may then be dried, for example, with a gas knife or other drying procedure. As indicated by arrow 2001 in FIG. 23, the glass sheet 104 may then pass to an inspection station 2003, shown in FIG. 24, wherein an inspection device 2005 may inspect one or more attributes of the glass sheet 104 to ensure quality and to determine whether the glass sheet 104 meets one or more requirements that may be set by a customer. The inspection device 2005 can be designed to sense one or more of bubbles, inclusions, surface particles, cord, thickness, squareness, dimensions, edge quality, scratches, cracks, surface imperfections, surface shape, surface characteristics or other attributes of the glass sheet 104.

If the glass sheet 104 meets the inspection requirements, the clean glass sheet 104 may be packaged together with other glass sheets 104. In some embodiments, the glass sheets 104 may be placed in a stack with high quality interleaf paper or other material (e.g., polymeric material) disposed between adjacent glass sheets 104. The high quality interleaf paper or other material can be selected to avoid any contamination of the glass sheet 104 with chemicals or fibers.

Figure 25:
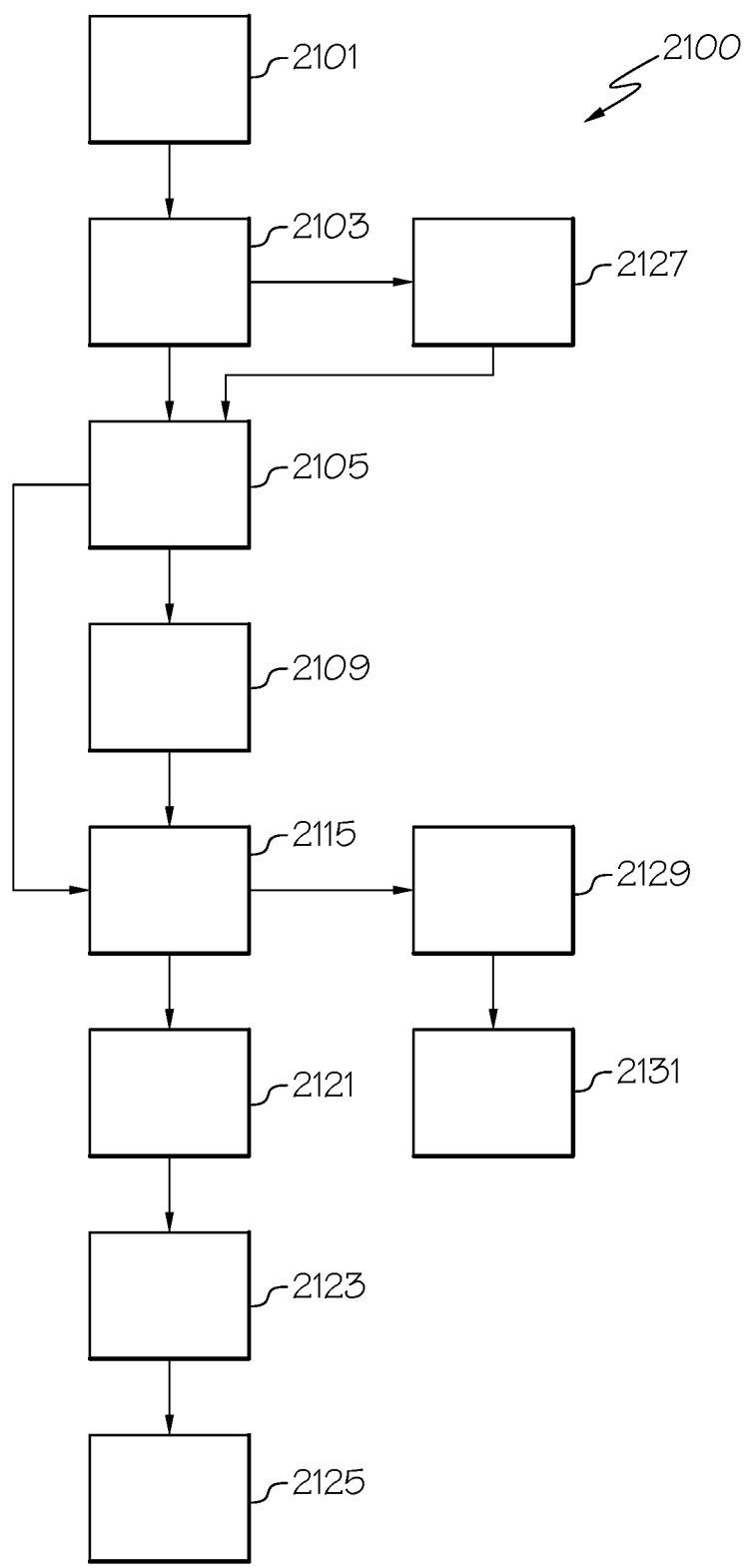
FIG. 25 is a flow chart illustrating exemplary steps of processing a glass ribbon in accordance with embodiments of the disclosure.

Methods of processing a glass ribbon 103 and a glass sheet 104 will now be described with reference to FIG. 25 which schematically illustrates a glass processing method 2100 in accordance with various embodiments disclosed herein. The glass processing method 2100 can begin with a separation step 2101 where, for example, the glass sheet 104 can be separated from the glass ribbon 103 with the glass separator 149. In some embodiments, the glass sheet 104 can be separated from the glass ribbon 103 as shown in FIG. 1. In some embodiments, the outer portions 159 of the glass sheet 104 can be separated from the central portion 161 of the glass sheet 104. In either case, any or all of the procedures discussed with respect to FIGS. 10-14 above may be employed. For example, the curtain of gas (e.g., first outer curtain of gas 187*a*, second outer curtain of gas 187*b*, first inner curtain of gas 187*c*, second inner curtain of gas 187*d*) may be created to entrain debris (e.g., separation debris 1001) generated during the separation procedure as well as to prevent environmental debris 1002 from the contacting the glass ribbon 103 and the glass sheet 104.

The glass processing method 2100 may then proceed to a debris removal step 2103 where debris generated during the separation step 2101 can be removed with the washer 1303 described with respect to FIG. 15. The glass processing method 2100 can then proceed to a coating application step 2105. During the coating application step 2105, the major surfaces 214*a*, 214*b* of the glass sheet 104 can be protected with first coating layer 1503*a* and the second coating layer 1503*b* by the coating chamber 1403 discussed with respect to FIG. 16 above. In some embodiments, after the debris removal step 2103, but before applying the protective layer during the coating application step 2105, the cleaned and dried glass sheet 104 can be inspected during an optional inspection step 2127. In some embodiments, the inspection device 2005 may be used in the inspection step 2127.

After the coating application step 2105, if the glass sheet 104 requires further resizing, the glass sheet 104 can proceed to a resizing step 2109. During the resizing step 2109, the glass sheet 104 can be resized as discussed with respect to FIG. 19 above. Alternatively, if the glass sheet 104 is already of the desired dimensions, the glass sheet 104 may bypass the resizing step 2109. In either case, the glass processing method 2100 may then proceed to an edge finishing step 2115. During the edge finishing step 2115, the edges of the protected glass sheet 104 can be finished as described with respect to FIGS. 20-22 above.

If a customer desires to receive a glass sheet 104 with the protective coating removed, the glass sheet 104 with finished edges may then proceed to a coating removal step 2121 wherein the protective coating (e.g., first coating layer 1503*a*, second coating layer 1503*b*) is removed as described with respect to FIG. 23 above. Once dry, the glass sheet 104 may then pass to an inspection step 2123 as described with respect to FIG. 24 and inspection station 2003. The clean and dry glass sheet 104 may then be packed for shipping during a final packing and shipping step 2125.

Providing a customer with glass sheets without the protective surface can be desirable to reduce processing time on a customer end. However, shipping pristine glass sheets without a protective coating can present challenges. For example, without protective surfaces, there is an increased chance that the glass may be damaged during transport. Furthermore, if the surface is not itself protected, interleaf paper may be used to separate sheets of glass in a pack or stack, and relatively expensive interleaf paper may be employed to reduce shedding of fibers or other effects adverse to the glass sheet, because the interleaf material will be directly contacting the glass sheets. Still further, without surface protection, debris may be introduced subsequent to packing that may prove unacceptable to a customer.

There can be a benefit to leaving the protective coating on during transport and having a customer remove the coating on site. For example, the protective coating can avoid possible damage to the glass surfaces. In some embodiments, any debris produced during transport can be removed along with the protective coating during a subsequent coating removal step 2131. One possible method of processing the glass sheet 104 where the glass sheets are shipped with the protective coating is also illustrated in FIG. 25. Indeed, after undergoing the coating application step 2105 and the optional resizing step 2109, the glass sheet 104 can then be finished during the edge finishing step 2115. Rather than removing the coating in the coating removal step 2121, the glass sheet 104 may then be packed and shipped as indicated by packing and shipping step 2129. Because the glass sheet 104 is already protected by the protective coating, a less expensive interleaf paper may be used. Indeed, any shedding of the interleaf paper could be removed during the subsequent coating removal step 2131 wherein the protective coating is removed as described with respect to FIG. 23 above. As discussed previously, the subsequent coating removal step 2131 can be carried out after transporting the glass sheet 104 to a customer. In some embodiments, the subsequent coating removal step can be similar or identical to the coating removal step 2121 discussed above.

A method of processing the glass ribbon 103 can include drawing the glass ribbon 103 from a quantity of molten material 121 in a draw direction 177 along a draw plane 181, passing the first outer upstream portion 188*a* of the first outer curtain of gas 187*a* along the first outer upstream path spaced from the first major surface 213*a* of the glass ribbon 103, passing the first outer downstream portion 189*a* of the first outer curtain of gas 187*a* along a first outer downstream path in a direction toward the first major surface 213*a* of the glass ribbon 103, and impinging the first outer downstream portion 189*a* of the first outer curtain of gas 187*a* on the first major surface 213*a* of the glass ribbon 103. The method can further include passing the second outer upstream portion 188*b* of the second outer curtain of gas 187*b* along a second outer upstream path that can be spaced from the second major surface 213*b* of the glass ribbon 103, passing the second outer downstream portion 189*b* of the second outer curtain of gas 187*b* along a second outer downstream path in a direction toward the second major surface 213*b* of the glass ribbon 103, and impinging the second outer downstream portion 189*b* of the second outer curtain of gas 187*b* on the second major surface 213*b* of the glass ribbon 103.

In some embodiments, the method of processing the glass ribbon 103 can include passing the first inner upstream portion 188*c* of the first inner curtain of gas 187*c* along a first inner upstream path spaced from the first major surface 213*a* of the glass ribbon 103, passing the first inner downstream portion 189c of the first inner curtain of gas 187c along a first inner downstream path in a direction toward the first major surface 213a of the glass ribbon 103, and impinging the first inner downstream portion 189c of the first inner curtain of gas 187c on the first major surface 213a of the glass ribbon 103. The method can further include passing the second inner upstream portion 188d of the second inner curtain of gas 187d along a second inner upstream path that can be spaced from the second major surface 213b of the glass ribbon 103, passing the second inner downstream portion 189d of the second inner curtain of gas 187d along a second inner downstream path in a direction toward the second major surface 213b of the glass ribbon 103, and impinging the second inner downstream portion 189d of the second inner curtain of gas 187d on the second major surface 213b of the glass ribbon 103.

In some embodiments, the method can include passing the first outer upstream portion 188a of the first outer curtain of gas 187a over the first outer surface 1007b of the first baffle 1005a positioned with the first inner surface 1007a facing the first major surface 213a of the glass ribbon 103, and then passing the first outer upstream portion 188a of the first outer curtain of gas 187a over a first downstream edge 1009a of the first baffle 1005a. In some embodiments, the method can include passing a cooling stream 1003 of gas through a first space defined between the first major surface 213a of the glass ribbon 103 and the first inner surface 1007a of the first baffle 1005a, where the cooling stream 1003 can travel in a first upstream direction opposite a first downstream direction of the first outer curtain of gas 187a. The method can also include passing the second outer upstream portion 188b of the second outer curtain of gas 187b over the second outer surface 1008b of the second baffle 1005b positioned with the second inner surface 1008a facing the second major surface 213b of the glass ribbon 103, and then passing the second outer upstream portion 188b of the second outer curtain of gas 187b over the second downstream edge 1009b of the second baffle 1005b. In some embodiments, the method can include passing the cooling stream 1003 of gas through a second space defined between the second major surface 213b of the glass ribbon 103 and the second inner surface 1008a of the second baffle 1005b, where the cooling stream 1003 can travel in a second upstream direction opposite a second downstream direction of the second outer curtain of gas 187b.

In some embodiments, the method can include passing the first inner upstream portion 188c of the first inner curtain of gas 187c over the first inner surface 1007a of the first baffle 1005a positioned with the first outer surface 1007b facing away from the first major surface 213a of the glass ribbon 103, and then passing the first inner upstream portion 188c of the first inner curtain of gas 187c over a first downstream edge 1009a of the first baffle 1005a. In some embodiments, the method can include passing a cooling stream 1003 of gas through a first space defined between the first major surface 213a of the glass ribbon 103 and the first inner upstream portion 188c of the first inner curtain of gas 187c, where the cooling stream 1003 can travel in a first upstream direction opposite a first downstream direction of the first inner curtain of gas 187c. The method can also include passing the second inner upstream portion 188d of the second inner curtain of gas 187d over the second inner surface 1008a of the second baffle 1005b positioned with the second outer surface 1008b facing away from the second major surface 213b of the glass ribbon 103, and then passing the second inner upstream portion 188d of the second inner curtain of gas 187d over the second downstream edge 1009b of the second baffle 1005b. In some embodiments, the method can include passing the cooling stream 1003 of gas through a second space defined between the second major surface 213b of the glass ribbon 103 and the second inner upstream portion 188d of the second inner curtain of gas 187d, where the cooling stream 1003 can travel in a second upstream direction opposite a second downstream direction of the second inner curtain of gas 187d.

In some embodiments, the method can include drawing the glass ribbon 103 between the first outer upstream portion 188a of the first outer curtain of gas 187a and the second outer upstream portion 188b of the second outer curtain of gas 187b, and then drawing the glass ribbon 103 between the first outer downstream portion 189a of the first outer curtain of gas 187a and the second outer downstream portion 189b of the second outer curtain of gas 187b. In some embodiments, the method can include drawing the glass ribbon 103 between the first inner surface 1007a of the first baffle 1005a and the second inner surface 1008a of the second baffle 1005b. In some embodiments, the method can include drawing the glass ribbon 103 between the first inner upstream portion 188c of the first inner curtain of gas 187c and the second inner upstream portion 188d of the second inner curtain of gas 187d, and then drawing the glass ribbon 103 between the first inner downstream portion 189c of the first inner curtain of gas 187c and the second inner downstream portion 189d of the second inner curtain of gas 187d.

In some embodiments, the method can include separating the glass sheet 104 from the glass ribbon 103 downstream from where the first outer downstream portion 189a of the first outer curtain of gas 187a impinges on the first major surface 213a of the glass ribbon 103. In some embodiments, the method can include separating the glass sheet 104 from the glass ribbon 103 upstream from where the first outer downstream portion 189a of the first outer curtain of gas 187a impinges on the first major surface 213a of the glass ribbon 103. In some embodiments, the method of processing the glass ribbon 103 can include separating the glass sheet 104 from the glass ribbon 103 downstream from where the first outer downstream portion 189a of the first outer curtain of gas 187a impinges on the first major surface 213a of the glass ribbon 103 and downstream from where the second outer downstream portion 189b of the second outer curtain of gas 187b impinges on the second major surface 213b of the glass ribbon 103. In some embodiments, the method of processing the glass ribbon 103 can include separating the glass sheet 104 from the glass ribbon 103 upstream from where the first outer downstream portion 189a of the first outer curtain of gas 187a impinges on the first major surface 213a of the glass ribbon 103 and upstream from where the second outer downstream portion 189b of the second outer curtain of gas 187b impinges on the second major surface 213b of the glass ribbon 103.

In some embodiments, the method can include separating the glass sheet 104 from the glass ribbon 103 at an elevation along the draw plane 181 between where the first inner downstream portion 189c of the first inner curtain of gas 187c impinges on the first major surface 213a of the glass ribbon 103 and where the first outer downstream portion 189a of the first outer curtain of gas 187a impinges on the first major surface 213a of the glass ribbon 103. In some embodiments, the method of processing the glass ribbon 103 can include separating the glass sheet 104 from the glass ribbon 103 at an elevation along the draw plane 181 between where the second inner downstream portion 189d of the second inner curtain of gas 187d impinges on the second major surface 213b of the glass ribbon 103 and where the second outer downstream portion 189b of the second outer curtain of gas 187b impinges on the second major surface 213b of the glass ribbon 103.

In some embodiments, the method of processing the glass ribbon 103 can include entraining debris (e.g., separation debris 1001), produced when separating the glass sheet 104 from the glass ribbon 103, in at least one of the first outer curtain of gas 187a, the first inner curtain of gas 187c, the second outer curtain of gas 187b, and the second inner curtain of gas 187d. In some embodiments, the method of processing the glass ribbon 103 can include drawing the debris entrained in the at least one of the first outer curtain of gas 187a, the first inner curtain of gas 187c, the second outer curtain of gas 187b, and the second inner curtain of gas 187d into at least one of the vacuum port 1011 with an under pressure applied to the vacuum port 1011 and the vacuum 148 (e.g., first vacuum 148a, second vacuum 148b) with the corresponding first vacuum source 147a and second vacuum source 147b.

In some embodiments, the method of processing the glass ribbon 103 can include purging debris (e.g., purging separation debris 1001 and environmental debris 1002 with gas dispenser 1200) from an area 1212 associated with the glass ribbon 103. In some embodiments, the area 1212 can be defined laterally between the first outer upstream portion 188a of the first outer curtain of gas 187a and the second outer upstream portion 188b of the second outer curtain of gas 187b. In some embodiments, the area 1212 can be defined laterally between the first baffle 1005a and the second baffle 1005b. In some embodiments, the area 1212 can be defined laterally between the first inner upstream portion 188c of the first inner curtain of gas 187c and the second inner upstream portion 188d of the second inner curtain of gas 187d. In some embodiments, the area 1212 can be upstream from where the first outer downstream portion 189a of the first outer curtain of gas 187a impinges on the first major surface 213a of the glass ribbon 103 and upstream from where the second outer downstream portion 189b of the second outer curtain of gas 187b impinges on the second major surface 213b of the glass ribbon 103. In some embodiments, the area 1212 can be upstream from where the first inner downstream portion 189c of the first inner curtain of gas 187c impinges on the first major surface 213a of the glass ribbon 103 and upstream from where the second inner downstream portion 189d of the second inner curtain of gas 187d impinges on the second major surface 213b of the glass ribbon 103. In some embodiments, purging can include dispensing the gas stream 1205 in the draw direction 177 along the draw plane 181. In some embodiments, purging can include dispensing the gas stream 1205 along an entire width "W" of the glass ribbon 103, and dispensing the gas stream 1205 to circumscribe the glass ribbon 103.

In some embodiments, the method can include separating a glass sheet 104 from the glass ribbon 103, and then washing the glass sheet 104 (e.g., in washer 1303) to remove debris (e.g., separation debris 1001, environmental debris 1002) from a major surface (e.g., first major surface 214a, second major surface 214b) of the glass sheet 104. In some embodiments, washing can include a first stage of dispensing liquid (e.g., with first liquid dispenser 1307 including first liquid nozzle 1309) against a major surface 214a, 214b of the glass sheet 104 to at least one of remove debris and entrain debris in the liquid and a second stage of dispensing gas (e.g., with gas knife 1317 including gas nozzle 1319) against the major surface 214a, 214b of the glass sheet 104 to remove the liquid from the major surface 214a, 214b of the glass sheet 104.

In some embodiments, the glass sheet 104 can be oriented vertically and travel along a travel direction 1321 during washing. In some embodiments, the gas can be dispensed during the second stage at a second angle "A2" relative to the travel direction 1321 of the glass sheet 104 to direct the liquid downward in the direction of gravity. In some embodiments, washing can include rinsing the major surface 214a, 214b of the glass sheet 104 with a rinsing liquid (e.g., from second liquid dispenser 1323 including second liquid nozzle 1327) during the second stage prior to dispensing the gas against a major surface 214a, 214b of the glass sheet 104, and removing the rinsing liquid from the major surface 214a, 214b of the glass sheet 104 with a deflector 1325 orientated at an angle relative to the travel direction 1321 of the glass sheet 104 to direct the rinsing liquid downward in the direction of gravity.

In some embodiments, the method of processing the glass ribbon 103 can include coating a major surface 214a, 214b of the glass sheet 104 with a protective layer (e.g., first coating layer 1503a, second coating layer 1503b) after washing the glass sheet 104. In some embodiments, the protective layer can include a polymer. In some embodiments, the protective layer can be coated on the major surface 214a, 214b of the glass sheet 104 by plasma deposition (e.g., in coating chamber 1403).

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes embodiments having two or more such light sources unless the context clearly indicates otherwise. Likewise, a "plurality" or an "array" is intended to denote "more than one." As such, a "plurality" or "array" of cavities includes two or more such elements, such as three or more such cavities, etc.

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An apparatus for coating a glass sheet comprising:
a fog chamber comprising a first enclosure and a second enclosure;
a fog generator to provide fog to the first enclosure and the second enclosure, wherein the fog generator comprises an atomizer fog generator;
a first passage in the first enclosure from which fog can exit the first enclosure to contact a first major surface of the glass sheet,
a second passage in the second enclosure from which fog can exit the second enclosure to contact a second major surface of the glass sheet; and
a conveyor extending along the first passage, wherein the conveyor is positioned external to the fog chamber and configured so the glass sheet is in a vertical orientation as the glass sheet travels internally and laterally through the fog chamber during the coating;
wherein the first passage is spaced a predetermined distance from the second passage, and the predetermined distance defines a lateral travel path for the glass sheet to travel through the fog chamber during the coating.

2. The apparatus of claim 1, wherein the first passage faces the second passage.

3. The apparatus of claim 1, further comprising a clip adapted for holding and suspending the glass sheet from the conveyor.

4. The apparatus of claim 1, wherein the first passage comprises a first slot nozzle, wherein fog can exit the first enclosure through the first slot nozzle to contact the first major surface of the glass sheet, and
the second passage comprises a second slot nozzle, wherein fog can exit the second enclosure through the second slot nozzle to contact the second major surface of the glass sheet, and
wherein each of the first slot nozzle and the second slot nozzle comprises a plurality of elongated apertures spaced apart along the first passage and the second passage.

5. The apparatus of claim 1, wherein the first passage comprises a first diffuser nozzle, wherein fog can exit the first enclosure through the first diffuser nozzle to contact the first major surface of the glass sheet, and
wherein the second passage comprises a second diffuser nozzle, wherein fog can exit the second enclosure through the second diffuser nozzle to contact the second major surface of the glass sheet, and
wherein each of the first diffuser nozzle and the second diffuser nozzle comprises a plurality of apertures through which fog can pass.

6. The apparatus of claim 1, wherein the fog chamber comprises an inlet defining an inlet pathway extending from an exterior of the fog chamber to an interior of the fog chamber, and wherein the inlet is oriented to receive the glass sheet to pass along the inlet pathway from the exterior of the fog chamber to the interior of the fog chamber.

7. The apparatus of claim 1, wherein the fog chamber comprises an inlet door for blocking the inlet.

8. The apparatus of claim 1, wherein the glass sheet does not directly contact the conveyor during the coating.

9. The apparatus of claim 1, wherein the fog generator comprises a nozzle having an orifice, an impingement pin, and a filter.

10. The apparatus of claim 9, wherein the orifice is a ruby-orifice.

11. The apparatus of claim 10, wherein the fog comprises hydrocarbon particles having a particle size of about 5 μm to about 15 μm.

12. The apparatus of claim 9, wherein the fog comprises a $C_1$-$C_{12}$ hydrocarbon.

13. The apparatus of claim 1, wherein the fog contacting the at least one major surface of the glass sheet provides a fog coating comprising a $C_1$-$C_{12}$ hydrocarbon.

14. The apparatus of claim 1, further comprising a fan in the enclosure for circulating fog.

15. The apparatus of claim 1, further comprising a first fan in the first enclosure and a second fan in the second enclosure, each for circulating fog.

16. The apparatus of claim 1, wherein the fog generator further comprises an ultrasonic fog generator, an ultrasonic or pneumatic atomizer, or an airless fogger.

* * * * *